United States Patent
Sultana et al.

(10) Patent No.: US 12,306,998 B2
(45) Date of Patent: May 20, 2025

(54) STATELESS AND LOW-OVERHEAD DOMAIN ISOLATION USING CRYPTOGRAPHIC COMPUTING

(71) Applicant: Intel Corporation, Santa Clara, CA (US)

(72) Inventors: Salmin Sultana, Hillsboro, OR (US); Michael LeMay, Hillsboro, OR (US); David M. Durham, Beaverton, OR (US); Karanvir S. Grewal, Hillsboro, OR (US); Sergej Deutsch, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 278 days.

(21) Appl. No.: 17/855,261

(22) Filed: Jun. 30, 2022

(65) Prior Publication Data
US 2022/0343029 A1 Oct. 27, 2022

(51) Int. Cl.
*G06F 9/32* (2018.01)
*G06F 9/30* (2018.01)
(Continued)

(52) U.S. Cl.
CPC .......... *G06F 21/71* (2013.01); *G06F 9/30101* (2013.01)

(58) Field of Classification Search
CPC ...... G06F 21/71; G06F 9/30101; G06F 9/324; G06F 21/602; G06F 21/79
See application file for complete search history.

(56) References Cited

U.S. PATENT DOCUMENTS 6,570,989 B1  5/2003  Ohmori et al.
6,961,852 B2  11/2005 Craft
(Continued)

FOREIGN PATENT DOCUMENTS

DE  102018125786 A1  5/2019
EP      2073430 A1  6/2009
(Continued)

OTHER PUBLICATIONS

USPTO Final Office Action issued in U.S. Appl. No. 17/854,814, dated Sep. 24, 2024; 14 pages.
(Continued)

*Primary Examiner* — Joseph P Hirl
*Assistant Examiner* — Aayush Aryal
(74) *Attorney, Agent, or Firm* — Alliance IP, LLC

(57) ABSTRACT

Technologies provide domain isolation using encoded pointers to data and code. A system may be configured for decoding an encoded pointer to obtain a linear address of an encrypted code block of a first software component in memory. The first software component shares a linear address space of the memory with a plurality of software components. A processor uses the linear address to access the encrypted code block, determines a relative position of the encrypted code block within a memory slot of the linear address space, and decrypts the encrypted code block to generate a decrypted code block using a code key and a code tweak. The code tweak includes a relative position of the encrypted code block in the address space and domain metadata that uniquely identifies the software component. In some scenarios, the software component may be position independent code and may be relocatable to different address spaces.

25 Claims, 27 Drawing Sheets

(51) Int. Cl.
*G06F 21/60* (2013.01)
*G06F 21/71* (2013.01)
*G06F 21/79* (2013.01)

(56) References Cited

U.S. PATENT DOCUMENTS

| | | | |
|---|---|---|---|
| 7,043,016 B2 | 5/2006 | Roelse |
| 7,254,718 B2 | 8/2007 | Kaminaga et al. |
| 7,907,723 B2 | 3/2011 | Rubin |
| 8,085,934 B1 | 12/2011 | Bhooma |
| 8,675,868 B1 | 3/2014 | Yearsley et al. |
| 8,798,263 B2 | 8/2014 | Pasini et al. |
| 9,015,824 B1 | 4/2015 | Drewry et al. |
| 9,135,450 B2 | 9/2015 | Grobman et al. |
| 9,213,653 B2 | 12/2015 | Durham et al. |
| 9,350,534 B1 | 5/2016 | Poo et al. |
| 9,390,268 B1 | 7/2016 | Martini et al. |
| 9,436,847 B2 | 9/2016 | Durham et al. |
| 9,514,285 B2 | 12/2016 | Durham et al. |
| 9,753,754 B2 | 9/2017 | Howell et al. |
| 9,811,661 B1 | 11/2017 | Golovkin et al. |
| 9,830,162 B2 | 11/2017 | LeMay |
| 9,954,950 B2 | 4/2018 | LeMay et al. |
| 9,990,249 B2 | 6/2018 | Durham et al. |
| 10,084,603 B2 | 9/2018 | Rogers et al. |
| 10,216,522 B2 | 2/2019 | LeMay |
| 10,326,744 B1 | 6/2019 | Nossik et al. |
| 10,387,305 B2 | 8/2019 | Durham et al. |
| 10,536,266 B2 | 1/2020 | Courtney |
| 10,585,809 B2 | 3/2020 | Durham et al. |
| 10,706,164 B2 | 7/2020 | LeMay et al. |
| 10,769,272 B2 | 9/2020 | Durham et al. |
| 10,785,028 B2 | 9/2020 | Girkar et al. |
| 10,860,709 B2 | 12/2020 | LeMay et al. |
| 11,216,366 B2 | 1/2022 | Durham et al. |
| 11,250,165 B2 | 2/2022 | LeMay et al. |
| 11,288,188 B1 | 3/2022 | Tummala et al. |
| 11,308,225 B2 | 4/2022 | Kounavis et al. |
| 11,321,469 B2 | 5/2022 | Kounavis et al. |
| 11,354,423 B2 | 6/2022 | Kounavis et al. |
| 11,403,234 B2 | 8/2022 | Durham et al. |
| 11,416,624 B2 | 8/2022 | Durham et al. |
| 11,575,504 B2 | 2/2023 | Durham et al. |
| 11,580,035 B2 | 2/2023 | Durham et al. |
| 11,580,234 B2 | 2/2023 | Kounavis et al. |
| 11,620,391 B2 | 4/2023 | LeMay et al. |
| 11,662,928 B1 | 5/2023 | Kumar et al. |
| 11,669,625 B2 | 6/2023 | Durham et al. |
| 11,809,735 B1 | 11/2023 | Kumar et al. |
| 11,829,488 B2 | 11/2023 | Durham et al. |
| 11,838,418 B2 | 12/2023 | Girkar et al. |
| 12,050,701 B2 | 7/2024 | Kounavis et al. |
| 2002/0065993 A1 | 5/2002 | Chauvel |
| 2002/0094081 A1 | 7/2002 | Medvinsky |
| 2003/0091185 A1 | 5/2003 | Swindlehurst et al. |
| 2003/0101362 A1 | 5/2003 | Dia |
| 2003/0126349 A1 | 7/2003 | Nalawadi et al. |
| 2003/0149869 A1 | 8/2003 | Gleichauf |
| 2004/0034769 A1 | 2/2004 | Bacha et al. |
| 2004/0123288 A1 | 6/2004 | Bennett et al. |
| 2004/0215895 A1 | 10/2004 | Cypher |
| 2004/0268057 A1 | 12/2004 | Landin et al. |
| 2005/0010804 A1 | 1/2005 | Bruening et al. |
| 2005/0100163 A1 | 5/2005 | Buer |
| 2006/0080553 A1 | 4/2006 | Hall |
| 2007/0152854 A1 | 7/2007 | Copley |
| 2007/0192592 A1 | 8/2007 | Goettfert et al. |
| 2007/0201691 A1 | 8/2007 | Kumagaya |
| 2007/0220500 A1 | 9/2007 | Saunier |
| 2007/0230690 A1 | 10/2007 | Elhamias et al. |
| 2008/0080708 A1 | 4/2008 | McAlister et al. |
| 2008/0130895 A1 | 6/2008 | Jueneman et al. |
| 2008/0140968 A1 | 6/2008 | Doshi et al. |
| 2008/0205651 A1 | 8/2008 | Goto et al. |
| 2008/0229425 A1 | 9/2008 | Perrin et al. |
| 2008/0263117 A1 | 10/2008 | Rose et al. |
| 2008/0288785 A1 | 11/2008 | Rao et al. |
| 2008/0320601 A1 | 12/2008 | Linsley |
| 2009/0172393 A1 | 7/2009 | Tanik et al. |
| 2009/0196416 A1 | 8/2009 | Minematsu |
| 2009/0220071 A1 | 9/2009 | Gueron et al. |
| 2009/0249064 A1 | 10/2009 | Atley et al. |
| 2009/0254774 A1 | 10/2009 | Chamdani et al. |
| 2009/0282393 A1 | 11/2009 | Costa et al. |
| 2009/0285390 A1 | 11/2009 | Scherer et al. |
| 2010/0023707 A1 | 1/2010 | Hohmuth et al. |
| 2010/0122088 A1 | 5/2010 | Oxford |
| 2010/0281273 A1 | 11/2010 | Lee et al. |
| 2011/0099429 A1 | 4/2011 | Varma et al. |
| 2011/0161680 A1 | 6/2011 | Grube et al. |
| 2011/0293097 A1 | 12/2011 | Maino et al. |
| 2011/0296202 A1 | 12/2011 | Henry et al. |
| 2012/0163453 A1 | 6/2012 | Horowitz |
| 2012/0284461 A1 | 11/2012 | Larin et al. |
| 2013/0191649 A1 | 7/2013 | Muff et al. |
| 2013/0232507 A1 | 9/2013 | Farrugia et al. |
| 2013/0275766 A1 | 10/2013 | Plainecassagne et al. |
| 2013/0283396 A1 | 10/2013 | Langer et al. |
| 2014/0020092 A1 | 1/2014 | Davidov |
| 2014/0025944 A1 | 1/2014 | Maletsky et al. |
| 2014/0149730 A1 | 5/2014 | Joshi et al. |
| 2014/0173293 A1* | 6/2014 | Kaplan ............... G06F 21/54 |
| | | 713/190 |
| 2014/0270159 A1 | 9/2014 | Youn et al. |
| 2015/0032996 A1 | 1/2015 | Koeberl et al. |
| 2015/0161059 A1 | 6/2015 | Durham et al. |
| 2015/0234728 A1 | 8/2015 | Coleman et al. |
| 2015/0244518 A1 | 8/2015 | Koo et al. |
| 2015/0371063 A1 | 12/2015 | Van Antwerpen et al. |
| 2015/0378941 A1 | 12/2015 | Rozas et al. |
| 2015/0381358 A1 | 12/2015 | Grobman et al. |
| 2016/0056954 A1 | 2/2016 | Lee et al. |
| 2016/0092702 A1* | 3/2016 | Durham ............... G06F 9/35 |
| | | 713/190 |
| 2016/0094552 A1 | 3/2016 | Durham et al. |
| 2016/0104009 A1 | 4/2016 | Henry et al. |
| 2016/0154963 A1 | 6/2016 | Kumar et al. |
| 2016/0188889 A1 | 6/2016 | Trivedi et al. |
| 2016/0192194 A1 | 6/2016 | Yang |
| 2016/0285892 A1 | 9/2016 | Kishinevsky et al. |
| 2016/0292422 A1 | 10/2016 | Hayashi et al. |
| 2016/0335187 A1 | 11/2016 | Greenspan et al. |
| 2016/0364341 A1 | 12/2016 | Banginwar et al. |
| 2016/0364707 A1 | 12/2016 | Varma |
| 2016/0371496 A1 | 12/2016 | Sell |
| 2016/0380772 A1 | 12/2016 | Gopal et al. |
| 2017/0026171 A1 | 1/2017 | Lal et al. |
| 2017/0063532 A1 | 3/2017 | Bhattacharyya et al. |
| 2017/0063547 A1 | 3/2017 | Brandt et al. |
| 2017/0093567 A1 | 3/2017 | Gopal et al. |
| 2017/0171185 A1 | 6/2017 | Camenisch et al. |
| 2017/0177368 A1 | 6/2017 | DeHon et al. |
| 2017/0235957 A1 | 8/2017 | Maletsky |
| 2017/0237560 A1 | 8/2017 | Mueller et al. |
| 2017/0249260 A1 | 8/2017 | Sahita et al. |
| 2017/0285976 A1 | 10/2017 | Durham et al. |
| 2017/0300425 A1 | 10/2017 | Meredith et al. |
| 2017/0308297 A1 | 10/2017 | Roberts et al. |
| 2017/0344297 A1 | 11/2017 | Woolman et al. |
| 2017/0364704 A1 | 12/2017 | Wright et al. |
| 2018/0046576 A1 | 2/2018 | Lesartre et al. |
| 2018/0046823 A1* | 2/2018 | Durham ............... G06F 21/53 |
| 2018/0069694 A1 | 3/2018 | Riou |
| 2018/0082057 A1 | 3/2018 | LeMay et al. |
| 2018/0095812 A1 | 4/2018 | Deutsch et al. |
| 2018/0095899 A1 | 4/2018 | Durham et al. |
| 2018/0095906 A1 | 4/2018 | Doshi et al. |
| 2018/0109508 A1 | 4/2018 | Wall et al. |
| 2018/0247082 A1* | 8/2018 | Durham ............... G06F 21/53 |
| 2018/0268170 A1 | 9/2018 | Li et al. |
| 2018/0287785 A1 | 10/2018 | Pfannenschmidt et al. |
| 2018/0365069 A1 | 12/2018 | Nemiroff et al. |
| 2019/0007204 A1 | 1/2019 | Field et al. |
| 2019/0026236 A1 | 1/2019 | Barnes |

(56) References Cited

U.S. PATENT DOCUMENTS

| | | |
|---|---|---|
| 2019/0042369 A1 | 2/2019 | Deutsch et al. |
| 2019/0042481 A1 | 2/2019 | Feghali et al. |
| 2019/0042734 A1 | 2/2019 | Kounavis et al. |
| 2019/0042766 A1 | 2/2019 | Pappachan et al. |
| 2019/0042796 A1 | 2/2019 | Bokern et al. |
| 2019/0042799 A1 | 2/2019 | Durham et al. |
| 2019/0044927 A1 | 2/2019 | Sood et al. |
| 2019/0044954 A1 | 2/2019 | Kounavis et al. |
| 2019/0045016 A1 | 2/2019 | Dewan et al. |
| 2019/0050558 A1 | 2/2019 | LeMay et al. |
| 2019/0087354 A1 | 3/2019 | Chhabra et al. |
| 2019/0095350 A1 | 3/2019 | Durham et al. |
| 2019/0097794 A1 | 3/2019 | Nix |
| 2019/0102322 A1 | 4/2019 | Chhabra et al. |
| 2019/0102567 A1 | 4/2019 | LeMay et al. |
| 2019/0102577 A1 | 4/2019 | Gueron et al. |
| 2019/0147192 A1 | 5/2019 | Khosravi et al. |
| 2019/0220625 A1 | 7/2019 | Durham et al. |
| 2019/0227951 A1 | 7/2019 | Durham et al. |
| 2019/0319781 A1 | 10/2019 | Chhabra et al. |
| 2019/0339978 A1 | 11/2019 | Wallach |
| 2019/0347445 A1 | 11/2019 | Chen |
| 2019/0354726 A1 | 11/2019 | Critelli et al. |
| 2019/0377574 A1 | 12/2019 | Weimer |
| 2020/0004953 A1 | 1/2020 | LeMay et al. |
| 2020/0007332 A1 | 1/2020 | Girkar et al. |
| 2020/0050553 A1 | 2/2020 | Hajj et al. |
| 2020/0076585 A1 | 3/2020 | Sheppard et al. |
| 2020/0089430 A1 | 3/2020 | Kanno |
| 2020/0117810 A1 | 4/2020 | Kounavis et al. |
| 2020/0125501 A1 | 4/2020 | Durham et al. |
| 2020/0125502 A1 | 4/2020 | Durham et al. |
| 2020/0125742 A1 | 4/2020 | Kounavis et al. |
| 2020/0125769 A1 | 4/2020 | Kounavis et al. |
| 2020/0125770 A1 | 4/2020 | LeMay et al. |
| 2020/0134234 A1 | 4/2020 | LeMay et al. |
| 2020/0145187 A1 | 5/2020 | Kounavis et al. |
| 2020/0145199 A1 | 5/2020 | Kounavis et al. |
| 2020/0159676 A1 | 5/2020 | Durham et al. |
| 2020/0169383 A1 | 5/2020 | Durham et al. |
| 2020/0201789 A1 | 6/2020 | Durham et al. |
| 2020/0241775 A1 | 7/2020 | Breslow |
| 2020/0249995 A1 | 8/2020 | Wong et al. |
| 2020/0257827 A1 | 8/2020 | Kounavis et al. |
| 2020/0379902 A1 | 12/2020 | Durham et al. |
| 2020/0380140 A1 | 12/2020 | Medwed et al. |
| 2020/0382289 A1 | 12/2020 | Xue et al. |
| 2020/0382303 A1 | 12/2020 | Girkar et al. |
| 2021/0004470 A1 | 1/2021 | Babic et al. |
| 2021/0058379 A1 | 2/2021 | Bursell et al. |
| 2021/0117340 A1 | 4/2021 | Trikalinou et al. |
| 2021/0117342 A1 | 4/2021 | Durham |
| 2021/0149825 A1 | 5/2021 | Durham et al. |
| 2021/0150040 A1 | 5/2021 | Durham et al. |
| 2021/0200673 A1 | 7/2021 | Gupta et al. |
| 2021/0218547 A1 | 7/2021 | Weiler et al. |
| 2021/0240638 A1 | 8/2021 | Deutsch et al. |
| 2021/0405896 A1 | 12/2021 | Durham et al. |
| 2022/0012188 A1 | 1/2022 | Durham et al. |
| 2022/0019698 A1 | 1/2022 | Durham et al. |
| 2022/0138329 A1 | 5/2022 | Kounavis et al. |
| 2022/0156180 A1 | 5/2022 | Durham et al. |
| 2022/0197638 A1* | 6/2022 | LeMay .................... G06F 9/35 |
| 2022/0206958 A1 | 6/2022 | LeMay et al. |
| 2022/0300626 A1 | 9/2022 | Kounavis et al. |
| 2022/0382885 A1 | 12/2022 | Durham et al. |
| 2023/0027329 A1 | 1/2023 | Durham et al. |
| 2024/0104027 A1 | 3/2024 | Ghosh et al. |

FOREIGN PATENT DOCUMENTS

| | | |
|---|---|---|
| EP | 3326102 A1 | 5/2018 |
| EP | 3745273 A1 | 12/2020 |
| JP | 2009139899 A | 6/2009 |
| JP | 2011522469 A | 7/2011 |
| JP | 2013541783 A | 11/2013 |
| JP | 2015061182 A | 3/2015 |
| JP | 2019091430 A | 6/2019 |
| KR | 101754518 B1 | 7/2017 |
| WO | 2013147794 A1 | 10/2013 |
| WO | 2014059438 A2 | 4/2014 |
| WO | 2017014885 A1 | 1/2017 |
| WO | 2021/162792 A1 | 8/2021 |
| WO | 2022139850 | 6/2022 |

OTHER PUBLICATIONS

USPTO Non-Final Office Action in U.S. Appl. No. 17/953,186 mailed on Sep. 27, 2024 (17 pages).

USPTO Non-Final Office Action in U.S. Appl. No. 18/499,133 dated Sep. 26, 2024 (14 pages).

Non-Final Office Action received in U.S. Appl. No. 16/998,913, dated Jan. 25, 2023, 13 pages.

Non-Final Office Action received in U.S. Appl. No. 17/472,272, dated Jul. 7, 2023, 11 pages.

Notice of Allowance, U.S. Appl. No. 16/024,259, May 20, 2020, 20 pages.

Notice of Allowance, U.S. Appl. No. 16/728,928, Feb. 22, 2021, 10 pages.

Notice of Allowance, U.S. Appl. No. 17/321,087, Apr. 13, 2022, 13 pages.

Notice of Allowance, U.S. Appl. No. 17/321,087, May 4, 2022, 9 pages.

U.S. Appl. No. 17/953,186, filed Sep. 26, 2022.

USPTO Final Office Action for U.S. Appl. No. 17/481,405 received on Aug. 30, 2023, entitled, Cryptographic Computing Including Enhanced Cryptographic Addresses (21 pages).

USPTO Final Office Action for U.S. Appl. No. 17/485,213 received on Aug. 8, 2023, entitled, Object and Cacheline Granularity Cryptographic Memory Integrity (19 pages).

USPTO Final Office Action in U.S. Appl. No. 16/724,059 mailed on Sep. 2, 2022 (34 pages).

USPTO Final Office Action in U.S. Appl. No. 17/576,533 mailed on May 30, 2023 (9 pages).

USPTO Final Office Action in U.S. Appl. No. 17/833,515 mailed on Sep. 25, 2023 (24 pages).

USPTO Non-Final Office Action for U.S. Appl. No. 17/481,405 received on Feb. 16, 2023, entitled, Cryptographic Computing Including Enhanced Cryptographic Addresses (19 pages).

USPTO Non-Final Office Action for U.S. Appl. No. 17/485,213 received on Feb. 14, 2023, entitled, Object and Cacheline Granularity Cryptographic Memory Integrity (19 pages).

USPTO Non-Final Office Action for U.S. Appl. No. 17/539,933, filed Dec. 1, 2021 entitled, Security Check Systems and Methods for Memory Allocations (5 pages).

USPTO Non-Final Office Action in U.S. Appl. No. 16/709,612 mailed on Feb. 17, 2022 (17 pages).

USPTO Non-Final Office Action in U.S. Appl. No. 16/720,059 mailed on Jan. 21, 2022 (20 pages).

USPTO Non-Final Office Action in U.S. Appl. No. 16/722,342 mailed on Aug. 29, 2022 (14 pages).

USPTO Non-Final Office Action in U.S. Appl. No. 16/723,871 mailed on Nov. 10, 2022 (11 pages).

USPTO Non-Final Office Action in U.S. Appl. No. 16/723,927 dated Jun. 8, 2021 (32 pages).

USPTO Non-Final Office Action in U.S. Appl. No. 16/723,977 mailed on Aug. 3, 2021 (37 pages).

USPTO Non-Final Office Action in U.S. Appl. No. 16/724,105 mailed on Jul. 13, 2021 (10 page).

USPTO Non-Final Office Action in U.S. Appl. No. 16/740,359 mailed on Sep. 27, 2021 (8 pages).

USPTO Non-Final Office Action in U.S. Appl. No. 16/862,022 mailed on Jun. 20, 2023 (12 pages).

USPTO Non-Final Office Action in U.S. Appl. No. 17/134,405 mailed on Aug. 1, 2022 (15 pages).

USPTO Non-Final Office Action in U.S. Appl. No. 17/134,406 mailed on Jan. 21, 2022 (11 pages).

(56) References Cited

OTHER PUBLICATIONS

USPTO Non-Final Office Action in U.S. Appl. No. 17/576,533 mailed on Feb. 7, 2023 (8 pages).
USPTO Non-Final Office Action in U.S. Appl. No. 17/833,515 mailed on Apr. 14 (23 pages).
USPTO Notice of Allowance for U.S. Appl. No. 16/998,913 received Aug. 7, 2023 (13 pages).
USPTO Notice of Allowance for U.S. Appl. No. 17/485,213 received Dec. 14, 2023 (6 pages).
USPTO Notice of Allowance for U.S. Appl. No. 17/539,933 received Jun. 16, 2023 entitled, Security Check Systems and Methods for Memory Allocations (7 pages).
USPTO Notice of Allowance in U.S. Appl. No. 16/709,612 mailed on Aug. 23, 2022 (18 pages).
USPTO Notice of Allowance in U.S. Appl. No. 16/709,612 mailed on Nov. 25, 2022 (14 pages).
USPTO Notice of Allowance in U.S. Appl. No. 16/722,342 mailed on Apr. 24, 2023 (4 pages).
USPTO Notice of Allowance in U.S. Appl. No. 16/722,342 mailed on Feb. 23, 2023 (7 pages).
USPTO Notice of Allowance in U.S. Appl. No. 16/722,342 mailed on Jul. 13, 2023 (7 pages).
USPTO Notice of Allowance in U.S. Appl. No. 16/722,707 mailed on Mar. 28, 2022 (10 pages).
USPTO Notice of Allowance in U.S. Appl. No. 16/723,468 mailed on Oct. 18, 2021 (10 pages).
USPTO Notice of Allowance in U.S. Appl. No. 16/723,871 mailed on May 26, 2023 (7 pages).
USPTO Notice of Allowance in U.S. Appl. No. 16/723,927 dated Dec. 24, 2021 (13 pages).
USPTO Notice of Allowance in U.S. Appl. No. 16/723,977 mailed on Feb. 3, 2022 (13 pages).
USPTO Notice of Allowance in U.S. Appl. No. 16/724,026 mailed on Aug. 10, 2022 (9 pages).
USPTO Notice of Allowance in U.S. Appl. No. 16/724,026 mailed on Dec. 7, 2022 (14 pages).
USPTO Notice of Allowance in U.S. Appl. No. 16/724,105 dated Nov. 16, 2021 (9 pages).
USPTO Notice of Allowance in U.S. Appl. No. 16/724,105 mailed on Mar. 31, 2022 (8 pages).
USPTO Notice of Allowance in U.S. Appl. No. 16/740,359 mailed on Mar. 22, 2022 (9 pages).
USPTO Notice of Allowance in U.S. Appl. No. 16/776,467 mailed on Jul. 18, 2022 (10 pages).
USPTO Notice of Allowance in U.S. Appl. No. 16/776,467 mailed on Nov. 9, 2022 (8 pages).
USPTO Notice of Allowance in U.S. Appl. No. 17/134,405 mailed on Jan. 31, 2023 (8 pages).
USPTO Notice of Allowance in U.S. Appl. No. 17/134,406 mailed on Oct. 5, 2022 (10 pages).
U.S. Appl. No. 17/791,000, filed Jul. 6, 2022.
U.S. Appl. No. 17/854,814, filed Jun. 30, 2022.
International Preliminary Report on Patentability for International Patent Application No. PCT/US2020/067076, mailed Jul. 6, 2023; 7 pages.
Japanese Office Action received in Application No. 2022-540601, dated Sep. 3, 2024, with English translation, 6 pages.
Kim, Yonghae, et al.; "Hardware-based Always-On Heap Memory Safety," 2020 53rd Annual IEEE/ACM International Symposium on Microarchitecture (MICRO); Athens, Greece; 14 pages.
Kroes et al., Fast and Generic Metadata Management with Mid-Fat Pointers, 2017, ACM, 6 pages (Year: 2017).
Kwon, Albert et al., "Low-Fat Pointers: Compact Encoding and Efficient Gate-Level Implementation of Fat Pointers for Spatial Safety and Capability-based Security," CCS' 13: Proceedings of the 2013 ACM SIGSAC Conference on Computer & Communications Security, Nov. 4-8, 2013, Berlin Germany (12 pages).
L. Fiorin, G. Palermo, S. Lukovic, V. Catalano and C. Silvano, "Secure Memory Accesses on Networks-on-Chip," in IEEE Transactions on Computers, vol. 57, No. 9, pp. 1216-1229, Sep. 2008, doi: 10.1109/TC.2008.69; 14 pages.
L. Muscariello et al., "Hybrid Information-Centric Networking draft-muscariello-intarea-hicn-00," Cisco Systems, Inc., Jun. 7, 2018 (21 pages).
Liljestrand, Hans et al. "PACStack: an Authenticated Call Stack," Sep. 3, 2019, retrieved from https://arxiv.org/pdf/1905.10242.pdf, (20 pages).
Liljestrand, Hans, et al., "PAC it up: Towards Pointer Integrity using ARM Pointer Authentication", accessed at https://arxiv.org/pdf/1811.09189.pdf, last updated May 24, 2019, 21 pages.
Mohamed et al., "A scheme for implementing address translation storage buffers," Proceedings of the 2002 IEEE Canadian Conference on Electrical and Computer Engineering, 2002, pp. 626-632.
Myoung Jin Nam, Periklis Akritidis, and David J Greaves. 2019. Framer: a tagged-pointer capability system with memory safety applications. In Proceedings of the 35th Annual Computer Security Applications Conference (ACSAC '19), Association for Computing Machinery, New York, NY, USA, 612-626, https://doi.org/10.1145/3359789.3359799.
Nasahl, Pascal et al., "CrypTag: Thwarting Physical and Logical Memory Vulnerabilities using Cryptographically Colored Memory", https://doi .org/10.48550/arXiv.2012.06761, ARXIV ID: 2012.06761, Dec. 12, 2020. (13 pages).
Neagu, Madalin, et al.; "Increasing Memory Security Through Data Scrambling and Information Entropy Models," 2014 IEEE 15th International Symposium on Computational Intelligence and Informatics; Nov. 2014; 5 pages.
PCT International Preliminary Report on Patentability issued in PCT/US2020/067072, dated Aug. 25, 2022; 8 pages.
PCT International Search Report and Written Opinion issued in PCT/US2020/067072, dated May 26, 2021; 13 pages.
PCT International Search Report and Written Opinion issued in PCT/US2020/067076, dated Sep. 9, 2021; 11 pages.
Pyo, Changwoo, "Encoding Function Pointers and Memory Arrangement Checking against Buffer Overflow Attack," In Proceedings of the 4th International Conference on Information and Communications Security (ICICS 2002) (12 pages).
Qualcomm Technologies, Inc., "Pointer Authentication on ARMv8.3, Design and Analysis of the New Software Security Instructions," Jan. 2017, retrieved from https://www.qualcomm.com/media/documents/files/whitepaper-pointer-authentication-on-armv8-3.pdf, (12 pages).
Savry, Olivier, et al., "Intrinsec, an Intrinsically Secure Processor", RISC V Workshop, Dec. 6, 2019, accessed at: http://riscv.org/wp-content/uploads/2019/06/16.15-CEA-RISC-V-Workshop-Zurich.pdf, (15 pages.).
Serebryany, Kostya, "ARM Memory Tagging Extension and How it Improves C/C++ Memory Safety," Summer 2019, (5 pages).
The Electronics Resurgence Initiative, "SSITH: TA1 (Hardware) Performers," Dec. 22, 2018, available online at https://eri-summit.darpa.mil/docs/ERIPoster_Applications_SSITH_DARPA.pdf, (1 page).
Tuck, Nathan et al., "Hardware and Binary Modification Support for Code Pointer Protection From Buffer Overflow," 37th International Symposium on Microarchitecture (MICRO-37'04), 2004, pp. 209-220 (12 pages).
USPTO Notice of Allowance in U.S. Appl. No. 17/833,515 mailed on Apr. 2, 2024 (9 pages).
USPTO Restriction Requirement in U.S. Appl. No. 16/862,022 mailed on Feb. 2, 2023 (6 pages).
USPTO Supplemental Notice of Allowance in U.S. Appl. No. 16/722,707 mailed on Apr. 8, 2022 (5 pages).
USPTO; Notice of Allowance issued in U.S. Appl. No. 17/472,272, dated Jan. 9, 2024, 9 pages.
Watson et al., Capability Hardware Enhanced RISC Instructions (CHERI): Notes on the Meltdown and Spectre Attacks, University of Campbridge Computer Laboratory, Feb. 2018, 16 pages.
Watson, Robert N.M., et al., "An Introduction to CHERI", Technical Report UCAM-CL-TR-941, University of Cambridge Computer Labratory, Cambridge, United Kingdom, Sep. 2019, 43 pages.
Watson, Robert N.M., et al., "Capability Hardware Enhanced RISC Instructions: CHERI Instruction-Set Architecture (Version 8)," Uni-

(56) References Cited

OTHER PUBLICATIONS versity of Cambridge Computer Laboratory Technical Report No. 951, Cambridge, UK; Oct. 2020 (590 pages).

Watson, Robert N.M., et al., "CHERI: A Hybrid Capability-System Architecture for Scalable Software Compartmentalization", 2015 IEEE Symposium on Security and Privacy, May 2015, accessed at https://discovery.ucl.ac.uk/id/eprint/1470067/1/oakland15cheri.pdf, 18 pages.

Whelihan, David et al., "A Key-Centric Processor Architecture for Secure Computing," 2016 IEEE International Symposium on Hardware Oriented Security and Trust (HOST), 2016, pp. 173-178. (6 pages).

Xia, Hongyan et al., "CHERIvoke: Characterising Pointer Revocation using CHERI Capabilities for Temporal Memory Safety," MICRO-52, Oct. 2019, Columbus, OH, US (13 pages).

Xu, Leslie et al., "White Paper, Securing the Enterprise with Intel AES-NI, Intel Advanced Encryption Standard New Instructions (AES-NI)," Intel Corporation, Version, 2.0, Sep. 2010 (13 pages).

Yan, Z., et al., "Hardware translation coherence for virtualized systems," 2017 3 ACM/IEEE 44th Annual International Symposium on Computer Architecture (ISCA), 2017, pp. 430-443, doi: 10.1145/3079856.3080211. {Year: 2017).

Yang, Jun et al., "Improving Memory Encryption Performance in Secure Processors," IEEE Transactions on Computers, vol. 54, No. 5, May 2005 (11 pages).

Zhu, Ge et al., "Protection against indirect overflow attacks on pointers," Second IEEE International Information Assurance Workshop, 2004. Proceedings., 2004, pp. 97-106. (10 pages).

Non-Final Office Action received in U.S. Appl. No. 17/854,814, dated May 16, 2024, 14 pages.

"Armv8.5-A Memory Tagging Extension White Paper", Oct. 9, 2019, accessed at https://developer.arm.com/-/media/Arm%20Developer%20Community/PDF/Arm_Memory_Tagging_Extension_Whitepaper.pdf, 9 pages.

Ainsworth, Sam et al., "MarkUs: Drop-in use-after-free prevention for low-level languages," 2020 IEEE Symposium on Security and Privacy, Cambridge, UK (14 pages).

Andreatos et al., "A comparison of random number sequences for image encryption", Mathematical Methods in Science and Engineering, 2014, pp. 146-151 (Year: 2014) (7 pages).

Avanzi, Roberto, "The QARMA Block Ciper Family, Almost MDS Matrices Over Rings With Zero Divisors, Nearly Symmetric Even-Mansour Constructions With Non-Involutory Central Rounds, and Search Heuristics for Low-Latency S-Boxes," Qualcomm Product Security, Munich Germany, IACR Transactions on Symmetric Cryptology, 2017 (1) (40 pages).

Beaulieu, Ray et al., "Simon and Spec: Block Ciphers for the Internet of Things," National Security Agency, Jul. 2015 (15 pages).

Bernstein, Daniel J., "Gimli," Sep. 27, 2019, retrieved from https://csrc.nist.gov/CSRC/media/Projects/lightweight-cryptography/documents/round-2/spec-doc-rnd2/gimli-spec-round2.pdf, (48 pages).

BiiN, "CPU Architecture Reference Manual", accessed at http://bitsavers.informatik.uni-stuttgart.de/pdf/biin/BiiN_CPU_Architecture_Reference_Man_Jul88.pdf, Jul. 1988, 401 pages.

Boivie, Rick, IBM Research Report, SecureBlue++: CPU Support for Secure Execution, May 23, 2012, available online at https://domino.research.ibm.com/library/cyberdig.nsf/papers/E605BDC5439097F085257A13004D25CA/$File/rc25287.pdf, (10 pages).

Borghoff, Julia et al., "Prince—A Low-Latency Block Ciper for Pervasive Computing Applications," Advances in Cryptology—ASIACRYPT 2012—18th International Conference on the Theory and Application of Cryptology and Information Security, Beijing, China, Dec. 2-6, 2012. Proceedings (pp. 208-225).

Carlini, Nicholas, et al.; "Control-Flow Bending: On the Effectiveness of Control-Flow Integrity," Proceedings of the 24th USENIX Security Symposium; Washington, D.C.; Aug. 2015; 16 pages.

Carr, Scott A. et al., "DataShield: Configurable Data Confidentiality and Integrity," Purdue University, ASIA CCS, '17, Apr. 2-6, 2017, Abu Dhabi, United Arab Emirates (12 pages).

Chen, Tony et al., "Pointer Tagging for Memory Safety." Microsoft. Retrieved from https://www.microsoft.com/en-us/research/uploads/prod/2019/07/Pointer-Tagging-for-Memory-Safety.pdf, 23 pages.

Durham, David M. et al; U.S. Appl. No. 17/539,933, filed Dec. 1, 2021.

Dutch Office Action received in Application No. 2029792, dated Mar. 22, 2023, with Statement of Relevance, 15 pages.

Dworkin, Morris, "Recommendation for Block Cipher Modes of Operation: The XTS-AES Mode for Confidentiality on Storage Devices," NIST Special Publication 800-38E, Jan. 2010, available online at https://nvlpubs.nist.gov/nistpubs/Legacy/SP/nistspecialpublication800-38e.pdf, (12 pages).

EPO Communication Pursuant to Article 94(3) EPC in EP Application Serial No. 20181907.5-1218 mailed on Mar. 27, 2023 (6 pages).

EPO European Extended Search Report in EP Application Serial No. 20918345.8 mailed on Mar. 14, 2024, 7 pages.

EPO; Extended European Search Report issued in EP Patent Application No. 20163534.9, dated Sep. 24, 2020; 8 pages.

EPO; Extended European Search Report issued in EP Patent Application No. 20163546.3, dated Sep. 28, 2020; 8 pages.

EPO; Extended European Search Report issued in EP Patent Application No. 20163670.1, dated Sep. 29, 2020; 8 pages.

EPO; Extended European Search Report issued in EP Patent Application No. 20163907.7, dated Oct. 6, 2020; 9 pages.

EPO; Extended European Search Report issued in EP Patent Application No. 20164326.9, dated Oct. 2, 2020; 9 pages.

EPO; Extended European Search Report issued in EP Patent Application No. 20164636.1, dated Oct. 6, 2020; 8 pages.

EPO; Extended European Search Report issued in EP Patent Application No. 20168972.6, dated Jul. 3, 2020; 9 pages.

EPO; Extended European Search Report issued in EP Patent Application No. 20181907.5, dated Nov. 2, 2020; 9 pages.

EPO; Extended European Search Report issued in EP Patent Application No. 20193625.9, dated Feb. 22, 2021; 7 pages.

EPO; Extended European Search Report issued in EP Patent Application No. 20210029.3, dated May 20, 2021; 8 pages.

EPO; Extended European Search Report issued in EP Patent Application No. 21195529.9, dated Mar. 1, 2022; 6 pages.

EPO; Extended European Search Report issued in EP Patent Application No. 21196104.0, dated Feb. 15, 2022; 10 pages.

EPO; Extended European Search Report issued in EP Patent Application No. 22153425.8, dated Jul. 18, 2022; 8 pages.

EPO; Extended European Search Report issued in European Patent Application No. EP 20163095.1, dated Aug. 10, 2020; 9 pages.

EPO; Extended European Search Report issued in Patent Application No. EP 20163518.2, dated Aug. 19, 2020; 10 pages.

EPO; Extended European Search Report issued in Patent Application No. EP 20163661.0, dated Aug. 17, 2020; 9 pages.

EPO; Office Action issued in EP Patent Application No. 20210029.3, dated Mar. 16, 2022; 4 pages.

Filardo, Nathaniel Wesley et al., "Cornucopia: Temporal Safety for CHERI Heaps;" Cambridge, UK. (18 pages).

France Intellectual Property Office; Office Action issued in FR2114288, dated Nov. 28, 2023; 4 pages with English translation.

France Intellectual Property Office; Search Report issued in FR2114288, dated Jan. 12, 2023; 24 pages with English translation.

French Office Action received in Application No. 2114288, dated Apr. 3, 2024, with English translation, 6 pages.

Gallagher, Mark et al., "Morpheus: A Vulnerability-Tolerant Secure Architecture Based on Ensembles of Moving Target Defenses with Churn," ASPLOS '19, Apr. 13-17, 2019, pp. 469-484, available online at https://web.eecs.umich.edu/~barisk/public/morpheus.pdf, (16 pages).

Gallagher, Mark, Slide Deck entitled "Morpheus: A Vulnerability-Tolerant Secure Architecture Based on Ensembles of Moving Target Defenses with Churn," ASPLOS '19, Apr. 13-17, 2019, retrieved from https://twd2.me/wp-content/uploads/2019/05/Morpheus-1.pdf, (45 pages).

GitHub.com; "V8 Garbage Collector," Oct. 23, 2018 (13 pages).

Haraken@, et al..; "MTECheckedPtr" Last updated Jul. 9, 2020; Accessed Jul. 19, 2022; Retrieved from https://docs.google.com/

(56) References Cited

OTHER PUBLICATIONS document/d/1ph7iOorkGqTuETFZp-xvHV4L2rYootuz1ThzAAoGe30/edit#heading=h.b57m9s7iv7yr; 9 pages.

Haraken@; "CheckedPtr2 and CheckedPtr3," retrieved from the Internet at https://docs.google.com/document/d/14TsvTgswPUOQuQoI9TmkFQnuSaFD8ZLHRvzapNwI5vs; published Apr. 4, 2020; 8 pages.

Hong, H. et al., "Data-Oriented Programming: On the Expressiveness of Non-Control Data Attacks," IEEE S&P, 18 pages, 2016.

Intel 64 and IA-32 Architectures Developer's Manual, vol. 3A: System Programming Guide, Part 1, retrieved from https://www.intel.com/content/www/us/en/architecture-and-technology/64-ia-32-architectures-software-developer-vol-3a-part-1-manual.html, (468 pages).

Intel; "Intel 64 and IA-32 Architectures Software Developer's Manual," vol. 1: Basic Architecture, Chapter 3: Basic Execution Environment; Oct. 2019; 57 pages.

Intel; "Intel 64 and IA-32 Architectures Software Developer's Manual," vol. 1: Basic Architecture, Chapter 6: Procedure Calls, Interrupts, and Exceptions; Oct. 2019; 48 pages.

Intel; "Intel 64 and IA-32 Architectures Software Developer's Manual," vol. 3: System Programming Guide, Chapter 6; Oct. 2019; 110 pages.

Intel® 64 and IA-32 Architectures Software Developer's Manual, vol. 2B: Instruction Set Reference, M-U, Sep. 2016, retrieved from https://www.intel.com/content/dam/www/public/us/en/documents/manuals/64-ia-32-architectures-software-developer-vol-2b-manual.pdf, (706 pages).

Intel® 64 and IA-32 Architectures Software Developer's Manual, vol. 3D: System Programming Guide, Part 4, Sep. 2016, 224 pages, retrieved from https://www.intel.com/content/dam/www/public/us/en/documents/manuals/64-ia-32-architectures-software-developer-vol-3d-part-4-manual.pdf, (224 pages).

USPTO Notice of Allowance in U.S. Appl. No. 17/878,322 mailed on Dec. 18, 2024 (10 pages).

Cai, Zechao, et al.; "Demystifying Pointer Authentication on Apple M1," Proceedings of the 32nd USENIX Security Symposium; Aug. 9-11, 2023; 17 pages.

USPTO Notice of Allowance in U.S. Appl. No. 18/499,133 mailed on Feb. 26, 2025 (7 pages).

USPTO; Notice of Allowance issued in U.S. Appl. No. 17/854,814 dated Feb. 5, 2025, 8 pages.

* cited by examiner

STATELESS AND LOW-OVERHEAD DOMAIN ISOLATION USING CRYPTOGRAPHIC COMPUTING

TECHNICAL FIELD

The present disclosure relates in general to the field of computer systems, and more specifically, to stateless and low-overhead domain isolation using cryptographic computing.

BACKGROUND

Cloud computing enables access to computer system resources by a user over interconnected networks, such as the Internet, without the user necessarily owning or managing the computer system resources. Generally, such resources include compute, storage, and networking resources. Serverless computing, also known as Functions-as-a-Service (FaaS), is emerging as a new paradigm for cloud computing. FaaS allows developers to build, compute, and run application packages without having to maintain their own infrastructure. In FaaS platforms, each function can be executed in an ephemeral, stateless container. The FaaS code can be executed in response to events without the requiring the user to build or maintain the complex infrastructure typically associated with microservices applications. Accordingly, provisioning and managing a virtual or physical server, virtual machine operating system, and web server hosting processes may be handled by a cloud service provider rather than the user of the cloud system resources. Businesses are increasingly adopting serverless models as indicated by the FaaS global market estimates of growth. Indeed, FaaS platforms have already been released by cloud providers.

DETAILED DESCRIPTION

Figure 1:
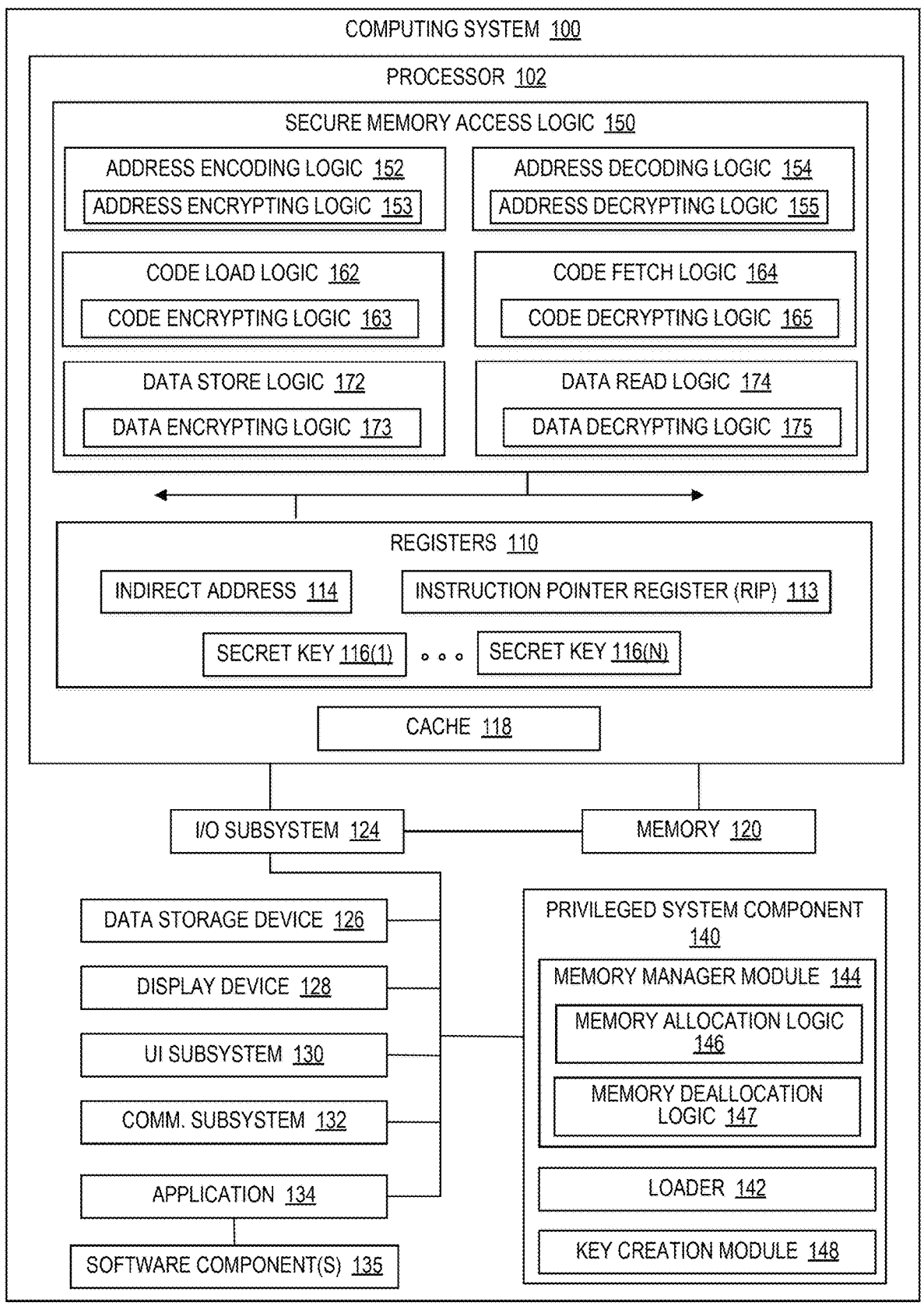
FIG. 1 is a simplified block diagram of an example computing device according to at least one embodiment.

The present disclosure provides various possible embodiments, or examples, of systems, methods, apparatuses, architectures, and machine readable media for using cryptographic computing to achieve stateless and low-overhead domain isolation. In particular, embodiments disclosed herein provide a low-latency and fine-grained domain isolation mechanism for software components within and across applications. A software component is intended to mean a file containing program code (e.g., an object file, a library, an executable, a dynamically loadable module, a statically loadable module, a VM image) that can be linked with one or more other files containing program code to form one application. Additionally, a software component may include position-independent code (PIC), which may be loaded and executed by multiple applications running in separate application containers or tenants. In some cases, a file may contain multiple software components. For example, a shared library may have a protected software component and an unprotected software component. Some software components may be independently executable and capable of running in their own containers. At least some other software components, like libraries, can be executable in the context of something else and, therefore, are invoked as part of some larger application and/or invoked by other software components within a larger application (e.g., shared library invoked by other functions/microservices). Examples of software components include, but are not necessarily limited to, functions (e.g., user-defined functions, shared library functions, static library functions, FaaS functions, etc.), microservices, and browser components (e.g., library, tab within a browser, etc.). Browser components could include a library for processing images, video, and/or audio, a tab within the browser, another site outside the browser, or any other executable browser component.

For purposes of illustrating the several embodiments of a system using cryptographic computing to achieve stateless and low-overhead domain isolation, it is important to first understand the operations and activities associated with data protection and memory safety, as well as current cloud computing trends. Accordingly, the following foundational information may be viewed as a basis from which the present disclosure may be properly explained.

Cryptographic computing (CC) (e.g., Cryptographic Capability Computing (C3)) is a stateless memory safety technique that does not require storing any metadata or memory layout changes. Cryptographic computing replaces inefficient metadata memory accesses with efficient cryptography by assigning a unique and distinct cryptographically isolated space for each allocation.

More specifically, cryptographic computing can be used to protect code and data in memory by using cryptography and software allocated memory addresses (linear/virtual address space, also referred to as 'pointers' or 'object pointers') mapped to physical memory addresses of memory locations where the code and data are stored. In cryptographic computing, an object pointer that stores a linear address of data or code can be encoded with metadata. In some implementations, cryptographic computing leverages the concept of a cryptographic addressing layer where the processor encrypts a portion (also referred to herein as a 'slice') of the linear address in the pointer based on implicit and/or explicit metadata (e.g., context information) and/or at least a portion of the linear address itself (e.g., as a tweak to a tweakable block cipher (e.g., XOR-encrypt-XOR-based tweaked-codebook mode with ciphertext stealing (XTS)). As used herein, a "tweak" may refer to, among other things, an extra input to a block cipher, in addition to the usual plaintext or ciphertext input and a key. A tweak comprises one or more bits that represent a value. A tweak may compose all or part of an initialization vector (IV) for a block cipher. A resulting cryptographically encoded pointer can comprise an encrypted portion (or slice) of the memory address and some bits of encoded metadata (e.g., context information).

Encryption of a portion of the encoded pointer can prevent forgery by an attacker. When decryption of an address is performed, if the information used to create the tweak (e.g., implicit metadata, explicit metadata, plaintext address slice of the memory address, etc.) corresponds to the original allocation of the linear address by a memory allocator (e.g., software allocation method), then the processor can correctly decrypt the address. Otherwise, a random address result will cause a fault and get caught by the processor.

These cryptographically encoded pointers (or portions thereof) may be used by the processor to derive a tweak to a code/data encryption cipher used to encrypt/decrypt code and data referenced by the cryptographically encoded pointers. Thus, a cryptographic binding can be created between the cryptographic addressing layer and data/code encryption and decryption. This implicitly enforces bounds since a pointer that strays beyond the end of an object is likely to use incorrect metadata (e.g., domain Identifier) for that adjacent object. Thus, the data or code of an object can only be decrypted correctly if access is performed using its cryptographically encoded pointer, which is effectively unforgeable.

The cryptographically encoded pointer may be decrypted and decoded to obtain the linear address. The linear address (or a portion thereof) may be used by the processor as a tweak to the data encryption cipher for some types of data (e.g., heap). Alternatively, the memory address may not be encrypted but the pointer may still be encoded with some metadata representing a unique value among pointers. In this alternative, the encoded pointer (or a portion thereof) may be used by the processor as a tweak to the data encryption cipher. It should be noted that a tweak that is used as input to a block cipher to encrypt/decrypt code or data is also referred to herein as a 'code/data tweak.' Similarly, a tweak that is used as input to a block cipher to encrypt/decrypt a memory address is also referred to herein as an 'address tweak.'

Cryptography continues to become faster and lighter. For instance, the Advanced Encryption Standard (AES) has been the mainstay for data encryption for decades, using a 128-bit block cipher. Meanwhile, memory addressing is typically 64 bits today. Although embodiments herein may be illustrated and explained with reference to 64-bit memory addressing for 64 computers, the disclosed embodiments are not intended to be so limited and can easily be adapted to accommodate 32 bits, 128 bits, or any other available bit sizes for pointers. Likewise, embodiments herein may further be adapted to accommodate various sizes of a block cipher (e.g., 64-bit, 48-bit, 32-bit, 16-bit, etc. using Simon, Speck, PRINCE or any other block cipher).

Lightweight ciphers suitable for pointer encryption have emerged recently. The PRINCE cipher, for example, can be implemented in 3 clocks requiring as little as 799 μm$^2$ of area in the 10 nm process, providing half the latency of AES in a tenth the Silicon area. BipBip and k-cipher are even smaller tweakable block ciphers with lower latency. Cryptographic computing may utilize these new ciphers, as well as others, introducing novel computer architecture concepts related to, but not limited to: (i) cryptographic addressing, i.e., the encryption of data and code pointers at the processor using, as tweaks, contextual information about the referenced data (e.g., metadata embedded in the pointer and/or external metadata), a slice of the address itself, or any suitable combination thereof; and (ii) encryption of the data and code itself at the core, using cryptographically encoded pointers or portions thereof, non-cryptographically encoded pointers or portion(s) thereof, contextual information about the referenced data, or any suitable combination thereof as tweaks for the data or code encryption. A variety of encryption modes that are tweakable can be used for this purpose of including metadata (e.g., counter mode (CTR) and XOR-encrypt-XOR (XEX)-based tweaked-codebook mode with ciphertext stealing (XTS)). In addition to encryption providing data and code confidentiality, its implicit integrity may allow the processor to determine if the data or code is being properly decrypted using the correct keystream and tweak. In some block cipher encryption modes, the block cipher creates a keystream, which is then combined (e.g., using XOR operation) with an input block to produce the encrypted or decrypted block. In some block ciphers, the keystream is fed into the next block cipher to perform encryption or decryption.

Functions-as-a-Service (FaaS) platforms are serverless architectures in which functions run in stateless containers in response to events or requests. Generally, a function is code designed to perform a piece of work or a task, or in some cases, a small number of pieces of work or tasks. This container-based approach of an FaaS platform introduces challenges for complex applications that may require multiple interacting functions. A first challenge may be 'invocation latency,' which is attributed to the high-volume and short-lived nature of FaaS workloads. Process based isolation of containers can be too slow for the execution of short-running functions. Typically, application containers have start-up latencies in the hundreds of milliseconds to several seconds on initial requests and autoscaling. Moreover, context switching from one process to another can be complex and cause high overhead when running thousands of tenants in a system. Tenants running in different containers can significantly increase central processing unit (CPU) cost compared to different tenant workloads running as threads in a shared process.

A second challenge includes a key bottleneck referred to as 'interaction latency.' Interaction latency can be caused when a function needs to share state information with other functions. State information can be maintained externally, either via cloud storage services or parameter passing between two processes. In at least some scenarios, interaction latency could consume up to 95% of the execution time for the function.

Addressing these challenges involves trade-offs between isolation and performance in an FaaS platform. In one example, fine-grained application sandboxing has been proposed for FaaS, where each application runs in its own container, and the functions that compose the application run as separate processes within the container. Although resources can be quickly allocated and deallocated, fine-grained application sandboxing does not provide shared memory between functions and thus, still requires duplication of data in separate process memories.

In another example, functions of an application may be executed as separate threads within a single container to minimize interaction latency. Lightweight thread-level isolation can use, for example, Intel® Memory Protection Keys (MPK). Language-level isolation, however, can be weaker than container-based isolation and may incur high overhead. Software based isolation techniques may suffer from bugs and side-channel attacks resulting in data leakage. In addition, language-level isolation can increase programming/state management complexity.

Similar to functions, other software components may also be invoked by users and capable of being executed in ephemeral, stateless containers. In one example, microservices provided by one or more owners may be invoked by a user application or tenant. A microservice may run in its own container but may not be trusted vis-a-vis other microservices offered by other owners. In another example, different browser components may be invoked by a particular browser application but may not be trusted to run in the same memory address space as the browser application and/or other browser components.

A cryptographic computing system to achieve stateless and low-overhead isolation for functions-as-a-service as disclosed herein can resolve many of the aforementioned issues (and more). In particular, cryptographic computing is used to provide cryptographic isolation among mutually untrusted domains in an application having multiple software components. In one example, an application (e.g., multi-tenant application, FaaS application, microservice application, browser application) can run in an individual container, execute multiple software components (e.g., functions, microservices, browser components, etc.), and provide isolation between the software components sharing the same address space. Each software component is considered a different domain that includes its own code and data. Although not required, in one example each software component is executed as a separate thread within the container and therefore, each thread also represents a different domain. As used herein, the term 'thread' (also known as a 'thread of execution') is intended to mean a sequence of instructions contained inside a process that provides a path of execution within the process. Two or more threads within a process (e.g., of an application, an application within a container, or a container) can share the same memory spaces and therefore, use the same resources.

Embodiments of cryptographic computing disclosed herein are used to cryptographically isolate in-memory data and code within and across the domains. Code and data of each domain may each be uniquely encrypted in cache and memory using unique encoded pointers to access the code and data. In at least some implementations, the object pointers may be cryptographically encoded or, in some embodiments, non-cryptographically encoded. Encrypted code and encrypted data can be cryptographically bound to their respective pointers. To provide object granularity of memory encryption, a tweak derived at least in part from an encoded pointer may be used along with a data key to encrypt data per object allocation. The configuration of the data tweak and the selection of the data key can depend on the particular embodiment and the particular type of data being encrypted (e.g., heap data, different types of data accessed relative to an instruction pointer register (RIP-relative access)). To provide low overhead domain isolation, domain metadata (e.g., domain Identifier (ID)) can be encoded in a code pointer and used in a code tweak to encrypt and decrypt the code of a software component. A code tweak may also include a power value indicating a slot size selected for the memory allocation (an allocation of a code memory region for a binary image, which is a distinct variety of memory allocation from a heap data memory allocation), and location information of the targeted code within a linear/virtual address space, The location information could be, for example, a relative position such as an offset of the code within the slot selected for the memory allocation. A single code key may be used per application container in some embodiments. For software components that are pre-encrypted (e.g., by a package manager), any suitable code key may be used and made available to applications that load the encrypted software component.

A cryptographic computing system as described herein also provides zero-copy, object-granular communications between software components in an application. Switching from one domain to another can be efficiently achieved by switching cryptographic state (or 'encryption state'). Encryption state includes the appropriately encoded forward pointers to code and data associated with the domain to which control is transferred. Accordingly, as the execution transitions between domains, appropriate encryption state is loaded to correctly decrypt the data and code.

Reference is now made to the drawings. FIG. 1 is a simplified block diagram of an example computing device 100 configured with secure memory access logic and implementing a cryptographic computing system to achieve stateless and low-overhead domain isolation according to at least one embodiment of the present disclosure. In the example shown, computing device 100 includes a processor 102, an input/output (I/O) subsystem 124, and memory 120. Processor 102 can include secure memory access logic 150 and memory components such as registers 110 and cache 118 (e.g., L1 cache, L2 cache).

The secure memory access logic 150 utilizes metadata about an indirect address 114. The metadata is encoded into unused bits of the indirect address 114 (e.g., non-canonical bits of a 64-bit address, or a range of addresses set aside, e.g., by the operating system, such that the corresponding high order bits of the address range may be used to store the metadata), in order to secure and/or provide access control to memory locations pointed to by the indirect address 114. For example, the metadata encoding and decoding provided by the secure memory access logic 150 can prevent the indirect address 114 from being manipulated to cause a buffer overflow, and/or can prevent program code from accessing memory that it does not have permission to access.

Address encoding logic 152 of the secure memory access logic 150 is invoked when memory is allocated (e.g., by an operating system, in the heap or in the stack, in the text/code segment) and provided to executing programs in any of a number of different ways, including by using a function such as malloc, alloc, or new; or implicitly via the loader, or statically allocating memory by the compiler, etc. As a result, the indirect address 114, which points to the allocated memory, is encoded with the address metadata. When memory is deallocated (e.g., by an operating system, in the heap or in the stack), the deallocated memory can be made available for reallocation in any of a number of different ways, including by using a function such as delete or free; or implicitly via the loader, or statically deallocating memory by the compiler, etc. As a result, the deallocated memory (or a portion thereof) may be reallocated and a new indirect address 114 for the new memory allocation can be encoded with the new address metadata.

The address metadata can include valid range metadata. The valid range metadata allows executing programs to manipulate the value of the indirect address 114 within a valid range, but will corrupt the indirect address 114 if the memory is accessed using the indirect address 114 beyond the valid range. Alternatively or in addition, the valid range metadata can be used to identify a valid code range, e.g., a range of memory that program code is permitted to access (e.g., the encoded range information can be used to set explicit ranges on registers).

In one or more embodiments, other metadata can include size metadata that is related to the size of the allocation in memory. For example, some pointers may be encoded with metadata representing the value of an exponent in a power of two (or other power) size of a slot of memory to which a memory allocation for an object is assigned. The memory slot may be the same size (e.g., size in bytes or 'byte size') as, or a larger size than, the memory allocation for the object. This size metadata (also referred to herein as 'power size metadata') may specify a number of lowest order bits in the encoded pointer that can be modified by the executing program to enable the pointer to range within the allocation using pointer arithmetic. In another example, the size metadata in some pointers may be a value representing the actual size of the memory region that is allocated and referenced by the pointer. Such embodiments may be implemented using pointers that include enough bits to accommodate at least a size field and a portion of the memory address.

In one or more embodiments for achieving domain isolation using cryptographic computing, address metadata can include a domain metadata such as a domain identifier (also referred to herein as 'domain ID'). A domain ID can represent a unique identifier of a software component such as a function, a microservice, library, or a browser component, being executed in a particular application (or container). Thus, a domain ID assigned to a software component running in a particular application (or container) can uniquely identify the software component within the application (among other software components sharing the same address space) and across other applications in the platform. The indirect addresses of the program code (also referred to herein as 'code') of the software component and data accessed by the software component can be encoded with the domain ID assigned to the particular instance of the software component (e.g., running within a particular application). For a software component that is shared across multiple applications (or containers), such as a shared library, a domain ID for the shared software component can represent a unique identifier of the shared software component and that domain ID can be used to uniquely identify the shared software component in each application (or container) in which the shared software component runs. The indirect addresses of the program code of a shared software component and data accessed by the shared software component can be encoded with the domain ID assigned to the shared software component, which can be dynamically invoked by multiple applications.

One or more other types of address metadata may also be encoded in an indirect address based on particular implementations and needs. For example, the address metadata may include a tag of randomized bits associated with the encoded indirect address to make the tag unpredictable for an adversary. An adversary may try to guess the tag value so that the adversary is able to access the memory referenced by the indirect address, and randomizing the tag value may make it less likely that the adversary will successfully guess the value compared to a deterministic approach for generating a version value. In some embodiments, the indirect address may include a version number (or other deterministically different value) determining current ownership of the referenced allocated data in time instead of or in addition to a randomized tag value. Even if an adversary is able to guess the current tag value or version number for a region of memory, e.g., because the algorithm for generating the version numbers is predictable, the adversary may still be unable to correctly generate the corresponding encrypted portion of the indirect address due to the adversary not having access to the key that will later be used to decrypt that portion of the indirect address.

Other examples of metadata that could be encoded in the unused bits of indirect address 114 include a memory allocation size (e.g., bytes of allocated memory referenced by the encoded indirect address), a type of the data or code (e.g., class of data or code defined by programming language), permissions (e.g., read, write, and execute permissions of the encoded indirect address), a location of the data or code (e.g., where the data or code is stored), the memory location where the indirect address itself is to be stored, an ownership of the data or code, a version of the encoded indirect address (e.g., a sequential number that is incremented each time an encoded indirect address is created for newly allocated memory, determines current ownership of the referenced allocated memory in time), a tag of randomized bits (e.g., generated for association with the encoded indirect address), a privilege level (e.g., user or supervisor), a cryptographic context identifier (or crypto context ID) (e.g., randomized or deterministically unique value for each encoded indirect address), etc.

Address decoding logic 154 verifies the encoded metadata on memory read and write operations that utilize processor instructions such as MOV, where a general purpose register is used as a memory address to read a value from memory (e.g., load) or to write a value to memory (e.g., store), as well as on other operations that involve the "use" of memory (such as arithmetic instructions with memory operands, e.g. ADD, and control transfer instructions, e.g. CALL/JMP etc.). These are considered memory operands, which may specify a location in memory at which the destination address for the control transfer is stored. Address decoding logic 154 can also verify encoded metadata during code fetch operations to fetch the next instruction to be executed.

The example secure memory access logic 150 can be embodied as part of processor instructions (e.g., as part of the processor instruction set architecture), or microcode (e.g., instructions that are stored in read-only memory and executed directly by the processor 102). In other embodiments, portions of the secure memory access logic 150 may be embodied as hardware, firmware, software, or a combination thereof (e.g., as programming code executed by a privileged system component 140 of the computing device 100). For example, the secure memory access logic 150 may be embodied in software as an instruction set emulator (e.g., a binary instrumentation tool such as a PIN Tool) that emulates the instruction logic utilizing the encoded addresses as disclosed herein. The secure memory access logic 150 may be integrated with processor 102 or may be partially or wholly implemented using discrete components.

The secure memory access logic 150 is executable by the computing device 100 to provide security for encoded indirect addresses "inline," e.g., during execution of a program (such as a user space application 134) by the computing device 100. As used herein, the terms "indirect address" and "pointer" may each refer to, among other things, an address (e.g., virtual address or linear address) of a memory location at which other data or instructions are stored. In an example, a register that stores an encoded memory address of a memory location where data or code is stored may act as a pointer. As such, the indirect address 114 may be embodied as, for example, a data pointer (which refers to a location of data), a code pointer (which refers to a location of executable code), an instruction pointer (which refers to a location where code is stored and where a computer is in its program sequence during runtime), or a stack pointer. Indirect addresses may be referred to by other terminology, such as "pointer," "address pointer," or "pointer address."

As used herein, "data read logic" may refer to, among other things, a "MOV" or "LOAD" instruction or any other instruction that causes data to be read, copied, or otherwise accessed at one storage location, e.g., memory, and moved into another storage location, e.g., registers (where "memory" may refer to main memory or cache, e.g., a form of random access memory, and "register" may refer to a processor register, e.g., hardware), or any instruction that accesses or manipulates memory. Also as used herein, "data store logic" may refer to, among other things, a "MOV" or "STORE" instruction or any other instruction that causes data to be read, copied, or otherwise accessed at one storage location, e.g., register, and moved into another storage location, e.g., memory, or any instruction that accesses or manipulates memory.

However, the pointer encoding/decoding technology disclosed herein is not limited to load/store instructions. For example, control transfer instructions such as call and jump instructions can be adapted to handle encoded pointers and perform encryption and decryption within the core in a similar manner where code is to execute within a valid address range. Likewise, the instruction pointer (e.g., register) may be range bound given the encoded address specified by the control transfer instruction (e.g., JMP/CALL) resulting in an encoded address being used for the instruction pointer, thus restricting valid program execution to within a valid address range (effectively, the program counter can increment correctly until it reaches the end of the encoded range). As used herein, "code fetch logic" may refer to, among other things, fetch operations or instructions that cause program code (e.g., a code block) to be read, copied, or otherwise accessed at one storage location, e.g., memory, and moved into another storage location, e.g., registers (where "memory" may refer to main memory or cache, e.g., a form of random access memory, and "register" may refer to a processor register, e.g., hardware, such as an instruction pointer register (RIP)), or any instruction that accesses or manipulates program code.

Furthermore, in some architectures, any number of processor instructions may have a memory operand in the form of an encoded pointer (e.g., arithmetic operations such as ADD, SUB, MUL, AND, OR, XOR, etc. may have a source/destination memory reference in the form of an encoded pointer and/or a source/destination register operand). In other architectures, however, the format of memory operands may vary. For example, registers may be combined in some way (e.g., by addition) to produce an effective address. Additionally, other parameters may optionally be included, such as a scaling factor that multiplies one of the register values (e.g., the index) and/or a constant displacement value embedded in the instruction that is directly added. Further, it should be noted that while the illustrative embodiments refer to "instructions," such instructions may be embodied as, e.g., processor instructions, operating system routines, or other forms of computer program code.

The example secure memory access logic 150 includes address encoding logic 152 (which includes address encrypting logic 153), address decoding logic 154 (which includes address decrypting logic 155), code load logic 162 (which includes code encrypting logic 163), code fetch logic 164 (which includes code decrypting logic 165), data store logic 172 (which includes data encrypting logic 173), and data read logic 174 (which includes data decrypting logic 175). Illustratively, the address decoding logic 154 may be embodied in code fetch logic 164, data store logic 172 and data read logic 174, and may be embodied in other processor instructions, or as a separate instruction or series of instructions, or as higher-level code executed by a privileged system component such as an operating system kernel or virtual machine monitor, or as an instruction set emulator. The address encoding logic 152 uses at least some metadata (e.g., one or more of power size, domain ID, etc.), a secret address key (e.g., secret keys 116(1)-116(N)), and an address tweak in order to secure the indirect address 114 at the memory allocation/access level. Also as described in more detail below, the code encrypting logic 163 and code decrypting logic 165 each operate on code (e.g., referenced by an indirect address such as indirect address 114) using at least a portion of the encoded indirect address and a secret code key (e.g., secret keys 116(1)-116(N)), in order to secure the code at the memory location referenced by the indirect address by binding the code encryption to the encoded indirect address. Similarly, data encrypting logic 173 and data decrypting logic 175 each operate on data (e.g., referenced by an indirect address, such as indirect address 114) using at least a portion of the encoded indirect address and a secret data key (e.g., secret keys 116(1)-116(N)), in order to secure the data at the memory location referenced by the indirect address by binding the data encryption to the encoded indirect address. In at least some implementations, address encoding logic 152, address encrypting logic 153, code load logic 162, and code encrypting logic 163 may be embodied as higher-level code executed by a privileged system component such as an operating system kernel, linker-loader, or virtual machine monitor, or as an instruction set emulator. However, it should be apparent that other implementations may provide one or more of these functionalities in hardware circuitry, such as processor instructions.

The example indirect address 114 (which could be an indirect address for code or data) is embodied as a register 110 (e.g., a general-purpose register of the processor 102) for referencing data and as an instruction pointer register (RIP) 113 for referencing code. The example secret keys 116(1)-116(N) may be generated by a key creation module 148 of a privileged system component 140, and stored in the registers 110 (e.g., a special purpose register or a control register such as a machine specific register (MSR)), or another memory location that is accessible by the processor 102. In some embodiments, the secret keys 116(1)-116(N) are stored in a location that is readable only by the processor, such as supplemental processor memory. For example, supplemental processor memory may be implemented as a new cache or content addressable memory (CAM). In some implementations, supplemental processor memory may be dedicated to storage of information related to cryptographic isolation such as keys, tweaks, and/or other information. In other embodiments, the secret keys 116(1)-116(N) may be stored in another memory location, such as in firmware, in a secure portion of the data storage device 126 or another data storage device, in external memory, or another form of memory suitable for performing the functions described herein.

In some embodiments, the secret keys 116(1)-116(N) may be transmitted across a secure communications channel and restored by an executive (such as an operating system or a virtual machine monitor, e.g., the privileged system component 140 described below). In virtualized environments in which virtual machines are migrated from one machine to another, and/or in cases in which a virtual machine, process or program running on the computing device 100 begins a sleeping/hibernating mode after an encoded pointer and the referenced data and/or code are secured using secret keys, and then later resumes, the secret keys may need to be recovered and restored. In these cases, the secret keys can be stored or possibly transmitted across a (secure) communications channel prior to a sleeping/hibernating mode, and then retrieved/restored by an executive (such as an operating system or a virtual machine monitor, e.g., the privileged system component 140).

It should be noted that embodiments described herein allow for any number of secret keys to be used for a particular application container, for a particular program, or for a particular processor or computing device. Secret keys may be generated and associated with indirect addresses for encrypting/decrypting an address portion (or slice) of an indirect address and (optionally) metadata encoded in the indirect address, and for encrypting/decrypting code or data referenced by the indirect address. Keys used to secure indirect addresses by encryption/decryption may be the same as or different than keys used to encrypt/decrypt the code or data referenced by the indirect address. Furthermore, keys used to encrypt/decrypt code may be the same as or different than keys used to encrypt/decrypt data. It should also be noted that, while secrecy of a key may provide additional security, in at least some scenarios, the secrecy of the keys may or may not be maintained (e.g., by storing in processor memory, encrypting the key itself, etc.) depending on particular needs and implementations of a given system. For ease of explanation, embodiments further described herein may refer to "address key" to refer to the use of a key (which may or may not be secret) in the encryption and decryption of a portion of indirect addresses and potentially metadata encoded in the indirect addresses, "data key" to refer to the use of a key (which may or may not be secret) in the encryption and decryption of data, and "code key" to refer to the use of a key (which may or may not be secret) in the encryption and decryption of code.

In one or more embodiments, tweaks are used to isolate code and at least some data associated with a particular domain from other code and data associated with other domains, where the domains correspond to software components (e.g., functions, microservices, browser components, etc.) invoked by the same application running in one container. The software components invoked in a particular application can be isolated from each other, from the application running in the container, and from other applications (or containers) and the software components therein. In one example, software components may run as respective threads within a process and thus, the threads are isolated from each other. Thus, each thread in which a software component runs represents the domain of the software component. If multiple threads are used to run a single software component within a container, then the multiple threads associated with a single software component may represent a single domain. An application (e.g., a main application that invokes software components) may also be considered a domain and cryptographically isolated from other software components in the same address space.

To isolate a given domain from other domains in the same container, the code associated with the given domain in the container can be encrypted and decrypted based, at least in part, on code tweaks derived from encoded indirect addresses that reference code blocks associated with the given domain. A code block includes at least one instruction and can be sized to correspond to the granularity of a block cipher used to perform the cryptographic operations (e.g., 16-bit, 32-bit, 64-bit, 128-bit, etc.) to encrypt/decrypt the code block. The data associated with the given domain in the container can be encrypted and decrypted based, at least in part, on data tweaks derived from encoded indirect addresses that reference the data associated with the given domain. Indirect addresses for data may be encoded differently depending on the type of data that is referenced.

In one example, the code tweaks and some of the data tweaks used to encrypt code and data associated with a given domain bind the encryption of the code and data to the domain by including a domain ID in the code and data tweaks. In addition, each tweak may include power size metadata (e.g., power of two encoding) indicating the size of a slot to which the memory allocation is assigned. Each tweak may also include location information (e.g., relative position within the relevant linear/virtual address space) of the code block or data being encrypted/decrypted. For example, the location information could be embodied as a byte offset of the code block or data being encrypted/decrypted within the slot to which the memory allocation containing the code or data is assigned. This allows the code or data to be relocated, or be position independent code, where the cryptographic tweak represents the relative position within the slot selected for the memory allocation and not the absolute location of the code or data in memory.

A code/data key may be paired with code/data tweaks (e.g., as input to a block cipher) to perform encryption and decryption operations on code and data. Any suitable number of code/data keys may be used in a system for achieving domain isolation, based on particular needs and implementations. In some implementations, the same code/data key may be assigned to all domains in a container and used to encrypt and decrypt code and data associated with all of the domains. In some implementations, the same key may be assigned to all applications in the system or a subset of applications in the system. In other implementations, a unique code/data key may be assigned to each domain in a container or to a subset of domains in a container. Additionally, in each possible scenario, the same key may be used for encrypting data and code or different keys may be used to encrypt data and code.

Similarly, an address key may be paired with address tweaks (e.g., as input to a block cipher) to perform encryption and decryption operations on a portion (or slice) of encoded indirect addresses that reference data or code of a domain. Any suitable number of address keys may be used in a system for achieving domain isolation, based on particular needs and implementations. In some implementations, the same address key may be assigned to all domains in a container and used to encrypt and decrypt a portion of the encoded indirect addresses that reference code and data associated with all of the domains. In some implementations, the same address key may be assigned to all applications in the system or a subset of applications in the system. In other implementations, a unique address key may be assigned to each domain in a container or to a subset of domains in a container.

On (or during) a memory allocation operation (e.g., a "malloc"), a range of memory for a buffer is allocated, a pointer (indirect address) is returned along with the metadata (e.g., one or more of domain ID, range, permission metadata, power size, memory allocation size, type, location, ownership, version, tag, privilege level, crypto context ID, etc.). In one example, the memory allocation operation may encode plaintext range information (or power size metadata) and a domain ID in the indirect address 114 (e.g., in the unused/non-canonical bits, prior to encryption), or supply the metadata as one or more separate parameters to the instruction, where the parameter(s) specify power size, domain ID, and possibly other metadata such as the range, code permission information, memory allocation size, type, location, ownership, version, tag, privilege level (e.g., user or supervisor), crypto context ID, or some suitable combination thereof. Illustratively, the memory allocation operation logic may be embodied in the privileged system component 140. The memory allocation operation causes the indirect address 114 to be encoded with the metadata (e.g., power size, domain ID, and possibly other metadata such as range, permission metadata, memory allocation size, type, location, ownership, version, tag value, privilege level, crypto context ID, some suitable combination thereof, etc.). The metadata may be stored in an unused portion of the indirect address 114 (e.g., non-canonical bits of a 64-bit address). For some metadata or combinations of metadata, the indirect address 114 may be encoded in a larger address space (e.g., 128-bit address, 256-bit address) to accommodate the size of the metadata or combination of metadata.

To determine valid range metadata, example range rule logic selects the valid range metadata to indicate an upper limit for the size of the buffer referenced by the indirect address 114. Address adjustment logic adjusts the valid range metadata as needed so that the upper address bits (e.g., most significant bits) of the addresses in the address range do not change as long as the indirect address 114 refers to a memory location that is within the valid range indicated by the range metadata. This enables the indirect address 114 to be manipulated (e.g., by software performing arithmetic operations, etc.) but only so long as the manipulations do not cause the indirect address 114 to go outside the valid range (e.g., overflow the buffer).

In an embodiment, address encoding logic 152 uses the valid range metadata to select a portion (or slice) of the indirect address 114 to be encrypted. In other embodiments, the slice of the indirect address 114 to be encrypted may be known a priori (e.g., upper 16 bits, upper 32 bits, upper 24 bits, etc.). The address encrypting logic 153 encrypts the selected slice of the indirect address 114 (and the adjustment in some embodiments) using an address key (e.g., secret keys 116(1)-116(N)) and an address tweak, as described further below. On a memory access operation (e.g., a read, write, or execute operation), the address decoding logic 154 decodes the encoded indirect address. To do this, the encrypted slice of the encoded indirect address (and in some embodiments, the encrypted adjustment) is decrypted using the address key (e.g., secret keys 116(1)-116(N)) and the address tweak, as described further below. Domain metadata (e.g., domain ID) and/or potentially other metadata encoded in the encoded indirect address may also be encrypted and decrypted along with the slice of the indirect address 114.

The indirect address 114 is returned to its original (e.g., canonical) form, based on appropriate operations in order to restore the original value of the indirect address 114 (e.g., the true, original linear memory address). Encrypted metadata encoded in the indirect address 114 can also be returned to its original unencrypted form (e.g., domain ID). To do this in at least one possible embodiment, address decrypting logic 155 decrypts the encrypted slice of the indirect address 114 and the encrypted metadata (e.g., domain ID) encoded in the indirect address 114. The address metadata encoded in the unused bits of the indirect address 114 are removed (e.g., return the unused bits to their original form). If the encoded indirect address decodes successfully, the memory access operation completes successfully. However, if the encoded indirect address has been manipulated (e.g., by software, inadvertently or by an attacker) so that the value of the indirect address falls outside the valid range indicated by the range metadata (e.g., overflows the buffer), the indirect address 114 may be corrupted as a result of the decrypting process performed by the address decrypting logic 155. A corrupted indirect address will raise a fault (e.g., a general protection fault or a Page Fault if the address is not mapped as present from the paging structures/page tables). One condition that may lead to a fault being generated is a sparse address space. In this scenario, a corrupted address is likely to land on an unmapped page and generate a page fault. Even if the corrupted address lands on a mapped page, it is highly likely that the authorized tweak or initialization vector for that memory region is different from the corrupted address that may be supplied as a tweak or initialization vector in this case. In this way, the computing device 100 provides security against buffer overflow attacks and similar exploits.

Embodiments described herein implement cryptographic computing to enable encryption of code and data in cache 118 and memory 120, where the encryption is bound to an object pointer (e.g., encoded indirect address). To provide object granularity of memory encryption, a tweak is derived from a cryptographically encoded pointer to affect the data/code encryption per object allocation. For data encryption, the data tweak may have various representations. Heap memory where data is stored is shared between all the threads of a process. Although multiple domains of a process share the heap memory, respective data of the domains can be encrypted differently. In one example, data keys for encrypting heap data may be changed when switching domains. In this scenario, the data tweak may be any suitable tweak derived, at least in part, from the encoded pointer (e.g., entire encoded pointer or a portion thereof that includes mutable bits 508) and possibly other metadata associated with the memory allocation. Other metadata that may be included in the data tweak could include, but is not limited to allocation size, location, type, version, etc. or any suitable combination thereof. When different keys are used to encrypt data in different domains, the encoded pointers to the data may not include a domain ID. Alternatively, when the same key is used for data encryption across different domains, an encoded pointer of heap data may include a domain ID. A heap data tweak in this scenario may include, for example, size (power) metadata, a domain ID, and fixed address bytes (e.g., immutable plaintext portion 506 and/or upper address bits 504). For other types of data that are loaded per-module and may use RIP-relative accesses, (e.g., read-only global data (.rodata section), read-write global data (.data and .bss sections)), domain ID may be incorporated in the tweak. For code encryption, the code tweak may include a domain ID, size (power) metadata, and location information of the targeted code (e.g., relative position of the code such as a byte offset of a targeted code block within the slot to which the memory allocation is assigned). For data encryption, the data tweak may have different configurations depending on the type of data that is being encrypted, as will be further described herein.

Embodiments using cryptographic computing as described herein provide a stateless mechanism for object granular data and code encryption in multi-tenant applications, including for code and data associated with short-lived software components such as FaaS functions, microservices, and browser components. Embodiments achieve a zero touch, legacy compatible solution that inherently provides code and data separation among mutually untrusted domains while preserving performance and latency. Additionally, to provide low overhead domain isolation, domain metadata is encoded in the code and data pointers (indirect addresses) and, when switching between domains, only cryptographic state is updated instead of expensive process context switching. Thus, switching from one domain to another in the disclosed embodiments is very efficient. Also, by incorporating domain metadata (e.g., domain identifier) in the pointer, the cryptographic computing system enables zero-copy, object-granular communications between domains. Since embodiments enable the trusted computing base (TCB) to exclude guest/host operating systems and virtual machine managers, legacy binary compatibility can be maintained.

Referring now in more detail to FIG. 1, the computing device 100 may be embodied as any type of electronic device for performing the functions described herein. For example, the computing device 100 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein. In some implementations, computing device 100 may be disaggregated into, for example, compute resources (e.g., processor 102), memory resources (e.g., memory 104, storage 128), and/or network resources (e.g., network interface card, wireless network interface card, communication subsystem 132). In at least some scenarios, disaggregated resources used to provide cryptographic computing isolation for multi-tenancy and secure software components may be provided by a cloud computing platform.

The computing device 100 also includes memory 120, an input/output subsystem 124, a data storage device 126, a display device 128, a user interface (UI) subsystem 130, a communication subsystem 132, at least one user space application 134 that includes one or more software components 135, and the privileged system component 140 (which, illustratively, includes key creation module 148). The computing device 100 may include other or additional components, such as those commonly found in a mobile and/or stationary computers (e.g., various sensors and input/output devices), in other embodiments. Additionally, in some embodiments, one or more of the example components may be incorporated in, or otherwise form a portion of, another component. Each of the components of the computing device 100 may be embodied as software, firmware, hardware, or a combination of software and hardware.

The processor 102 may be embodied as any type of processor capable of performing the functions described herein. For example, the processor 102 may be embodied as a single or multi-core central processing unit (CPU), a multiple-CPU processor or processing/controlling circuit, or multiple diverse processing units or circuits (e.g., CPU and Graphics Processing Unit (GPU), etc.). The processor 102 has a number of registers 110, which include general purpose registers and special purpose registers. The indirect address 114 and the secret keys 116(1)-116(N) are stored in registers 110. Processor 102 may also include cache 118, which may be L1 and/or L2 cache for example, where data is stored when it is retrieved from memory 120 in anticipation of being fetched by processor 102.

The memory 120 of the computing device 100 may be embodied as any type of volatile or non-volatile memory or data storage capable of performing the functions described herein. In operation, the memory 120 may store various data and code of software components (e.g., applications, programs, libraries, etc.) used during operation of the computing device 100, as well as operating systems, other system software, and drivers. Memory 120 may store data and/or code, which includes sequences of instructions that are executed by the processor 102. In some embodiments, the memory 120 may be located on one or more integrated circuit chips that are distinct from an integrated circuit chip comprising processor 102 or may be located on the same integrated circuit chip as the processor 102. Memory 120 may comprise any suitable type of memory and is not limited to a particular speed or technology of memory in various embodiments.

The memory 120 is communicatively coupled to the processor 102, e.g., via the I/O subsystem 124. The I/O subsystem 124 may be embodied as circuitry and/or components to facilitate input/output operations with the processor 102, the memory 120, and other components of the computing device 100. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 102, the memory 120, and/or other components of the computing device 100, on a single integrated circuit chip.

The data storage device 126 may be embodied as any type of physical device or devices configured for short-term or long-term storage of data such as, for example, memory devices and circuits, memory cards, hard disk drives, solid-state drives, flash memory or other read-only memory, memory devices that are combinations of read-only memory and random access memory, or other data storage devices. In various embodiments, memory 120 may cache data that is stored on data storage device 126.

The display device 128 may be embodied as any type of display capable of displaying digital information such as a liquid crystal display (LCD), a light emitting diode (LED), a plasma display, a cathode ray tube (CRT), or other type of display device. In some embodiments, the display device 128 may be coupled to a touch screen or other human computer interface device to allow user interaction with the computing device 100. The display device 128 may be part of the user interface (UI) subsystem 130. The user interface subsystem 130 may include a number of additional devices to facilitate user interaction with the computing device 100, including physical or virtual control buttons or keys, a microphone, a speaker, a unidirectional or bidirectional still and/or video camera, and/or others. The user interface subsystem 130 may also include devices, such as motion sensors, proximity sensors, and eye tracking devices, which may be configured to detect, capture, and process various other forms of human interactions involving the computing device 100.

The computing device 100 further includes a communication subsystem 132, which may be embodied as any communication circuit, device, or collection thereof, capable of enabling communications between the computing device 100 and other electronic devices. The communication subsystem 132 may be configured to use any one or more communication technologies (e.g., wireless or wired communications) and associated protocols (e.g., Ethernet, Bluetooth™, Wi-Fi™, WiMAX, 3G/LTE, etc.) to effect such communication. The communication subsystem 132 may be embodied as a network adapter, network interface card (NIC), wireless network adapter, wireless NIC, smart NIC, etc.

The example computing device 100 also includes a number of computer program components, such as one or more user space applications (e.g., user space application 134) and the privileged system component 140. The user space applications may be embodied as any computer applications (e.g., software, firmware, hardware, or a combination thereof) that interact directly or indirectly with an end user via, for example, the display device 128 or the UI subsystem 130. Some examples of user space applications include word processing programs, document viewers/readers, web browsers, electronic mail programs, messaging services, computer games, camera and video applications, etc. Among other things, the privileged system component 140 facilitates the communication between the user space applications (e.g., user space application 134) and the hardware components of the computing device 100. Portions of the privileged system component 140 may be embodied as any operating system capable of performing the functions described herein, such as a version of WINDOWS by Microsoft Corporation, ANDROID by Google, Inc., IOS by Apple, Inc., and/or others. Alternatively or in addition, a portion of the privileged system component 140 may be embodied as any type of virtual machine monitor capable of performing the functions described herein (e.g., a type I or type II hypervisor).

The example privileged system component 140 includes a number of computer program components, such as the memory manager module 144 and the key creation module 148. Each of the components of the privileged system component 140 be embodied as software, firmware, hardware, or a suitable combination thereof. For example, the components of the privileged system component 140 may be embodied as modules of an operating system kernel, a virtual machine monitor, or a hypervisor. Furthermore, privileged system component 140 may be part of a trusted execution environment (TEE), virtual machine, processor 102, a co-processor (not shown), or any other suitable hardware, firmware, or software in computing device 100 or securely connected to computing device 100.

The memory allocation logic 146 of memory manager module 144 can allocate portions of memory 120 to the various processes running on the computing device 100 (e.g., as ranges of virtual memory addresses). The memory deallocation logic 147 of memory manager module 144 can release/deallocate portions of memory 120 that are allocated to the various processes running on the computing device 100. The memory manager module 144 is embodied as, for example, a loader, a linker-loader, a memory manager service, or a heap management service.

The key creation module 148 creates the secret keys 116(1)-116(N) (e.g., secret address keys, secret code keys, and secret data keys) and writes them to a register or registers to which the processor 102 has read access (e.g., a special purpose register). To create a secret key, the key creation module 148 may execute, for example, a random number generator, deterministic number generator, or another algorithm capable of generating a secret key that can perform the functions described herein. It should be noted that a myriad of approaches could be used to generate or obtain a key for embodiments disclosed herein. For example, although the key creation module 148 is shown as being part of computing device 100, one or more secret keys could be obtained from any suitable external source using any suitable authentication processes to securely communicate the key to computing device 100, which may include generating the key as part of those processes. Moreover, the key may be "secret", which is intended to mean that its value is kept hidden, inaccessible, obfuscated, or otherwise secured from unauthorized actors (e.g., software, firmware, machines, extraneous hardware components, and humans).

Figure 2A:
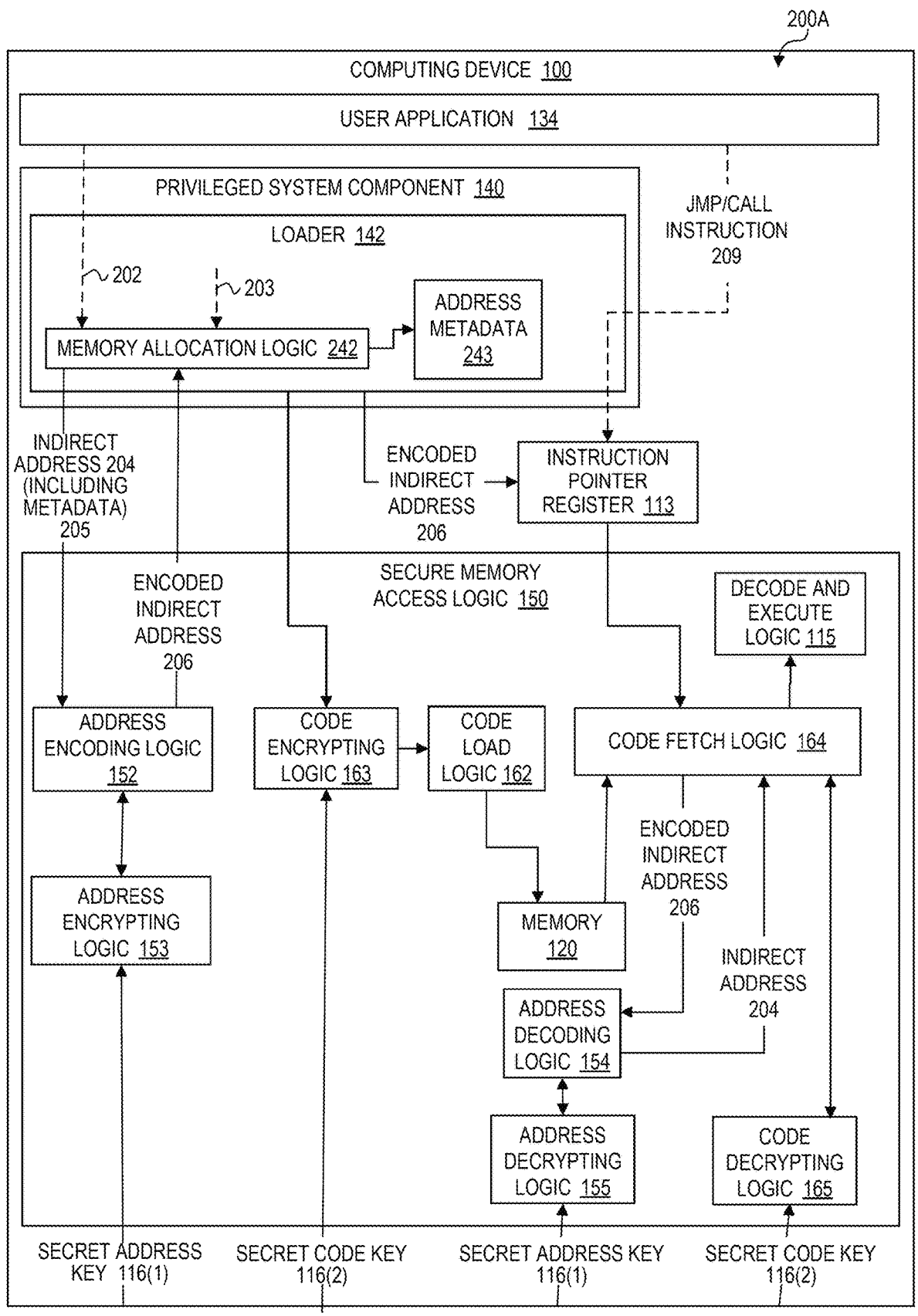
FIG. 2A is a simplified environment diagram illustrating an application of the secure memory access logic of FIG. 1 according to at least one embodiment.

FIG. 2A is a simplified environment diagram illustrating an application of the secure memory access logic 150 of FIG. 1 for accessing program code according to at least one embodiment of the present disclosure. In some embodiments, the computing device 100 may establish an environment 200A during operation (e.g., load time environment, native and/or virtual runtime or "execution" environments). The various modules depicted in the example environment 200A may be embodied as hardware, firmware, software, or a combination thereof. In the environment 200A, the privileged system component 140 (e.g., memory allocation logic 242 of loader 142) may, from time to time, during the operation of the computing device 100, allocate memory for program code. Loader 142 may be used to allocate physical pages for a process and map the pages to virtual/linear address space of the process. Generally, loader 142 (also referred to as 'loader module') is intended to represent a program of an operating system that allocates memory space in main memory for executables, loads the executables into the allocated memory space, and transfers control to the beginning instruction. Loader 142 may be embodied as, and is intended to represent, just a loader, a linker-loader, or any other program that performs at least the functionalities of loader 142 as described herein. In some examples, the memory allocation logic 242 of loader 142 may perform a memory allocation 203 during load time in loading a user space application 134 (including one or more software components 135) for execution, or a memory allocation 202 during runtime in dynamically loading other software components (e.g., called function or shared library) for execution.

The privileged system component 140 (e.g., loader 142) may, from time to time during operation of the computing device 100, encrypt and load program code into memory 120 or cache 118, which may be handled by the processor 102 as a processor instruction that reads from a register 110 (or other storage unit), performs the encryption operations, and writes to memory 120 or cache 118. In one example, once memory is allocated for code, loader 142 may cause the program code to be encrypted (e.g., by code encrypting logic 163) and loaded (e.g., by code load logic 162) into an appropriate memory region (e.g., code segment or text segment of linear/virtual address space for the process). Loader 142 may perform code encryption (e.g., code encrypting logic 163) using a code tweak and secret code key 116(2) to encrypt the program code to be loaded in memory. The code tweak may be derived, at least partially, from address metadata 243 generated or otherwise obtained by the loader 142 during the loading of an application. For example, the address metadata that is generated or otherwise obtained can include domain metadata (e.g., domain ID) uniquely identifying the program code (e.g., user space application 134) or uniquely identifying a thread in which the program code is executing, and size metadata that indicates the size (e.g., in a power of two encoding) of a memory slot selected for the memory allocation. In addition, an offset of the memory allocation within the memory slot may be calculated and used as part of the code tweak.

The privileged system component 140 (e.g., loader 142) can execute the address encoding logic 152 to encode an indirect address to the encrypted code, which may be executed in response to the memory allocation and/or loading the encrypted code into memory (e.g., in place of a conventional memory allocation operation by a loader during load time for statically loading program code, or during runtime for dynamically loading a software component). Whereas a conventional memory allocation operation for program code (e.g., during load time or runtime) simply allocates memory and generates an (unsecured) pointer, the address encoding logic 152 encodes an indirect address 204 (e.g., a pointer containing a memory address), including metadata 205 (e.g., domain ID and power size metadata of a memory slot, and optionally other metadata such as the range permission information, memory allocation size, type, location, version, tag, privilege level, crypto context ID or key, or any combination thereof, etc.), as described herein, and generates an encoded indirect address 206. The metadata may be embedded in the encoded indirect address or pointer (e.g., a standard 64-bit register or enlarged register such as 128 bits or 256 bits to fit more metadata) in a plaintext format, embedded within another operand that is provided to the pointer encryption/decryption instructions and data access instructions, stored in a control register, stored in a table in memory, or provided via any combination thereof. For example, in one or more embodiments, the power size metadata and domain ID may be embedded in the pointer.

Additionally, in at least some embodiments, a portion of the encoded indirect address 206 is encrypted. For example, address encrypting logic 153 can be executed using an address key 116(1) and an address tweak to encrypt the embedded domain ID (and any other embedded metadata) and upper address bits of the linear address. The address tweak may include power size metadata (e.g., of the memory slot) and lower address bits of the linear address. The loader 142 can make the encoded indirect address 206 (a portion of which may be encrypted) available to processor 102 by causing the encoded indirect address to be stored in the processor's program counter register (e.g., an instruction pointer register (RIP) 113, where RIP is the instruction pointer register in 64-bit code). This may occur by invoking a control transfer instruction (e.g., JMP) to load the encoded indirect address 206 to begin execution at the start of the encrypted code.

During runtime, the processor 102 (e.g., a core or central programming unit (CPU) of the processor) may invoke code fetch logic 164 for each new encoded indirect address stored in instruction pointer register 113. In one example, the code fetch logic 164 may be performed in response to the CPU detecting a new encoded indirect address with cryptographic computing code encryption enabled (e.g., mode-specific register (MSR) bit set or any suitable indicator) is stored the instruction pointer register 113. The code fetch logic 164 causes the code to be fetched (from code/text segment memory) after successfully executing the address decoding logic 154 to decode the encoded indirect address 206 in instruction pointer register 113. Successful execution of address decoding logic 154 is based on successful execution of address decrypting logic 155, which uses an address tweak and secret address key 116(1) to decrypt the encrypted slice (ciphertext) of the encoded indirect address 206 to produce the indirect address 204, which is decoded and decrypted.

Once the indirect address 204 is obtained and memory 120 is accessed to fetch code at the memory location pointed to by the indirect address 204, the code may be decrypted by code decrypting logic 165 using a code tweak and secret data key 116(2). Successful decryption depends, at least in part, on whether the portions of the metadata (e.g., power size, domain ID, offset of code within memory slot) used to create the code tweak correspond to the original allocation of the memory location pointed to by the indirect address.

It should be understood that the address decoding logic 154 and address decrypting logic 155 can be incorporated into the instruction logic (e.g., of an instruction set architecture) or can be embodied as a separate set of instructions or multiple sets of instructions. Further, it should be understood that the address decoding logic 154 and address decrypting logic 155 can be incorporated into or referenced by other types of instructions. For example, control transfer instructions such as CALL and JMP in the program code (e.g., JMP/CALL instruction 209) can cause the encoded pointer address for the code to be executed to be loaded into the RIP 113. In one or more embodiments, the loader 142 encodes the instruction pointer to the called software component when the control transfer instruction is invoked, for example. The encoded instruction pointer is stored in RIP 113. The RIP 113 can then be queried by a program and as a result, the current program counter address will be the encoded form (offset to the current program counter location).

If the address decoding logic 154 successfully decodes the encoded indirect address 206, which includes the successful decryption of the encrypted ciphertext in the encoded indirect address, the original indirect address 204 is generated and an encrypted code block can be fetched from memory. Code decrypting logic 165 can decrypt the encrypted code block. An instruction (e.g., the first instruction) in the decrypted code block can be decoded and executed by decode and execute logic in the processor pipeline Thus, program execution begins at the new program counter location (in the case of control flow changes). If the encoded indirect address 206 does not successfully decode, a fault is raised. Based on the successful completion or failure of code load logic 162, an appropriate verification or fault signal is returned to the loader 142. Similarly, based on the successful completion or failure of code fetch logic 164, an appropriate verification or fault signal may be returned to the user space application 134.

Figure 2B:
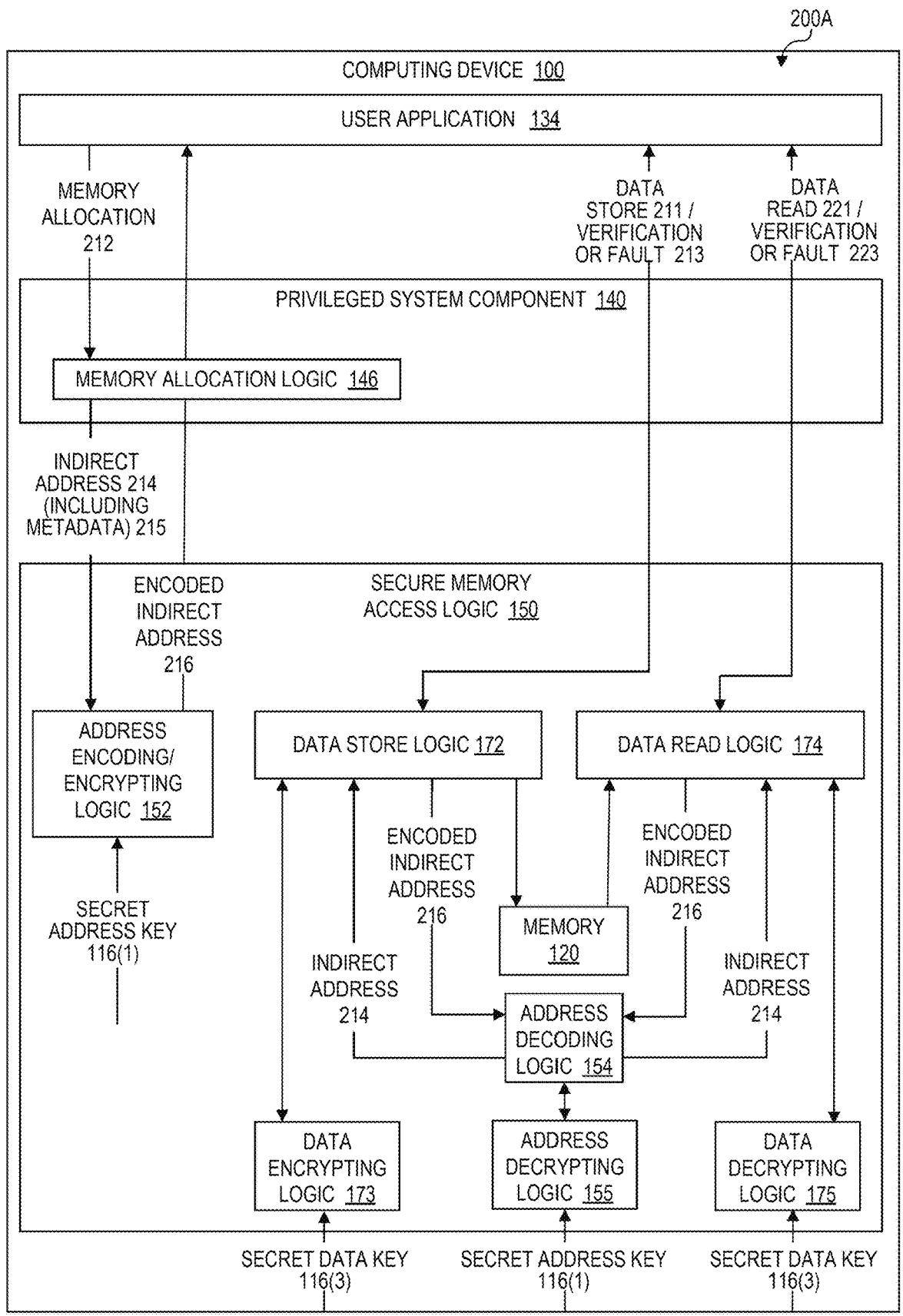
FIG. 2B is a simplified environment diagram illustrating another application of the secure memory access logic of FIG. 1 according to at least one embodiment.

FIG. 2B is a simplified environment diagram illustrating another application of the secure memory access logic 150 of FIG. 1 for data according to at least one embodiment of the present disclosure. In some embodiments, the computing device 100 may establish an environment 200B during operation (e.g., native and/or virtual runtime or "execution" environments). The various modules depicted in the example environment 200B may be embodied as hardware, firmware, software, or a combination thereof.

In the environment 200B, the user space application 134 (or the privileged system component 140, e.g., in loading a user space application 134) may, from time to time, during the operation of the computing device 100, issue a memory allocation 212. In some examples, the memory allocation 212 may be an explicit memory allocation in a program (e.g., for dynamic memory allocation) and may be translated (e.g., compiled or interpreted), as needed, by memory allocation logic 146 of the privileged system component 140 before being passed on to the processor 102. In other scenarios, the memory allocation may be an implicit request for memory by a certain instructions in a program. For example, calling a function that needs stack memory for local variables, passing parameters to a function, declaring local variables may be implicit requests for memory to be allocated in stack for the particular object(s) or data element(s) needing to be stored (e.g., return address for calling a function, passed parameter, local variable data).

In the processor 102, the address encoding logic 152 is executed in response to the memory allocation 212 (e.g., in place of a conventional "malloc" instruction/function call for dynamic memory allocation, or in place of implicit memory allocation operations for stack). To generate an encoded indirect address for data, the address encoding logic 152 and address encrypting logic 153 may be performed as previously described herein.

The user space application 134 or the privileged system component 140 may issue a data store 211 from time to time, which may be handled by the processor 102 as a processor instruction that reads from a register 110 (or other storage unit) and writes to memory 120 or cache 118 using an indirect address (e.g., a STORE, MOV instruction, declaration or assignment of a variable). Using the STORE instruction as an example, the data store logic 172 causes the data to be stored (in heap or stack) after successfully executing data encrypting logic 173 and address decoding logic 154. Successful execution of address decoding logic 154 is based on successful execution of address decrypting logic 155, which uses an address tweak and secret address key 116(1) to decrypt the encrypted slice (ciphertext) of the encoded indirect address 216 to produce the indirect address 214, which is decoded and decrypted. Data encrypting logic 173 uses a data tweak and secret data key 116(3) to encrypt the data to be stored at a memory location pointed to by the indirect address 214. The data tweak may be derived from the decoded indirect address 214.

Similarly, the user space application 134 or the privileged system component 140 may issue a data read 221 from time to time, which may be handled by the processor 102 as a processor instruction that reads from memory 120 (e.g., heap for load, stack for pop) and writes to a register 110 using an indirect address (e.g., a LOAD, MOV, or POP instruction, arithmetic instructions with memory operands, etc.). Using the LOAD instruction as an example, the data read logic 164 causes the encrypted data to be loaded (from heap or stack) after successfully executing the address decoding logic 154 to decode the encoded indirect address 216 to generate the original indirect address 214. Once the indirect address 214 is obtained and memory 120 is accessed to load the encrypted data from the memory location pointed to by the indirect address 214, the encrypted data may be decrypted by data decrypting logic 175 using a data tweak and secret data key 116(3). Successful decryption depends, at least in part, on whether the portions of the metadata (e.g., power size, domain ID, offset of code within memory slot) used to create the data tweak, correspond to the original allocation of the memory location pointed to by the indirect address.

If the address decoding logic 154 successfully decodes the encoded indirect address 216, which includes the successful decryption of the encrypted ciphertext in the encoded indirect address, the original indirect address 214 is returned to the privileged system component 140 and the memory access is completed. If the encoded indirect address 216 does not successfully decode, a fault is raised. Based on the successful completion or failure of data store 211, an appropriate verification or fault signal 213 is returned to the user space application 134. Similarly, based on the successful completion or failure of data read 221, an appropriate verification or fault signal 223 is returned to the user space application 134.

Figure 3:
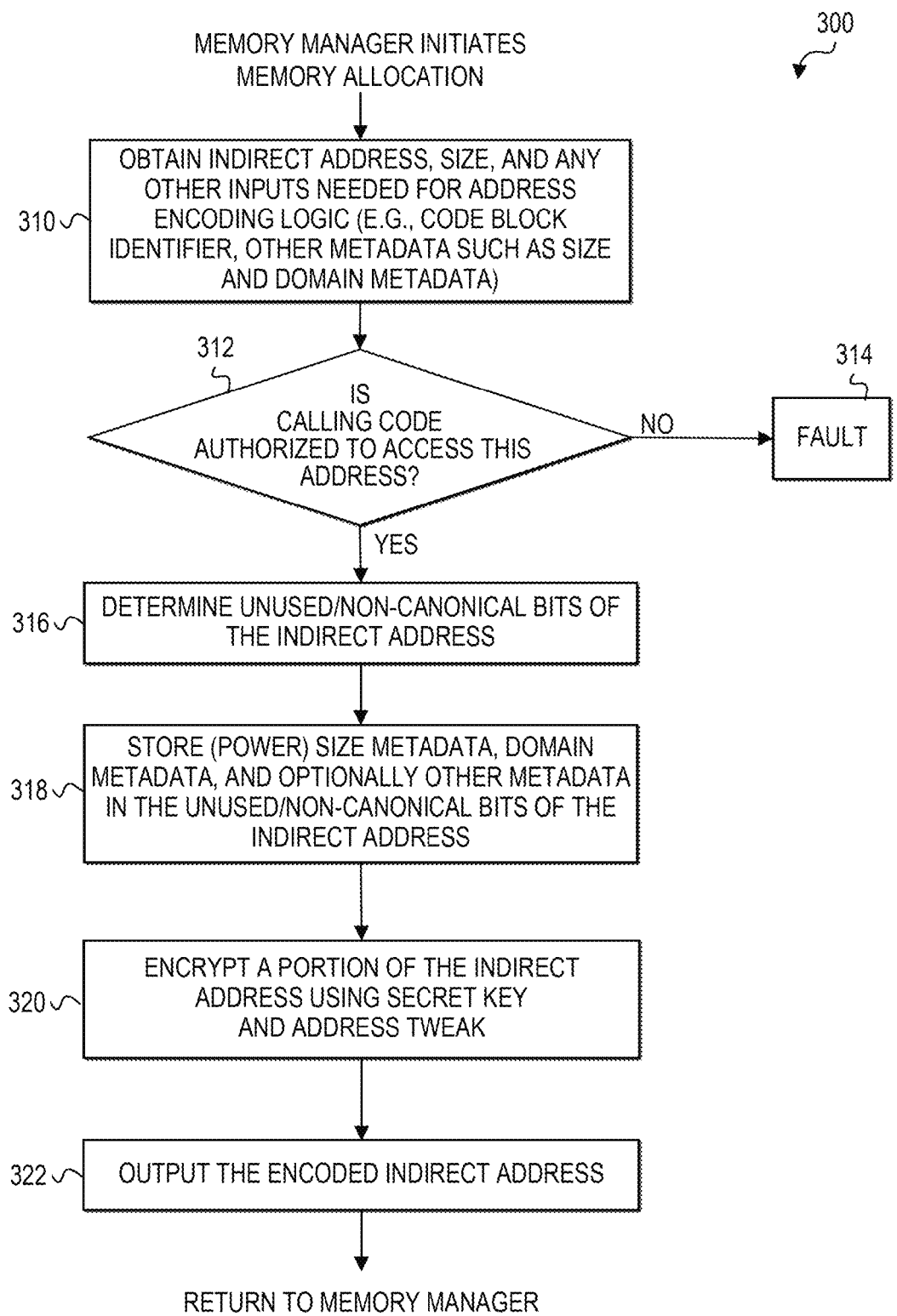
FIG. 3 is a simplified flow diagram of at least one embodiment of a process for providing security for an indirect address according to at least one embodiment.

Referring now to FIG. 3, an example process 300 for securing an indirect address is shown. Portions of the process 300 may be executed by hardware, firmware, and/or software of the computing device 100 (e.g., by the processor 102 executing the address encoding logic 152 and address encrypting logic 153). The process 300 begins in response to a memory allocation (e.g., by a memory manager module). In block 310, the computing device 100 obtains the indirect address, size of memory to be allocated, and other inputs needed to encode the indirect address (e.g., a code block identifier, size of slot to which memory allocation is assigned, domain metadata, and/or optionally other metadata such as tag/version metadata, etc.).

In block 312, the computing device 100 determines whether the calling code (e.g., the code initiating the memory allocation) is authorized to access the indirect address received in block 310 (e.g., indirect address 204). To do this, the computing device 100 may perform an access control check by verifying the instruction pointer or caller privilege level information for the calling code, which may be obtained from, for example, a heap manager of the memory manager module 144. If the computing device 100 determines that the calling code is not authorized to access the Indirect address, a fault is raised (314). If the computing device 100 determines that the calling code is authorized to access the indirect address, the computing device 100 proceeds to block 316.

In block 316, the computing device 100 determines the unused (e.g., non-canonical) address bits of the indirect address to perform the metadata encoding (e.g., size (power) metadata, domain metadata, etc.). To do this, the computing device 100 may simply use the higher (e.g., most significant) unused/non-canonical bits of the indirect address. It should be noted that the encoded addresses do not need to be architecturally non-canonical. Rather, the unused/non-canonical addresses can simply be a range of memory set aside by, for example, the privileged system component 140, to enable the address encoding as disclosed herein.

In block 318, the computing device 100 determines the metadata (e.g., size metadata and domain metadata) and stores the metadata in the unused/non-canonical bits of the indirect address selected in block 316. In block 320, the computing device 100 encrypts a portion of the linear address, where the portion of the linear address to be encrypted may be a pre-determined number of bits in the indirect address. In one-example, a 48-bit linear address may be stored in a 64-bit register. The portion (or slice) of the linear address to be encrypted may include the upper 16 bits in bit places 32-47 of the 48-bit address. In some embodiments, the domain metadata stored in some bits (e.g., 10 bits) of the unused/non-canonical bits of the indirect address is concatenated with the portion of the linear address to form a slice of the encoded indirect address to be encrypted. The slice of the encoded indirect address to be encrypted (e.g., domain metadata+upper linear address bits) may be padded with zeros if needed, for example, if a block cipher having a larger granularity than the slice of the encoded indirect address to be encrypted is used to perform encryption and decryption. Although this is one possible implementation that provides a suitable size for various block cipher encryption options, any other suitable number of bits may be pre-determined for encrypting and encoding in the indirect address based on particular needs and implementation details. Indeed, other block cipher configurations with different input sizes may be utilized and the size of the encrypted slice in the indirect address may be adjusted accordingly.

In embodiments, encryption of the selected slice of the encoded indirect address to be encrypted is performed based on a secret address key (e.g., secret address key 116(1)), and on at least the size metadata and lower linear address bits (e.g., bits 0-31) as an address tweak. In the illustrated embodiments, size metadata encoded in the indirect address would not be encrypted because the processor uses the encoded metadata as a tweak in the case of a tweakable block cipher (and thereby affects the encrypted bits). In at least one embodiment, the size metadata represents a value of an exponent in a power of two number that corresponds to the size (e.g., in bytes) of a slot in memory to which the memory allocation is assigned. In some embodiments, depending on the particular size of the register used for the indirect address, additional metadata may be encoded in the indirect address and also included in the encryption. For example, other data values that may be used in the address tweaks include, but are not necessarily limited to: data stored in the unused bits of the indirect address, the upper limit on the buffer size, an exponent of a two's power boundary selected as the upper limit on the buffer size, a code block identifier, instruction pointer data, permission information encoded in the metadata, version number (useful when reassigning/revoking pointers that were previously assigned to a program, tag/version may be maintained by the processor in a register), and/or other metadata described herein (e.g., plaintext address slice, size, memory allocation size, type, location, ownership, tag, privilege level, or any suitable combination thereof).

As used herein, a "tweak" may refer to, among other things, a second input to a block cipher, in addition to the usual plaintext or ciphertext input and the key (e.g., the secret key 116(1)-116(N)). In at least some embodiments, a tweak may compose all or part of an initialization vector (IV) for a block cipher. Encrypting the upper two canonical bits enables the computing device 100 to detect when the indirect address has been illegally changed, because the encryption algorithm can cause the illegally-changed upper bits to produce a random sequence of bits that are non-deterministic to an adversary, which likely results in a fault when the illegally-changed indirect address is used.

The portion of the encoded indirect address to be encrypted (e.g., the upper used/canonical bits and metadata stored in unused/non-canonical bits) is encrypted using a cipher mode encryption algorithm, such as a tweakable block cipher, using the size metadata and lower linear address bits in a tweak. Some examples of tweakable block ciphers include: XOR-encrypt-XOR (XEX), Liskov, Rivest, and Wagner (LRW), and XEX-based tweaked-codebook mode with ciphertext stealing (XTS), BipBip and K-Cipher. Other bit diffusion methods in which any single bit change in the cipher text results in changes across the entire decrypted plaintext can be used. If desired, alternative embodiments can trade off security for performance by using non-cryptographic methods that still achieve reasonable bit diffusion analogous to a block cipher.

The cipher selected for the encryption can be implemented in hardware, using an algorithm that has a bit-selectable or otherwise variable block size (e.g., any block cipher or similar diffusion algorithm with appropriate block sizes that may constructed to utilize a tweak), or an algorithm that allows a fixed block size with a tweak using the remaining unencrypted bits (e.g., the extra bits outside the fixed block size). A cipher that has a bit-selectable block size may accept as an input (in some cases, along with the plaintext to be encrypted) a bit-length parameter that specifies how many bits of the plaintext are to be encrypted. In some cases, the bit-length parameter specifies the same number of bits that are in the plaintext, and in other cases, the bit-length parameter specifies a number of bits in the plaintext less than the length of the entire plaintext. The cipher encrypts the plaintext bits using an encryption key (which may be of the same or different length from the bit-length parameter). In cases where the encryption key is longer than the bit-length parameter, a subset of the bits of the key equal to the bit-length parameter may be used in the cipher. The cipher encrypts as many bits from the plaintext as specified by the bit-length parameter using a sequence of logical operations that include at least two logical AND operations and two logical XOR operations. Each of the operations is performed both on the bits of the plaintext and on the bits of the key; that is, each of the operations is performed on at least one plaintext bit and at least one key bit. In this manner, both confusion and diffusion between the plaintext and the ciphertext may be achieved. This bit-length parameterizable cipher according to the present disclosure may be referred to as a K-cipher.

A K-cipher may also be configured to receive a tweak input so that encryption (and decryption) is based on the encryption key and the tweak input. For example, the tweak input may be added to a certain number of round keys in a key schedule generated by the K-cipher. The tweak input may have the same length as the round keys and may be configured in any suitable manner, including tweak inputs that are described herein with reference to various embodiments.

In some embodiments, the cipher has sufficient bit diffusion so that any bit change made to the encrypted address bits will equally affect (cascade through) all bit positions when decrypted. This provides the basis for a corrupted address given any change or bounds violation. Using this method, if the adversary attempts to tamper with the metadata (e.g., the domain metadata) the resulting decoded address will be corrupted. In the 64-bit address space, address corruption will result in a fault with high probability, thus allowing the address corruption (and pointer access or bounds violation) to be caught by the privileged system component 140 (e.g., an operating system/executive/VMM/ alternative mode/debug trace/management processor/subsystem, etc.).

The cipher tweak can be extended to include a code block identifier to provide access controls over which code blocks (e.g., blocks of the calling code) are permitted to use an indirect address/pointer to access memory. Additionally, instruction pointer (which may be referred to as the "program counter") information or ranges can be encoded as part of the pointer encryption tweak (also referred to herein as "address tweak"). The instruction pointer information can be used to limit the scope of what code can access what data. For example, all code can be arranged within fixed blocks of memory within the 64-bit address space. Code with similar access permissions can be grouped together in the same block or range. The address tweak can include the identifier for the block of memory from which an instruction is executing. In this way, code and data can be associated, and access controlled, such that an adversary coming from a different code block will not be able to access data of the protected block using the encrypted pointers, because the encrypted pointers will not decode properly if the wrong code block identifier is used as an address tweak. Further, when a block of code calls, e.g., malloc, to allocate memory to itself, malloc can return the encrypted address using the calling code's memory block to ensure private access to the allocated memory (so long as the allocated memory isn't freed and then reallocated to another code block). Alternatively, other methods of identifying the calling code can be used in the address tweak, such as protection keys. Still further, the metadata for read/write/execute access that is used by the processor 102 to control access to memory can be used as part of the address tweak for the encrypted address bits. Additionally, the instruction pointer may itself be represented as an encoded pointer (e.g., range-based). In this case, the metadata and encrypted address bits can be used as part of the "tweak" identifying the code block accessing a data pointer or requesting a memory allocation/ assignment. At 322, the encoded indirect address may be output and control returned to memory manager module 144.

Figure 4:
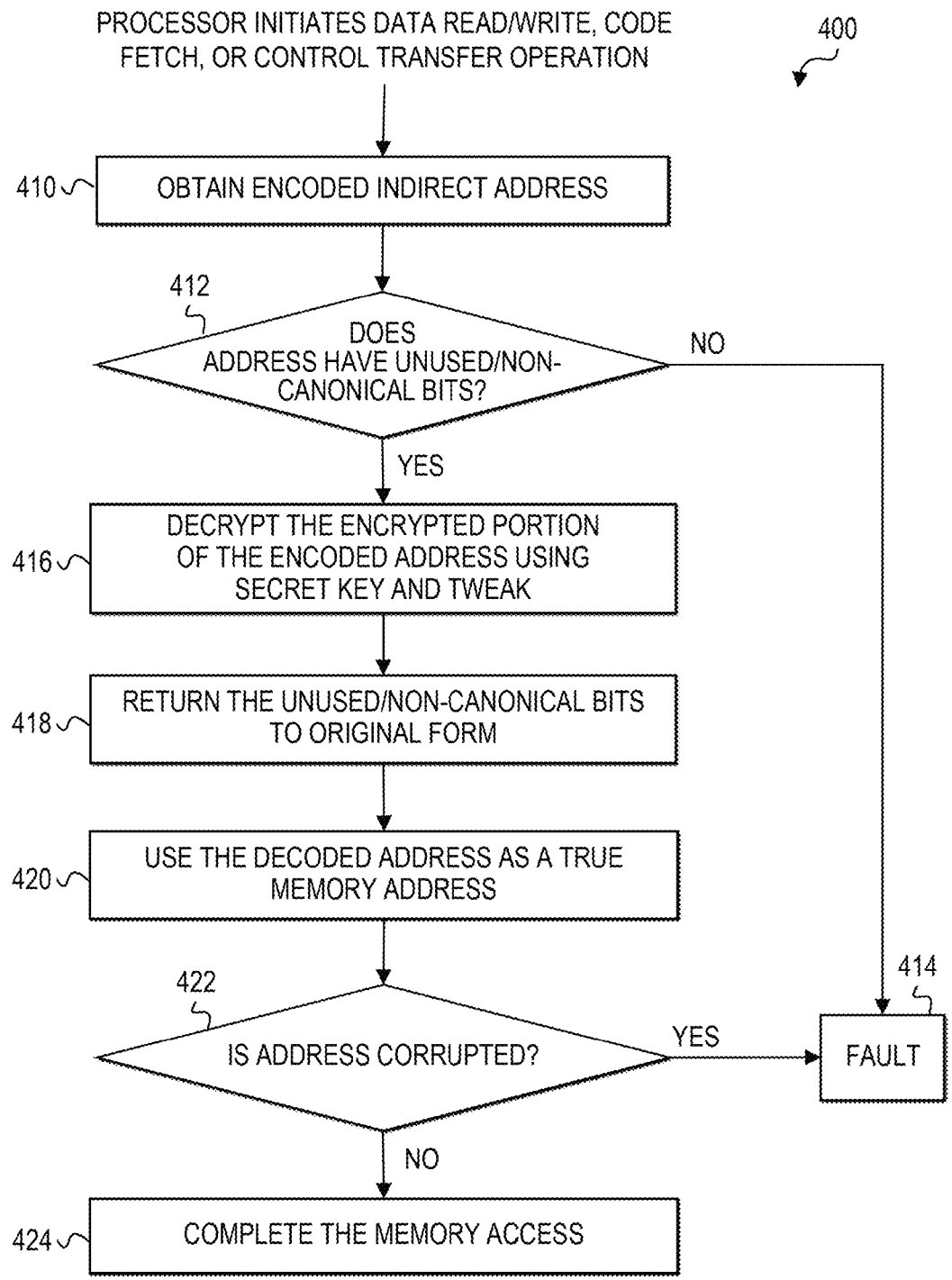
FIG. 4 is a simplified flow diagram of at least one embodiment of a process for verifying a previously secured indirect address according to at least one embodiment.

Referring now to FIG. 4, an example process 400 for decoding an encoded indirect address is shown. Portions of the process 400 may be executed by hardware, firmware, and/or software of the computing device 100 (e.g., by the processor 102 executing the address decoding logic 154 and address decrypting logic 155). The process 400 begins in response to a memory access operation such as a code fetch, read, write, e.g., a legacy MOV instruction. Of course, processor architectures may refer to the "MOV" functionalities by different names for the instructions or different options/parameters. As such, the disclosed embodiments apply to all types of "MOV," load, store, and code fetch functionalities across different architectures, irrespective of the terminology used to refer to such functionality. Further, the MOV instruction is an example, and any instruction that can request memory access to read/write data or to read/ access code can apply the address encoding and decoding methods disclosed herein.

In block 410, the processor 102 obtains the encoded indirect address (e.g., the encoded indirect address 206, which may be obtained from a register (e.g., encoded indirect address for code may be obtained from RIP 113, encoded indirect address for data may be obtained from another register). In block 412, the computing device 100 determines whether the encoded indirect address obtained in block 410 has unused bits set to non-canonical values. If the computing device 100 determines that the encoded address is canonical (e.g., the address doesn't fall within the non-canonical, or otherwise reserved, range of addresses, whether the address range is 32-bit, 64-bit, 128-bit or whatever range an alternate architecture may require), a fault is raised (414).

If the computing device 100 determines that the encoded address has unused/non-canonical bits (e.g., the address falls within the non-canonical or reserved address range), the process proceeds at block 416. In block 416, and the processor 102 decrypts the encrypted portion of the encoded indirect address, using the decryption algorithm counterpart of the encryption algorithm used in block 322 of FIG. 3, and using the same secret address key and address tweak as used by the encryption algorithm in block 322 of FIG. 3. An example process for decoding and decrypting the encoded indirect address having a domain-based format is shown and described herein with reference to FIG. 10C.

If the decrypted address contains unused/non-canonical bits, then in block 418, the processor 102 returns the decrypted indirect address to its original (e.g., canonical) form by, for example, removing the unused/non-canonical bits. In other examples, the unused/non-canonical bits may be set to the same value (e.g., all ones or all zeroes), or any other suitable value based on particular needs and implementations.

In block 420, the processor 102 uses the decoded address output by block 420 as a "true" (e.g., virtual or linear) memory address (e.g., as a pointer). In block 422, the processor 102 determines whether the decoded address used as a memory address/pointer at block 420 is a corrupted address. If the decoded address is corrupted, a fault is raised (414). If the decoded address is not corrupted, the processor 102 completes the memory access operation successfully, using the decoded address as a memory address/pointer, in block 424.

In one or more embodiments of process 400, invalid address values, domain metadata, and/or size metadata can be used to detect with some probability when corruption occurs. Even if corruption is not detected, the resulting address would not be deterministic (and therefore usable) to an adversary. Additional instructions can be added in cases in which the program code (or domain) itself can control its own pointers and ranges. These instructions may use a larger memory allocation size metadata as input, and may produce a smaller/equal size pointer (more restrictive) falling within the larger buffer's size if the code executing this instruction belongs to the domain that owns the original (superset) buffer pointer (which can be determined by the instruction pointer). For example, the memory manager module 144 can allocate the call stack and provide a large memory allocation size pointer to the call stack (e.g., for the stack pointer). Domains that are authorized to act on the call stack may then use this processor instruction to encode sub range pointers to buffers implicitly created on the stack. Compilers can automatically augment code to do this as stack operations are performed (local variables created, etc.), thus, protecting even individual data structures or individual variables on the stack. That is, the disclosed techniques enable encoding buffer sizes down to individual variable sizes (e.g., a 32-bit integer can be encoded as a pointer to a buffer of 4 bytes).

Figure 5:
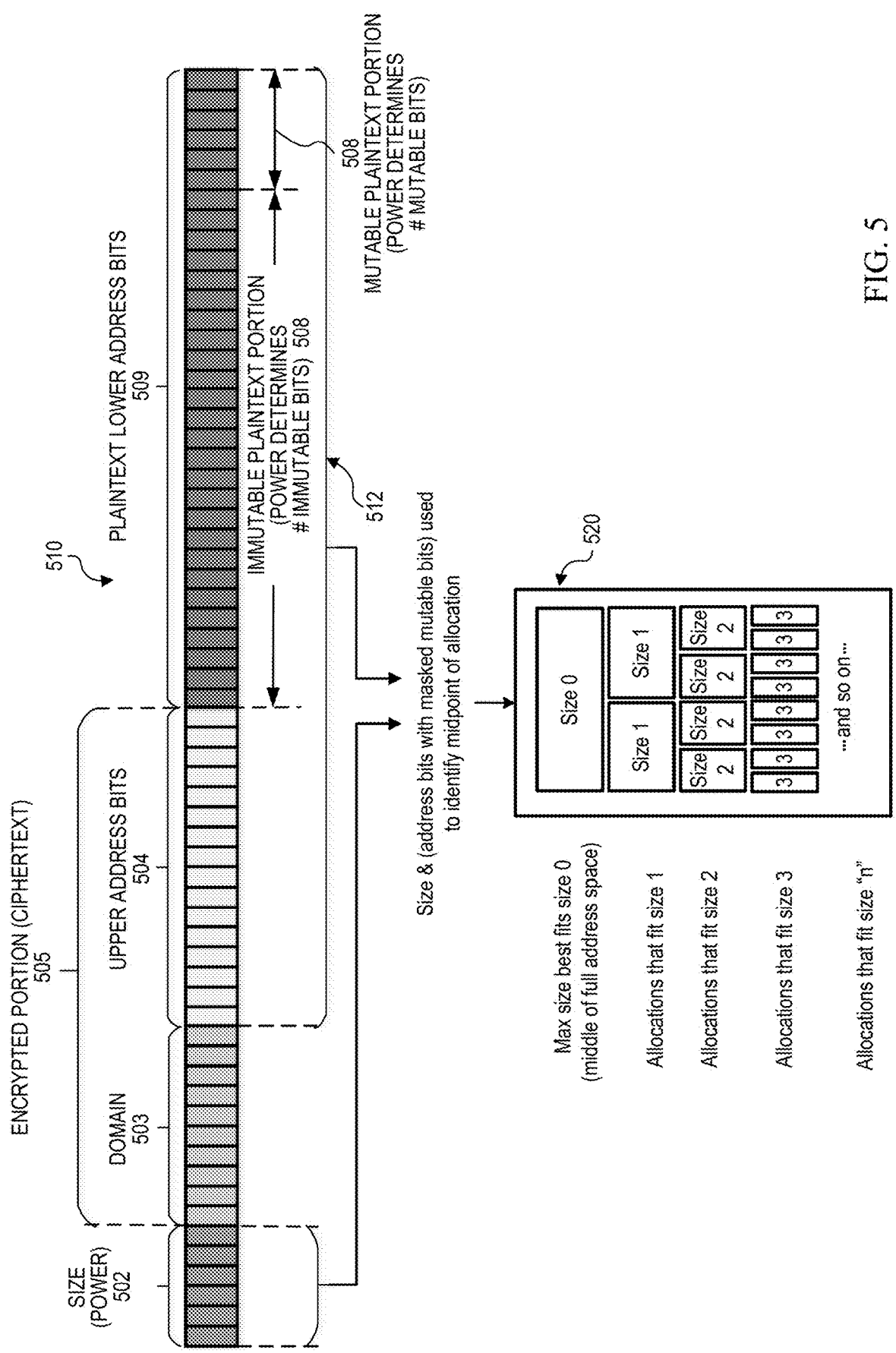
FIG. 5 is a diagram of an example cryptographically encoded pointer according to an embodiment.

Turning to FIG. 5, FIG. 5 is a diagram of an example pointer illustrating the contents of an unencrypted encoded pointer (no encryption) and a cryptographically encoded pointer (with encryption), according to at least one embodiment of the present disclosure. The term 'encoded pointer', as used herein, is applicable to both the unencrypted (or non-cryptographically) encoded pointer and the cryptographically encoded pointer. The encoded pointer 510 may be any bit size, such as, for example, a 64-bit pointer (as shown in FIG. 5), or a 128-bit pointer, or a pointer that is larger than 128-bits. The pointer, in one embodiment, may include a x86 architecture pointer. The encoded pointer 510 may include a greater (e.g., 128-bits), or lesser (e.g., 16-bits, 32-bits) number of bits. FIG. 5 shows a 64-bit pointer (address) in its base format, using exponent (power) size metadata but not an offset. The encoded pointer 510 is an example configuration of an encoded indirect address (e.g., 206A, 206B) and may be the output of the process 300 of FIG. 3, in some instances.

In the example shown, a linear address in the unencrypted encoded pointer includes an address field 512 with upper address bits 504 and plaintext lower address bits 509. Although in this example the upper address bits 504 include 16 bits, and the lower address bits 509 include 32 bits, it should be appreciated that the number of bits may vary for each portion based on particular needs, implementations, and architectures, especially when larger or smaller pointers are encoded (e.g., 32-bit pointer, 128-bit pointer, 256-bit pointer, etc.). The encoded pointer 510 includes a size metadata portion 502 indicating a size of a mutable plaintext portion 508 of the encoded pointer 510. A number of low order address bits that comprise the mutable plaintext portion (or offset) 508 of the encoded pointer 510 may be manipulated freely by software for pointer arithmetic. In some embodiments, the size metadata portion 502 may include power (exponent) metadata bits that indicate a size based on a power of two. Other embodiments may use a different power (exponent). For ease of illustration, encoded pointer 510 of FIG. 5 will be assumed to have a power of two (Po2) size metadata encoding, which may also be referred to herein as "power bits." Another metadata portion 503 can include a domain identifier or other information that uniquely identifies the domain associated with the pointer. The configuration of encoded pointer 510 may be particularly useful for code pointers of position independent code and possibly some data (e.g., read-only global data) associated with the position independent code. Pointers for other types of data may be encoded using any suitable combination of power metadata, a tag, version, size of the domain, or any other metadata previously described herein. Data pointers for data associated with position independent code will be further described herein at least with respect to FIGS. 14-20.

Some embodiments may encrypt additional pointer bits, e.g., the lower address bits and the power bits, or incorporate them into the tweak, to mitigate unauthorized modifications of those bits. For embodiments that use different pointer encryption keys for user and supervisor addresses, the key may be selected based on the current privilege level, since typical programs do not change the privilege level via branches. Some embodiments may include a canary field in code pointers that is expected to have a particular plaintext value. If the decrypted pointer does not have the expected plaintext canary value, that is evidence of pointer corruption that can be handled, e.g., via an exception.

Some embodiments may limit the range of the address space in which software components (e.g., position independent code) may be loaded to free up address bits to instead be used to encode other information. For example, software components could be limited to the lowest 2 GiB of the linear address space. However, this limitation can be lifted while still freeing up address bits by providing additional indirection through a table mapping domain IDs to process-specific, full-width software component base addresses to be looked up during calls and returns and used when setting the upper address bits of RIP. Such a table mapping, however, should not be used for setting the code encryption tweak, since that code should remain position-independent. Some embodiments may limit lookups in this table mapping to branches between software components (referred to herein as "inter-module branches"), e.g., via a Procedure Linkage Table (PLT), by providing a specialized inter-module branch instruction or indicating in the code pointer that it is an inter-module code pointer, e.g., via a pointer bit. Branches within software components (referred to herein as "intra-module branches") may retain the current upper address bits in RIP. Return addresses may be encrypted like forward code pointers. Return addresses may be separately protected using some other mechanism such as the mechanism shown and described with reference to FIG. 9, and not require additional encryption. In some embodiments, intra-module indirect branches could be left completely unencoded, in which case the processor may simply check that the module base in RIP matches the corresponding bits in the branch target, and generate an exception otherwise, and update the offset from the supplied code pointer. A CALL instruction could choose to encrypt the return address only when performing a cross-module CALL (as detected by an encrypted code pointer being supplied). However, encrypting all indirect branch targets strengthens Control Flow Integrity (CFI). If some code pointers are encrypted while others are left unencrypted, the canonical power values can be reserved to indicate unencrypted pointers and hence avoid ambiguity.

The size metadata portion 502 may indicate the number of bits that compose the immutable plaintext portion 506 and the mutable plaintext portion 508. In certain embodiments, the total number of bits that make up the lower address bits 509 (e.g., the immutable plaintext portion 506 and the mutable plaintext portion 508) may be constant (e.g., 32 bits in encoded pointer 510), with the sizes of the respective portions being dictated by the Po2 size metadata portion 502. For example, if the Po2 size metadata value is 0 (bits: 000000), no mutable plaintext bits are defined and all remaining lower address bits 509 form an immutable plaintext portion, which is used in a tweak to generate ciphertext portion 505 from an address slice (i.e., a subset of the linear address bits such as upper address bits 504) and possibly other metadata such as domain metadata 503. The ciphertext portion 505 is adjacent to and more significant than the lower address bits 509. As further examples, if the power size metadata value is 1 (bits: 000001), then a 1-bit mutable plaintext portion and a 31-bit immutable plaintext portion are defined, if the power size metadata value is 2 (bits: 000010), then a 2-bit mutable plaintext portion and a 30-bit immutable plaintext portion are defined, and so on, up to a 32-bit mutable plaintext portion with no immutable plaintext bits.

In the example of FIG. 5, the Po2 size metadata equals 6 (bits: 000110), resulting in a 6-bit mutable plaintext portion 508 and a 26-bit immutable plaintext portion 506. The mutable plaintext portion 508 may be manipulated by software, e.g., for pointer arithmetic or other operations. The ciphertext portion 505 (e.g., 32 bits in the example shown) of the encoded pointer 510 may be generated by a small tweakable block cipher (e.g., a SIMON, SPECK, or tweakable K-cipher at a 32-bit block size, or other variable bit size tweakable block cipher). The remaining plaintext lower address bits 509 (e.g., 32 bits in the example shown) can be used as part of the tweak for the tweakable block cipher used, along with a key, to generate the ciphertext portion 505 by encrypting the domain portion 503 and upper address bits 504. The immutable plaintext (non-encrypted) portion 506 of the address cannot be modified by software (e.g., pointer arithmetic) like the bits of mutable plaintext portion 508 without causing the ciphertext portion 505 to decrypt incorrectly. The base pointer format shown in FIG. 5 allows for cryptographically describing object sizes and their location in memory. In some cases, the Po2 size metadata portion 502 could be provided as a separate parameter in addition to the pointer; however, in some cases (e.g., as shown) the bits of the Po2 size metadata portion 502 may be integrated with the encoded pointer 510 to provide legacy compatibility in certain cases.

It should also be noted that in an alternative scenarios, the Po2 size metadata portion 502 may indicate the number of bits that compose the immutable plaintext portion 506, and thus dictate the number of bits remaining to make up the mutable plaintext portion 508. For example, if the Po2 size metadata value is 0 (bits: 000000), there are no immutable plaintext bits (in immutable plaintext portion 506) and all remaining lower address bits 509 form a mutable plaintext portion 508 and may be manipulated by software using pointer arithmetic. As further examples, if the Po2 size metadata value is 1 (bits: 000001), then there is a 1-bit immutable plaintext portion and a 31-bit mutable plaintext portion, if the Po2 size metadata value is 2 (bits: 000010), then there is a 2-bit immutable plaintext portion and a 30-bit mutable plaintext portion, and so on, up to a 32-bit immutable plaintext portion with no mutable plaintext bits where no bits can be manipulated by software.

Also, although encoded pointer 510 is illustrated and described based on using a 26-bit ciphertext portion 505, the pointer format is not intended to be so limited. The address slice to be encrypted may use any bit-size block encryption cipher. Thus, an encryption cipher using any other block size (e.g., 32, 16, variable, etc.), may be used instead. If the number of ciphertext bits is adjusted (upward or downward), the remaining address bits to be encoded (e.g., immutable and mutable portions) may be adjusted accordingly.

In yet further embodiments, the pointer may be encoded with metadata as described herein, but may not be encrypted. In this embodiment, additional metadata may be encoded in the pointer, such as tag or version metadata that comprises temporal safety bits. In this embodiment, the tag/version portion may be unique for each encoded pointer in a container and may be randomly or deterministically generated.

When a processor is running in a cryptographic mode and accessing memory using an encoded pointer such as encoded pointer 510, to get the actual linear/virtual address, the processor takes the encoded address format and decrypts the ciphertext portion (e.g., 505 of FIG. 5). Any suitable cryptography may be used and may optionally include as input a tweak derived from the encoded pointer. In one example, a tweak may include the plaintext lower address bits (e.g., 509 in FIG. 5) and a secret key. In some instances, the size/power/exponent metadata and/or other metadata or context information may be included as part of the tweak to a cryptographic algorithm to generate the ciphertext portion 505. In one or more embodiments, all of the plaintext lower address bits 509 may be used as part of tweak. If the address decrypts incorrectly, the processor may cause a general protection fault (#GP) or page fault due to the attempted memory access with corrupted linear/virtual address.

A graphical representation of a memory space 520 illustrates possible memory slots to which memory allocations for various encodings in the Po2 size metadata portion 502 of encoded pointer 510 can be assigned. Each address space portion of memory, covered by a given value of the plaintext corresponding to the upper address bits 504, contains a certain number of allocation slots (e.g., one Size 0 slot, two Size 1 slots, four Size 2 slots, etc.) depending on the width of the Po2 size metadata portion 502.

Referring still to FIG. 5, the size metadata portion 502, in combination with the information in the address fields (e.g., upper address bits 504 decrypted from ciphertext 505 and plaintext lower address bits 509 with masked mutable plaintext portion 508), can allow the processor to find the midpoint of a given slot defined in the memory space 520. For a power of two scheme, where the size field includes size exponent information, as the size exponent becomes larger (for larger slots, such as Size 0), fewer address bits are needed to identify a particular slot (since with larger slots, there will be fewer slots to identify). In such a case, more of the bits at the end of the pointer, in the mutable plaintext portion 508 (e.g., where pointer arithmetic can be performed), can be used to range within a given slot. The latter leads to a shrinking of the address field and an expanding of the pointer arithmetic field.

Figure 6:
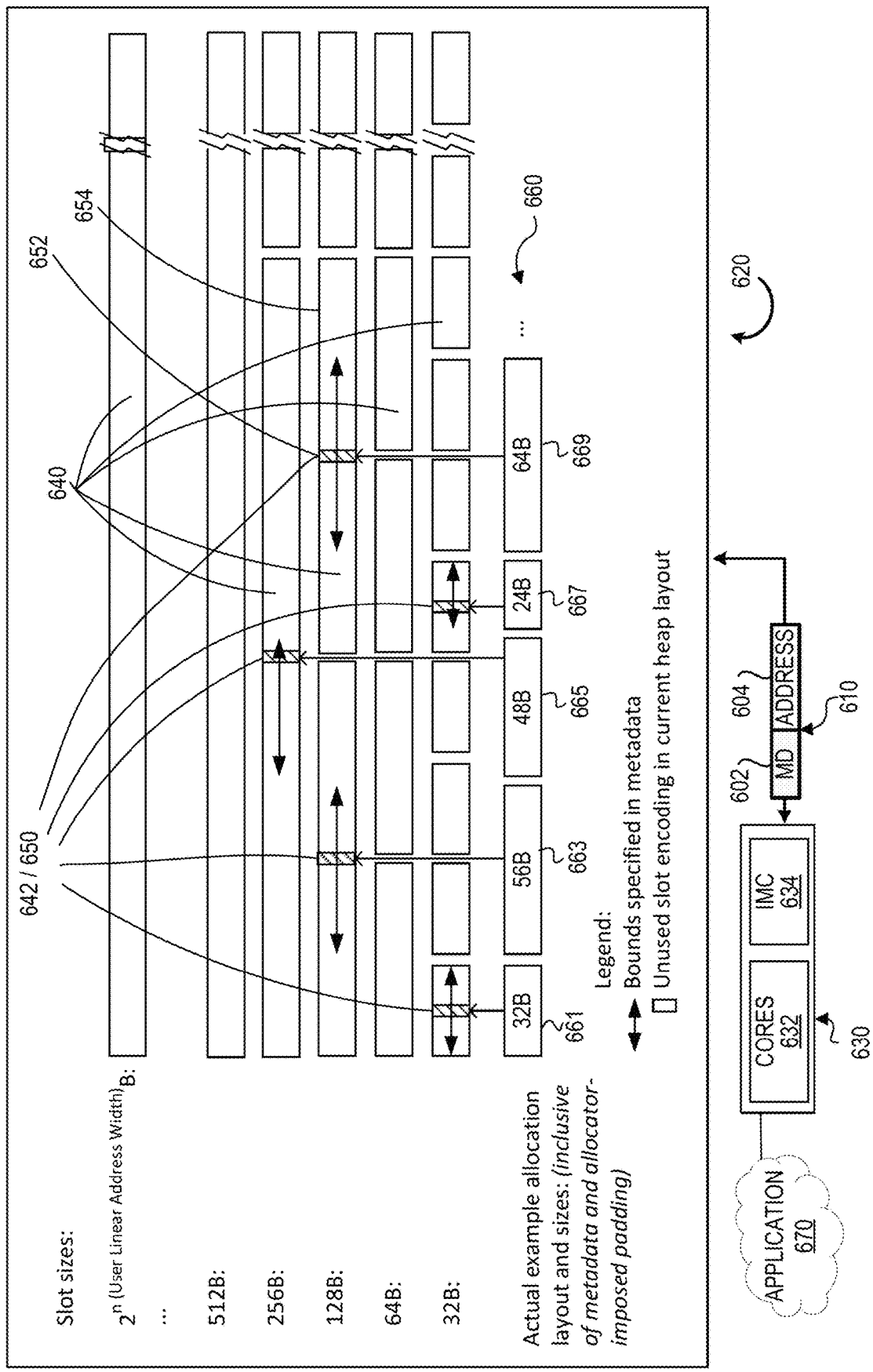
FIG. 6 is a schematic illustration of a memory allocation system using markers according to an embodiment.

FIG. 6 is a schematic diagram of an illustrative memory/cache 620 (e.g., similar to memory 120 and/or cache 118 of FIG. 1) to allow memory allocations accessed by encoded pointers (e.g., encoded indirect address 206, encoded pointers 510), some of which are described herein. The schematic diagram also shows processor circuitry 630 (e.g., similar to processor 102 of FIG. 1) including cores 632 and memory controller circuitry 634 (e.g., memory controller (MC), integrated memory controller (IMC), memory management unit (MMU)), which are communicatively coupled to memory/cache 620. Although embodiments are not so limited, in the shown embodiment of FIG. 6 the memory/cache 620 may be apportioned into one or more power of two (i.e., $2^0$ to $2^n$) slots 640 having respective midpoint addresses 642 that are associated with respective memory allocations 660 within slots 640, in accordance with at least one embodiment described herein. Additionally, 'allocation' and 'memory allocation' are intended to refer to an addressable portion of memory in which an object, such as data or code, is stored. As used herein, 'slot' is intended to refer to a unit of memory in a cacheline.

In some embodiments, an instruction that causes the processor circuitry 630 to allocate memory causes an encoded pointer 610 (which may be similar to encoded indirect address 206, encoded pointer 510) to be generated. The encoded pointer may include at least data representative of the linear address associated with the targeted memory allocation 660 and metadata 602 (such as size 402 and domain 403) associated with the respective memory allocation 660 corresponding to memory address 604. Also, an instruction that causes the processor circuitry 630 to perform a memory operation (e.g., LOAD, MOV) that targets a particular memory allocation (e.g., 669) causes the memory controller circuitry 634 to access that memory allocation, which is assigned to a particular slot (e.g., 654) in memory/cache 620 using the encoded pointer 610.

In the embodiments of the memory/cache 620 of FIG. 6, each memory allocation 660 is fully assigned to a given slot (i.e., one memory allocation per slot and one slot per memory allocation). Thus, in at least some embodiments, the midpoint of a slot can be easily associated with the memory allocation to which it pertains. Embodiments, however, are not so limited, and include within their scope the provision of a slot that includes none, some, or all of the memory allocation assigned to the slot. The memory allocations 660 are shown in FIG. 6 once at the bottom of the figure (e.g., 661-669) and represented correspondingly by double pointed arrows within the respective slots 640 to which the memory allocations are assigned. Even though the memory allocations 660 may be assigned to slots larger than the allocations themselves, the allocations may, according to one embodiment, not need padding in order to be placed within the larger slots.

According to some embodiments, a memory allocation may be assigned to a slot that most tightly fits the allocation, given the set of available slots and allocations. In the shown embodiment of FIG. 6, for example, the 32B allocation 661 is assigned to a 32B slot, the 56B allocation 663 to a 128B slot, the 48B allocation 665 to a 256B slot, the 24B allocation 667 to a 32B slot, and the 64B allocation 669 to a 128B slot. In the shown example of FIG. 6, because the 48B allocation would have crossed an alignment boundary in smaller slots, it is assigned to the larger 128B slot. Although the example of FIG. 6 shows the memory allocations as spanning through the slots in a contiguous fashion (tightly packed), clearly, embodiments are not so limited, and include within their scope a scheme of memory allocations to respective, dedicated memory slots. In at least some embodiments, but not necessarily all embodiments, a midpoint address of the slot is crossed by the allocation. This can occur where some slots may be free, especially for example in UAF scenario where a dangling pointer is involved. According to some embodiments, memory allocation sizes may be no smaller than half the width of a smallest slot in order for them to cross (i.e., to at least partially cover) the midpoint when assigned to a slot.

At least some encoded pointers specify the size of the slot, such as the Po2 size of the slot as a size exponent in the metadata field of the pointer, that the allocation to be addressed fits into. The size determines the specific address bits to be referred to by the processor in order to determine the slot being referred to. Embodiments are, however, not limited to Po2 schemes for the slots, and may include a scheme where the availability of slots of successively increasing sizes may be based on a power of an integer other than two or based on any other scheme.

Although the memory controller circuitry 634 is depicted in FIG. 6 as a separate box from the cores 632, the cores 632 may include all or a portion of the memory controller circuitry 634. Also, although the memory controller circuitry 634 is depicted in FIG. 6 as part of processor circuitry 630, in some embodiments, the processor circuitry 630 may be include all, a portion, or none of the memory controller circuitry 634.

In response to execution of a memory access instruction, the processor circuitry 630 uses an encoded pointer 610 that includes at least data representative of the memory address 604 involved in the operation and data representative of the metadata 602 associated with the memory allocation 660 corresponding to the memory address 604, such as a Po2 size and domain ID. The encoded pointer 610 may include additional information, such as data representative of a tag or version of the memory allocation 660 and pointer arithmetic bits (e.g., mutable plaintext portion 408) to identify the particular address being accessed within the memory allocation.

In some embodiments, metadata 602 carried by the encoded pointer 610 may indicate the bounds of the memory allocation. In addition, metadata indicating upper and lower bounds of an allocation may be stored at the midpoint of a slot in the same location, or at one or both ends of an allocation, or in other memory. Accordingly, the metadata 602 in encoded pointer 610 may be compared with metadata 650 stored in an area at the slot midpoint (or other location) to which the memory allocation 660 is assigned. The core 632 may further perform bounds checks and potentially other checks using the metadata stored at the slot midpoint. If the metadata 602 carried by the encoded pointer 610 matches the metadata 650 stored at the slot midpoint of slot 640, and further if bounds checks comparing the memory address 604 against the bounds information, the core 632 completes the requested operation. If the metadata 602 carried by the encoded pointer 610 fails to match the metadata 650 stored at the slot midpoint of slot 640, and/or if bounds checks on the address check fails to return a match, the core 632 returns an exception to the processor circuitry 630.

The memory/cache 620 may include any number and/or combination of electrical components, semiconductor devices, optical storage devices, quantum storage devices, molecular storage devices, atomic storage devices, and/or logic elements capable of storing information and/or data. All or a portion of the memory/cache 620 may include transitory memory circuitry, such as RAM, DRAM, SRAM, or similar. All or a portion of the memory/cache 620 may include non-transitory memory circuitry, such as: optical storage media; magnetic storage media; NAND memory; and similar. The memory/cache 620 may include one or more storage devices having any storage capacity. For example, the memory/cache 620 may include one or more storage devices having any suitable storage capacity (e.g., about 512 kiloBytes, 1 megaByte (MB), 100 MB, 1 gigaByte (GB), 100 GB, 1 teraByte (TB), 100 TB, or greater or lesser, etc.).

In the shown embodiment of FIG. 6, the IMC 634 apportions the memory/cache 620 into any Pot number of slots 640. In some embodiments, the IMC 634 may apportion the memory/cache 620 into a single memory slot 640 (i.e., a power of two=$2^m$, for a value of m that results in the entire system memory being covered). In other embodiments, the IMC 634 may apportion the memory/cache 620 into two memory slots 640 (i.e., a power of two=$2^{m-1}$). In other embodiments, the IMC 634 may apportion the memory/cache 620 into four memory slots 640 (i.e., a power of two=$2^{m-2}$). In other embodiments, the IMC 634 may apportion the memory/cache 620 into "n" memory allocations 640 (i.e., a power of two=$2^k$ for a value k that results in dividing the memory space into "n" slots). Importantly, note that the midpoint address 642 in each of the memory slots 640 does not align with the midpoint address in other memory slots, thereby permitting the storage of metadata that is unique to the respective memory slots 640. In some embodiments, the metadata may include any number of bits. For example, the metadata may include 2 bits or more, 4-bits or more, 6-bits or more; 8-bits or more, 16-bits or more, or 32-bits or more.

The encoded pointer 610 is created for one of the memory allocations 660 (e.g., 32B allocation, 56B allocation, 48B allocation, 24B allocation, or 64B allocation) and includes memory address 604 for an address within the memory range of that memory allocation. When memory is initially allocated, the memory address may point to the lower bounds of the memory allocation. The memory address may be adjusted during execution of the application 670 using pointer arithmetic to reference a desired memory address within the memory allocation to perform a memory operation (fetch, store, etc.). The memory address 604 may include any number of bits. For example, the memory address 604 may include: 8-bits or more; 16-bits or more, 32-bits or more; 48-bits or more; or 64-bits or more; 128-bits or more; 256-bits or more, 512-bits for more, up to 2 to the power of the linear address width for the current operating mode, e.g., the user linear address width-bits in terms of slot sizes being addressed. In embodiments, the metadata 602 carried by the encoded pointer 610 may include any number of bits. For example, the metadata 602 may include 4-bits or more, 8-bits or more, 16-bits or more, or 32-bits or more. In embodiments, all or a portion of the address and/or domain metadata (and other metadata, if any) carried by the encoded pointer 610 may be encrypted.

Figure 7:
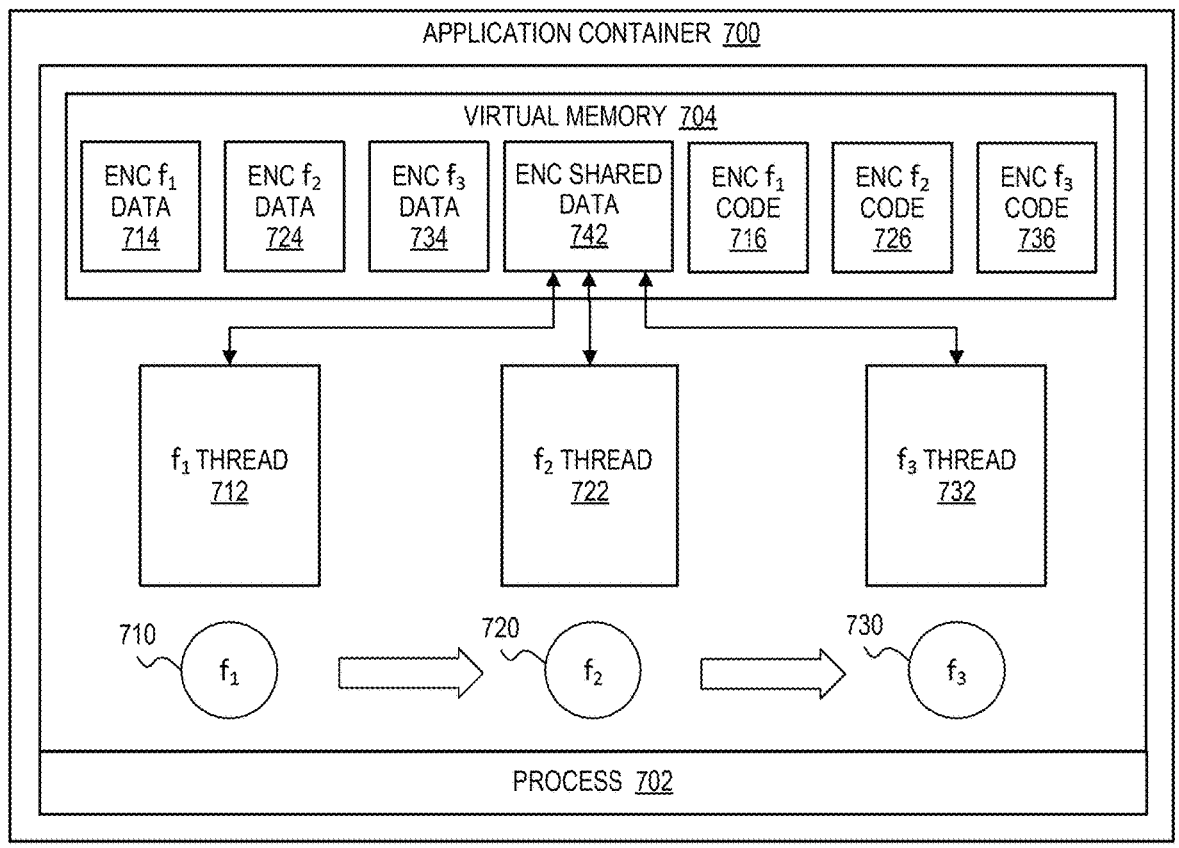
FIG. 7 is a block diagram illustrating domain isolation of functions in an application container using cryptographically encoded pointers according to at least one embodiment.

FIG. 7 is a block diagram illustrating an example application container 700 implementing domain isolation of software components using cryptographically encoded pointers according to at least one embodiment. An application can run in the individual application container 700 with multiple functions $f_1$, $f_2$, and $f_3$ of the application being executed as separate threads 712, 722, and 732 within the application container. Each function represents a separate domain and the in-memory code and data within and across the domains can be cryptographically isolated using cryptographic computing (e.g., with encoded pointers). In the example of FIG. 7, the application is a Function-as-a-Service (FaaS) application with each thread corresponding to a separate function. Only three functions are illustrated in FIG. 7 for simplicity and ease of description. It should be noted, however, that the concepts described herein could be applied to a scaled implementation with many more (or fewer) functions or other software components such as microservices or browser components, for example, which are run in the same application container and share a linear address space.

Application container 700 can be embodied as a package of software containing elements needed to run in any environment. The elements can include, for example, an application and dependencies, libraries, and other binaries. Application container 700 may include an entire runtime environment while sharing a host operating system. Generally, application container 700 can be a fully functional and portable cloud or non-cloud computing environment surrounding an application. Application container 700 may be instantiated as a process 702 in which an application runs. In one or more embodiments, the application running in application container 700 can be embodied as multiple software components (e.g., functions of an FaaS platform, microservices, browser components, etc.). In at least some embodiments, the multiple software components can be executed as separate threads.

Virtual memory 704 of process 702 defines a single address space for process 702, in which memory is allocated for each thread 712, 722, and 732, and which maps to physical memory where binaries are loaded. The address space may use consecutive linear/virtual addresses. Within the single address space, each thread 712, 722, and 732 is provided with its own stack and has its own instruction pointer and registers needed for execution. A thread's instruction pointer, stack pointer, and registers can be saved by the operating system and another thread's instruction pointer, stack pointer, and registers can be loaded (e.g., into appropriate registers 110) when transitioning execution from one thread to another.

Domain isolation can be established for each domain (e.g., each function executing as a thread) in application container 700 relative to the other domains (e.g., other functions executing as other threads) in application container 700, and relative to domains in other application containers. Domain isolation can be enforced using domain-specific encoded pointers generated by cryptographic computing, as described herein, to data and code associated with each function. For example, an encoded pointer that can be used to enforce domain isolation is encoded with a domain ID that uniquely identifies the function to which the encoded pointer belongs. The encoded pointer also includes a linear address (or a portion thereof) for data or code in a memory allocation for the function. The encoded pointer may also be encoded with power size metadata that indicates a size (e.g., power of two) of a slot to which the memory allocation is assigned in the address space. In addition, a portion of the encoded pointer may be encrypted (e.g., the domain ID and upper address bits of the linear address) based on an address key and an address tweak. The address tweak may include the power size metadata and lower address bits of the linear address.

In addition, the code and data of each function are encrypted uniquely, and tweaks derived from unique encoded pointers (e.g., 206, 216, 510, 610), can be used to decrypt the encrypted code and encrypted data. For example, data or code can be encrypted using an appropriate key (e.g., code key, data key) and an appropriate tweak (e.g., code tweak, data tweak). A code tweak can include power size metadata that indicates a size (e.g., power of two) of a slot to which the memory allocation containing the code is assigned in the address space, the domain ID, and a relative position of the code to be encrypted within the virtual address space (e.g., an offset of the code to be encrypted from the start of the slot). Data tweaks may include various combinations of metadata depending on the particular implementation and type of data that is accessed and/or generated by a function as will be further discussed herein. Thus, when encrypted data of a function is accessed, or when encrypted code of a function is fetched for execution by a processor, the data or code can be decrypted based on a data tweak or code tweak derived from the corresponding encoded pointer used to access the data or code. A key (e.g., data key, code key, or the same key) may also be used in the decryption.

In the example shown in FIG. 7, memory allocations for $f_1$ function 710 contain encrypted $f_1$ data 714 and encrypted $f_1$ code 716, memory allocations for $f_2$ function 720 contain encrypted $f_2$ data 724 and encrypted $f_2$ code 726, and memory allocations for $f_3$ function 730 contain encrypted $f_3$ data 734 and encrypted $f_3$ code 736. Encoded pointers that reference encrypted $f_1$ data 714, encrypted $f_2$ data 724, and encrypted $f_3$ data 734 may be generated when memory is allocated (e.g., by using a function such as malloc, alloc, or new; implicitly via the loader; or statically by the compiler, etc.). Encoded pointers that reference encrypted $f_1$ code 716, encrypted $f_2$ code 726, and encrypted $f_3$ code 736 may be generated when the code is called (e.g., by a loader jumping to a first instruction of a program to begin execution, by a function or other software component calling, jumping to, invoking, or otherwise transferring control to the code). In addition, encoded pointers that reference one or more shared memory allocations (e.g., shared data 742) that at least two functions within the single address space are allowed to access can also be generated at any suitable time dynamically (e.g., runtime) or statically (e.g., compile time, load time).

In addition to domain-specific data (e.g., 714, 724, 734), some data may be shared between two or more domains. In application container 700, a shared memory region (e.g., heap) may be provided to store encrypted shared data 742, which is shared by functions 710, 720, and 730. In one embodiment, a shared domain ID may be assigned to the shared memory region and used in a data tweak to encrypt and decrypt the data stored in the shared memory. Alternatively, if different keys are used for different domains, a shared key may be used to encrypt and decrypt data stored in the shared memory. The shared memory region that stores encrypted shared data 742 may be configured to allow access by selected domains (e.g., two domains, three domains, etc.) or between all of the domains in a container.

The encryption of $f_1$ data, $f_2$ data, and $f_3$ data, and the loading of the resulting encrypted $f_1$ data 714, encrypted $f_2$ data 724, and encrypted $f_3$ data 734 into their respective memory allocations, may occur after the memory is allocated and the encoded pointers to the memory allocations are generated. In subsequent accesses to the encrypted data, the encrypted data is decrypted and the unencrypted data may be re-encrypted and re-written to memory (e.g., when the unencrypted data is modified). The encryption of $f_1$ code, $f_2$ code, and $f_3$ code, and the loading of the resulting encrypted $f_1$ code 716, encrypted $f_2$ code 726, and encrypted $f_3$ code 736 into their respective memory allocations, may occur when the memory is allocated (e.g., by the loader) and the code is to be loaded for execution. Encryption of the code may not be dependent upon the corresponding encoded pointers being generated. In at least one embodiment, the code of a function is encrypted and then an encoded pointer to the encrypted code is generated when control is transferred to the function (e.g., via a JUMP instruction or other similar instruction that transfers control from one function to another). When the encrypted $f_1$ data 714, encrypted $f_2$ data 724, or encrypted $f_3$ data 734 is read, or the encrypted $f_1$ code 716, encrypted $f_2$ code 726, or encrypted $f_3$ code 736 is fetched from memory, the encoded pointer is decoded and used to read the encrypted data or fetch the encrypted code, and the decoded pointer can be used to derive a (code or data) tweak that is used to decrypt the encrypted data or encrypted code.

Memory may also be allocated in the single address space for object(s) shared by two or more threads. In virtual memory 704, a shared memory region may be composed of one or more memory allocations containing the encrypted shared data 742 that is accessible by all of the threads $f_1$, $f_2$, or $f_3$ in this example. The encrypted shared data 742 may be accessed by one of the threads at any given time.

As execution in application container 700 transitions between domains, appropriate encryption state is loaded to correctly decrypt data and code. For example, the instruction pointer register (RIP) may be loaded with the encoded pointer to the encrypted code of the called function. Similarly, an appropriate register can be loaded with an encoded pointer to the called function's data or with a data pointer to the encrypted shared data 742. Thus, switching from one domain to another just requires a cryptographic state switch, which makes the transition very efficient. Incorporating a domain identifier in the pointer enables zero-copy, object-granular communications between domains. Since functions share an address space (e.g., mapped by virtual memory 704), data can be shared via simple load and store instructions. Consequently, the operating system and virtual machine manager (VMM), if any, are omitted from the trusted computing base (TCB). Additionally, legacy binary compatibility is maintained so that the application (with multiple software components) does not need to be recompiled.

Although FIG. 7 (and other FIGURES herein) describe embodiments in which each software component is executed as a separate thread within an application container, it should be noted that the concepts disclosed herein can also be applied to multiple software components called by a single application (or container) that are not executed as separate threads in that application (or container). Indeed, the isolation of code (and data) can be enforced within an application (or container) in which unique domain IDs are assigned to respective software components loaded for execution in the same process and sharing the same address space of the process. Accordingly, the assigned unique domain IDs can be used to encode respective code pointers to each software component's memory allocation for program code, and the program code of each software component can be encrypted using a code tweak (e.g., domain ID, size metadata, offset of code within the slot) derived from that software component's corresponding encoded pointer and stored in the appropriate memory allocation. Similarly, for at least some data (e.g., heap data) in some implementations, the assigned unique domain IDs can be used to encode respective data pointers to each software component's memory allocation for data, and the data of each software component can be encrypted using a data tweak (e.g., domain ID, size metadata, fixed address bits) derived from that software component's corresponding encoded pointer and stored in the appropriate memory allocation.

Figure 8:
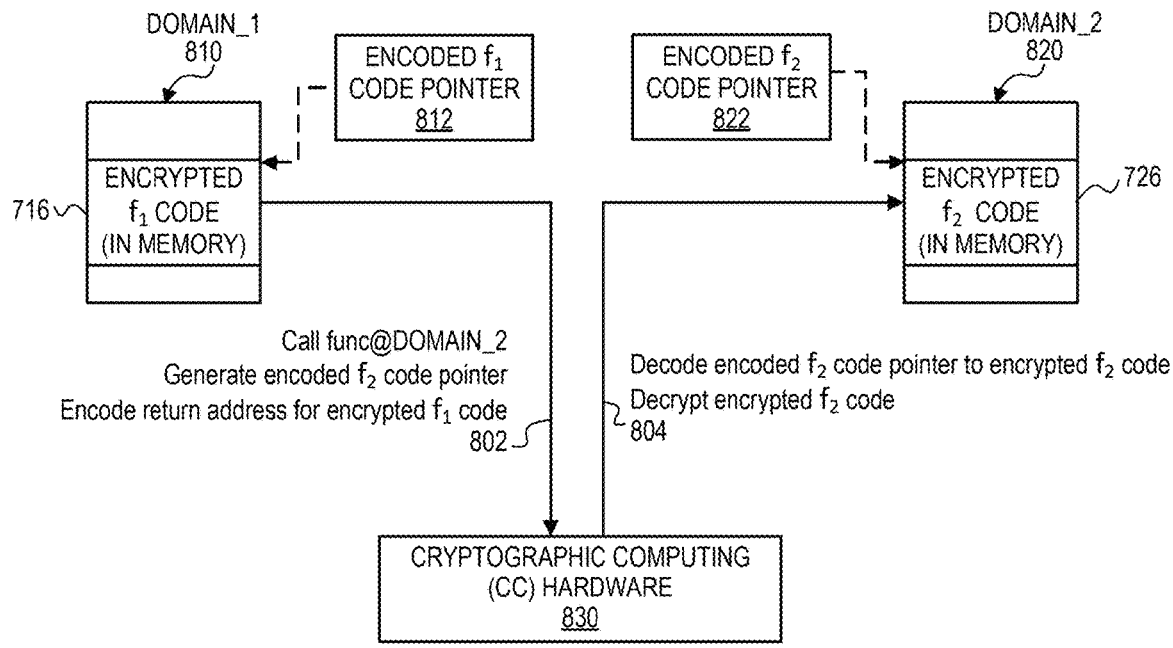
FIG. 8 is a block diagram illustrating an example execution transition from a first domain to a second domain within an application container according to at least one embodiment.

FIG. 8 is a block diagram illustrating a high-level overview of code isolation via cryptographic code pointers and code encryption and an example execution transition from a first domain to a second domain according to at least one embodiment. More specifically, FIG. 8 illustrates an example execution transition from a first domain (e.g., DOMAIN_1 810) to a second domain (e.g., DOMAIN_2 820) within an application container (e.g., application container 700) according to at least one embodiment. In this example, DOMAIN_1 810 represents $f_1$ function 710 and DOMAIN_2 820 represents $f_2$ function 720, where each function is executed as a thread in application container 700. Encrypted $f_1$ code 716 is stored in an address space allocated for the application container 700 and is cryptographically isolated from encrypted $f_2$ code 726, which is stored in the same address space for the application container 700. Although FIG. 8 is illustrated and described with respect to functions, it should be understood that the concepts are applicable to any software components.

Cryptographic isolation is enabled by cryptographic computing (CC) hardware 830. In one example, CC hardware 830 comprises at least a portion of secure memory access logic 150 of processor 102. Although any number of configurations of hardware, firmware, and/or software are possible to implement secure memory access logic 150, in one nonlimiting example, CC hardware 830 can include address decoding logic 154, code fetch logic 164, data read logic 174, and data store logic 172, and the address encoding logic 152 and code load logic 162 may be implemented in software (e.g., operating system 140, loader 142) executing on a processor (e.g., processor 102).

In at least one embodiment, an encoded $f_1$ code pointer 812 to encrypted $f_1$ code 716, and an encoded $f_2$ code pointer 822 to encrypted $f_2$ code 726, may be in the form of a cryptographically encoded pointer (e.g., 206, 510, 610) as previously described herein. The encoded $f_1$ code pointer 812 may include a linear address (or a portion thereof) of the encrypted $f_1$ code 716, a domain ID uniquely identifying the $f_1$ function, and power size metadata indicating the size (e.g., power of two) of a first memory slot to which a first memory allocation containing the encrypted $f_1$ code 716 is assigned, where the first memory slot is defined in an address space allocated for the application container. Similarly, an encoded $f_2$ code pointer 822 to encrypted $f_2$ code 726 may include a linear address (or a portion thereof) of the encrypted $f_2$ code 726, a domain ID uniquely identifying the $f_2$ function, and power size metadata indicating the size (e.g., power of two) of a second memory slot to which a second memory allocation containing the encrypted $f_2$ code 726 is assigned, where the second memory slot is defined in the same address space allocated for the application container.

In at least one embodiment, a portion of the encoded code pointers 812 and 822 may be encrypted. For example, the domain ID and upper address bits (e.g., 10 bits, more than 10 bits, or less than 10 bits) of the linear address in the encoded $f_1$ code pointer 812 may be encrypted using an address key and a first address tweak derived, at least in part, from the first encoded code pointer (e.g., power size metadata and lower address bits of the linear address in the first encoded code pointer). Similarly, the domain ID and upper address bits (e.g., 10 bits, more than 10 bits, or less than 10 bits) of the linear address in the encoded $f_2$ code pointer 822 may be encrypted using the address key and a second address tweak derived, at least in part, from the second encoded code pointer (e.g., power size metadata and lower address bits of the linear address in the first encoded code pointer).

The encrypted $f_1$ code 716 and the encrypted $f_2$ code can be generated and loaded for execution statically during the load time of the application container or dynamically during runtime when called by another function (or other software component). Generally, when code of a software component, such as a function, is to be loaded for execution (e.g., by a loader or linker-loader), each code block of the software component can be encrypted with a code key (e.g., one of secret keys 116(1)-116(N)) and a code tweak containing at least domain metadata. In at least one embodiment, respective code tweaks are used to encrypt respective code blocks of a domain, while a single code key is used to encrypt each of the code blocks of a domain.

For example, when the $f_1$ function is to be loaded for execution (e.g., during load time or dynamically during runtime), encrypted $f_1$ code 716 is generated by encrypting the code of the $f_1$ function (referred to as '$f_1$ code'). The $f_1$ code can include one or more code blocks that are encrypted into one or more corresponding encrypted code blocks that form the encrypted $f_1$ code 716. Each code block of the $f_1$ function can be encrypted with a code key (which may be unique to the application container 700 or unique to another entity having more or less granularity) and a code tweak that includes at least domain metadata (e.g., a first domain ID) that uniquely identifies the $f_1$ function (and DOMAIN_1 810) within the application container 700 and across other application containers. The code tweak may also include power size metadata indicating the size (e.g., power of two) of the first slot in memory to which the first memory allocation is assigned, where the encrypted $f_1$ code 716 is to be stored in the first memory allocation. The code tweak may further include location information of the code block within the address space. For example, location information may be a code byte offset calculated as the difference between the linear address of the beginning of the $f_1$ function code block targeted for encryption/decryption (e.g., the linear address in the encoded code pointer to the code block) and the linear address of the start of the first slot.

Similarly, when the $f_2$ function is to be loaded for execution (e.g., during load time or dynamically during runtime), each code block of the $f_2$ function can be encrypted with a code key (which may be unique to the application container 700 or unique to another entity having more or less granularity) and a code tweak that includes at least domain metadata (e.g., a second domain ID) that uniquely identifies the $f_2$ function (and DOMAIN_2 820) within the application container 700 and across other application containers. The code tweak may also include power size metadata indicating the size (e.g., power of two) of the second slot in memory to which the second memory allocation is assigned, where the encrypted $f_2$ code 726 is to be stored in the second memory allocation. The code tweak may further include location information of the code block within the address space. For example, location information may be a code byte offset calculated as the difference between the linear address of the beginning of the $f_2$ function code block targeted for encryption/decryption (e.g., the linear address in the encoded code pointer to the code block) and the linear address of the start of the second slot.

When the $f_1$ function begins execution, the encoded $f_1$ code pointer 812 is loaded into an instruction pointer register (RIP) (e.g., RIP 113). The encoded $f_1$ code pointer 812 is decrypted and decoded to obtain the decoded linear address of the particular encrypted code block that is referenced by the encoded $f_1$ code pointer 812 (e.g., the lowest bits of the encoded $f_1$ code pointer 812 can be manipulated to reference different encrypted code blocks within the encrypted $f_1$ code 716). The linear address obtained from decoding the encoded $f_1$ code pointer 812 is used to fetch the particular encrypted code block referenced by the linear address. The fetched encrypted code block can be decrypted using a code key and a code tweak to generate a decrypted code block.

The decrypted code block may contain one or more instructions and, in one embodiment, the first instruction in the decrypted code block is decoded and the resulting micro-operations are executed in a processor pipeline As shown at 802, from time to time, an instruction can be a control transfer instruction (e.g., JMP, CALL, etc.) to cause the CPU to transition execution to a new domain, such as DOMAIN_2 820. In this example, the control transfer instruction (e.g., Call func@DOMAIN_2) is intended to transfer control to DOMAIN_2 820, which represents the $f_2$ function running in a separate thread.

The execution of the control transfer instruction causes the linear address of the next instruction in the encrypted $f_1$ code 716 to be determined and to be set as a return address for the function call (e.g., in stack memory). The return address may be configured as a cryptographically encoded pointer as previously described herein, and may be encoded with domain metadata (e.g., domain ID) of DOMAIN_1 810, power size metadata of the first memory slot to which the first memory allocation containing encrypted $f_1$ code 716 is assigned. In addition, a portion of the return address (e.g., domain metadata and upper address bits of the linear address) may be encrypted.

As execution transitions from DOMAIN_1 810 to DOMAIN_2 820, the encoded $f_2$ code pointer 822 is generated for the linear address of the start of the encrypted $f_2$ code 726 and is encoded with the domain metadata of DOMAIN_2 820. As previously described, the encoded $f_2$ code pointer 822 may also be encoded with power size metadata (and potentially other metadata), and a portion of the pointer 822 may be encrypted. The encoded $f_2$ code pointer 822 is stored in the instruction pointer register (e.g., RIP 113) to cause the CPU to begin executing the encrypted $f_2$ code 726.

At 804, the encoded $f_2$ code pointer 822, which has been loaded in the instruction pointer register, is decoded (and decrypted) by the CC hardware 830. The decoding and decryption operations generate domain metadata of DOMAIN_2 820 and a linear address for an encrypted code block that contains the first instruction to be executed in DOMAIN_2 820 (e.g., the start of encrypted $f_2$ code). The encrypted code block containing the first instruction to be executed is fetched. CC hardware 830 generates a code tweak, and uses the generated code tweak and a code key (e.g., for application container 700) to decrypt the encrypted code block. In an example as previously described, the code tweak can include the domain metadata and the power size metadata from the encoded $f_2$ code pointer, and location information such as a code byte offset of the encrypted code block within the second slot to which the second memory allocation containing the encrypted code block is assigned.

As the execution returns from DOMAIN_2 820 to DOMAIN_1 810, the same mechanism is applied for the encoded return address. The encoded return address is popped from the stack and stored in the instruction pointer register. The CC hardware 830 decodes and decrypts the encoded return address to obtain a domain metadata of DOMAIN_1 810 and a linear address for the next instruction to be executed in the encrypted $f_1$ code. An encrypted code block at the linear address is fetched. CC hardware 830 generates a code tweak, and uses the generated code tweak and the code key (e.g., for application container 700) to decrypt the encrypted code.

Figure 9:
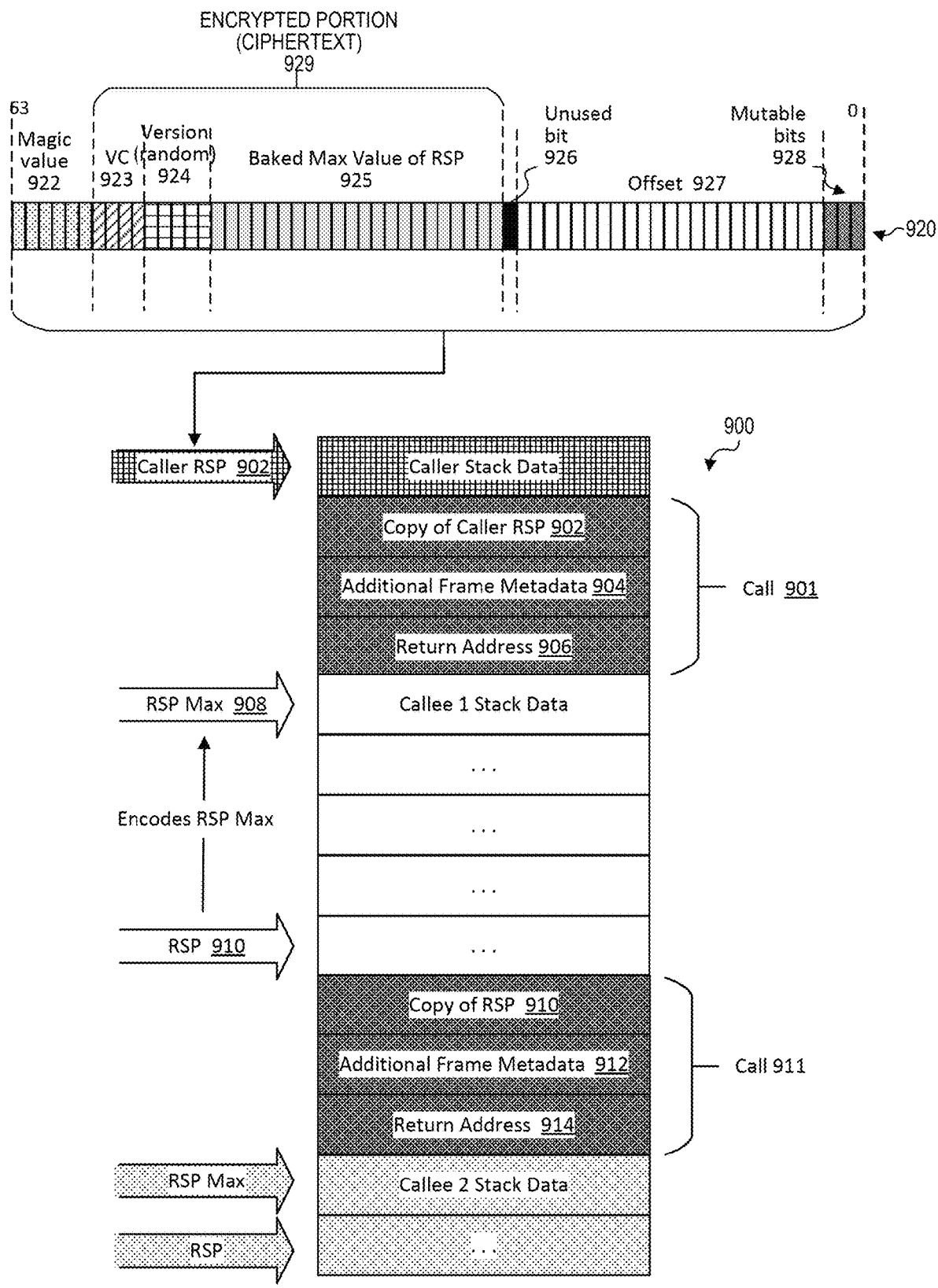
FIG. 9 illustrates an example stack with inline frame metadata in accordance with embodiments of the present disclosure.

FIG. 9 illustrates an example stack and an encoded stack pointer of a caller stack pointer register (RSP) that may be used in accordance with embodiments of the present disclosure. In this example, a stack 900 is populated with a set of caller stack data of a caller and stack data of a callee. A caller can be an application or software component that calls another software component, which is the callee. In this example the set of caller stack data at is uniquely encrypted based on encoded stack pointers (as indicated by the respective shadings). For instance, the caller stack data is encrypted based on an encoded stack pointer 920 stored in stack pointer register (RSP) 902.

The encoded stack pointers (e.g., in RSPs 902, 908, 910) may be encoded in any suitable manner based on particular implementations and needs. In one example, encoded stack pointer 920 may include in its topmost bits, a magic value 922 (e.g., 6 bits) that can be used to indicate the pointer is an encoded stack pointer (i.e., identifying the encoded pointer as being distinct from other types of encoded pointers) and may encode other information. In addition to the magic value 922, depending on the encoding scheme, a fixed or computational validation code (VC) 923 (e.g., in the next 4 bits) may also be encoded in the pointer. The VC 923 may be used to detect corruption in the pointer and also to provide resistance from replay in some instances. Further, version information 924 may be encoded in the pointer as well (e.g., in the next 5 bits), for example, to mitigate call trees being extremely repetitive. Because the same base addresses of stack frames will be reused many times in a program, additional entropy may be added by the version information 924 to ensure that the reused stack is encrypted differently than the previous encryption scheme with an older version.

Additionally, a baked maximum offset/max RSP value 925 may be encoded in the pointer (e.g., in the next 22 bits). This value may include the address of the top of the frame recorded after the CALL instruction has finished executing (e.g., RSP max 908). Including this baked max value 925 in the encoding of the pointer may prohibit the pointer from accessing a higher address than the top of current frame, preventing stack pointers created in this frame from accessing data in prior frames. As the program executes, this value may be reduced such that the current frame can only access its own space and below; that is, passed pointers from prior frames can only open their frames and below. The base address of the frame may also be used as a source of variance for stack data encryption in some instances.

The encoded stack pointer 920 may be cryptographically encoded by encrypting certain bits (e.g., the VC 923, version information 924, and baked maximum value 925) into an encrypted portion (ciphertext) 929. The encrypted portion 929 can prevent user software from tampering with the pointer's encoded data in the stack 900. The encryption may be performed using a block cipher, in some embodiments. The encryption can be performed as described above with respect to the encrypted portion 505 in the encoded pointer 510 of FIG. 5, in some embodiments. In some embodiments, the block size may be too small to fit the entirety of the pointer elements that include fixed address bits (e.g., offset 927). The pointer elements or portions thereof that do not fit may be kept as plaintext in the encoded pointer and passed as a tweak to the block cipher. In other embodiments, the encoded stack pointer 920 may be non-cryptographically encoded, or unencrypted. In this example, the VC 923, version 924, and baked maximum value 925 of RSP remain encoded in plaintext. It should be appreciated that any number of other configurations of an encoded stack pointer may be used with domain isolation embodiments described herein.

The encoded stack pointer 920 may be loaded into the stack pointer register (RSP) 902. Software may subtract from the offset region of the pointer (e.g., in the mutable bits 928) and perform conventional pointer arithmetic to access data stored on the stack frame.

It should be appreciated that numerous variations of a stack pointer are possible and that encoded stack pointer 920 is one possible configuration that may be used in one or more embodiments. In other embodiments for example, the pointer's format can be adjusted so that version information is encoded in the upper bits of the plaintext portion of the pointer. These bits may be incorporated as additional IV bits in the data encryption, or as tweak bits if tweakable encryption is used. In some embodiments, a pointer authentication code (PAC) could be included in the space originally allocated to the version information in the encrypted/ciphertext region 905 of the pointer. However, in other embodiments, a PAC may occupy a different set of bits. A pointer authentication code may include a message authentication code (MAC) embedded in a region of the pointer. The pointer authentication code may be computed over the address portion of the pointer, and may also incorporate context information in certain instances.

In some embodiments, the call information in a stack can include frame metadata (e.g., a copy of the caller's RSP and/or other frame metadata) along with the return address. In the example stack 900, call information 901 includes a copy of the contents of last caller RSP 902, which holds encoded stack pointer 920. Call information 901 also includes additional frame metadata 904 and a return address 906 to the next instruction to be executed by the callee. Thus, the return address (e.g., return address encoded at 802 in FIG. 8) is encrypted in the stack, based on the encoded stack pointer 920. A tweak derived from the encoded stack pointer 920 may be used to encrypt the return address 906. Thus, an alternative to encrypting a portion (e.g., encrypted portion 505 of encoded pointer 510) of the return address, is to encrypt a portion of stack 900 that contains the return address 906.

The callee function associated with the call information 901 (Callee 1) places data on the stack 900. As shown, the first stack pointer of the callee data (RSP Max 908) is encoded in subsequent stack pointers (e.g., RSP 910), for example, as the Baked Max Value of the RSP. Another function (Callee 2) is called with call information 911, and a copy of the contents of RSP 910 is stored in the call information 911 along with additional frame metadata 912 and the return address 914 for the next instruction to be executed by the caller of the callee 2. The Callee 2 then stores data on the stack 900 similar to Callee 1, with subsequent stack pointers encoding the RSP max value.

Inline frame metadata can be used, in some embodiments, to prevent underrunning pointers from higher frames. For example, in some instances, a copy of the final RSP of each frame can also be stored in the frame metadata region along with the caller's RSP (e.g., 902) and the return address (e.g., 906). When a stack pointer is passed from a higher frame, it may retain the encoded stack pointer of the originating frame. As the upper portion of this pointer does not match the current RSP, when de-referenced it can be concluded this pointer came from another frame and the frame metadata can be retrieved from the originating frame to determine a lower boundary for that pointer. Thereby, this passed reference can only be used to access memory in the originating given frame; access is bounded on upper and lower boundaries. Some embodiments may use a final RSP that excludes access to the return address of the callee whose activation caused the final RSP to be recorded.

Figure 10A:
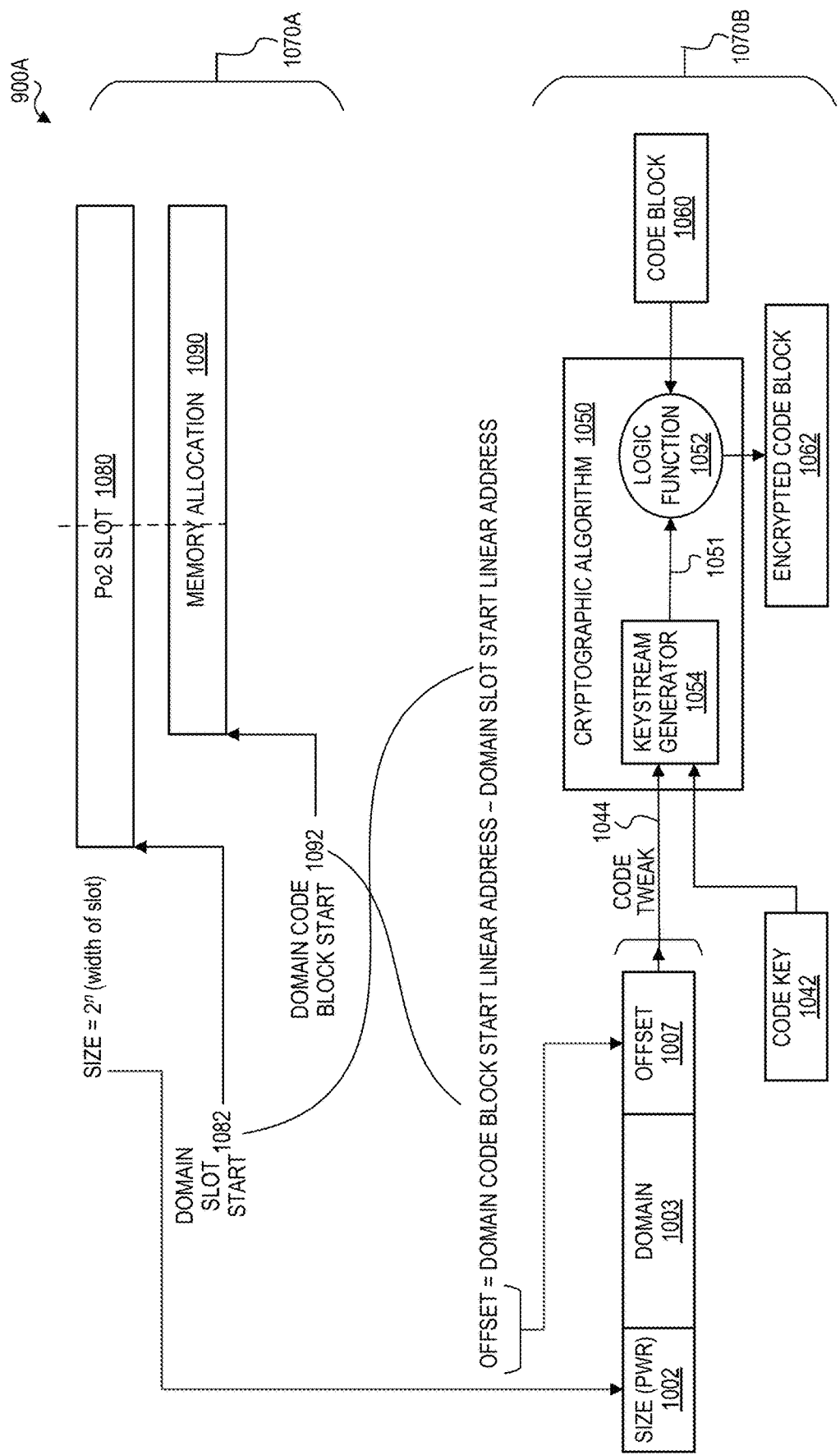
FIG. 10A is a flow diagram illustrating an example process of binding encryption of code to a linear address of the code and to domain metadata according to at least one embodiment.

FIG. 10A is a flow diagram illustrating an example process 1000A of encrypting code of a software component based, at least in part, on domain metadata uniquely identifying the software component according to at least one embodiment. Examples of software components include, but are not necessarily limited to, functions (e.g., user-defined functions, shared library functions, static library functions, FaaS functions, etc.), microservices, and browser components (e.g., library, tab within a browser, etc.). In some embodiments, each software component is loaded to run as a separate thread (e.g., 710, 720, 730, 810, 820) within an application container (e.g., 700) running on a computing device (e.g., 100). In one or more embodiments, at least some portions of process 1000A may be executed by a loader (e.g., 142) during a load time to load a container and a software component that is to run in the container, or during a loading process to dynamically load a software component to run in a container in response to being invoked in runtime. In some implementations, the encryption portion of process 1000A may be executed to encrypt a software component prior to the load time of a container (or application) that invokes the software component.

In at least one embodiment, process 1000A may be performed by loader 142 in software (e.g., memory allocation logic 146 and code encrypting logic 176). In other embodiments, the linking and/or loading process, or a portion thereof (e.g., cryptographic operations), may be performed in hardware and/or firmware, or in any suitable combination of hardware, firmware, and/or software.

When an application (or a software component) is launched to run in a container, loader 142 may allocate memory needed for code of one or more software components of the application. Memory may also be allocated during runtime to dynamically load another software component when that other software component is called by a currently executing software component or a main application. In at least one embodiment, the loader can allocate memory as shown at 1070A and encrypt code of a software component as shown at 1070B. The encrypted code may be loaded in the allocated memory.

An example of a memory allocation for code of a software component is graphically depicted at 1070A. In this example, a memory allocation 1090 for the code of a software component is sized to contain the loadable binary segments of the software component. During a load process in which the software component is to be loaded in memory, a power of two (Po2) slot 1080 that is aligned on a power of two boundary in a virtual memory space, and in which the memory allocation 1090 can fit, can be selected. The memory allocation 1090 can be assigned to the selected Po2 aligned slot 1080. Size metadata 1002 that indicates the size of the selected memory slot may be generated.

Domain metadata 1003, such as a domain identifier that uniquely identifies the software component and/or the thread corresponding to the software component, can also be determined. Domain metadata 1003 uniquely identifies a software component within a container (or application). Domain metadata 1003 may also uniquely identify the software component across a platform. In some scenarios, domain metadata 1003 may be a thread identifier of the thread that runs the software component. A domain ID itself may be generated or otherwise obtained using any suitable approach. In one example, domain IDs may be generated dynamically (e.g., during the first encryption and load) and made shareable across the platform. This could be realized by generating a hash of the binary file itself as a domain ID, as will be further discussed below. In another example, domain IDs may be pre-determined and stored in memory or other storage that is accessible to the loader.

A slot (e.g., having a Po2 size) for a software component to be dynamically encrypted during loading, may be selected using any suitable slot selection algorithm or technique and may vary among implementations. In one example, each software component may be loaded into the next available contiguous range of pages that are large enough combined to fit the entire binary image of the software component, and that software component may be fitted into a slot using the same or similar algorithm as described with reference to the selection of slots for memory allocations shown and described with reference to FIG. 6. The largest slot having a midpoint that is crossed by that binary image may be selected for that binary image. Any other suitable slot selection algorithm may be used based on particular needs, convenience, and/or implementations. In another example, each software component is fitted into the smallest slot that is at least as large as the software component, and the software component may be aligned in memory such that it fits into a slot of that size. For example, the software component could be aligned with the beginning of the slot, with the end of the slot, or at some other offset within the slot.

Once the domain metadata of the software component is determined and the Po2 slot and linear address of the memory allocation for the software component are selected, encryption is performed on code blocks, such as code block 1060, of the software component using a cryptographic algorithm 1050. Encryption can be performed using a code key 1042 and a code tweak 1044 generated with power size metadata 1002, domain metadata 1003, and an offset 1007, represented as <Size Metadata, Domain id, Code byte offset>. In the example in FIG. 10A, size metadata 1002 refers to Po2 aligned memory slot 1080 (also referred to as 'domain slot'), to which the memory allocation 1090 is assigned. The memory allocation 1090 is to store the loadable binary segments of the encrypted software component (also referred to as 'domain').

The offset 1007 can be determined by calculating the byte distance between the domain code block start 1092 in-memory (for the code block to be encrypted) and the domain slot start 1082 in-memory. For example, the offset 1007 can be computed by subtracting a domain slot start linear address (e.g., at 1082) for the Po2 slot 1080 from a domain code block start linear address (e.g., at 1092) of the code block to be encrypted. The offset 1007 can be used in the code tweak 1044 instead of the absolute linear address in order to accommodate position-independent code.

Although the offset 1007 may be calculated in the particular manner as described above to accommodate position independent code, alternative approaches may be used to determine the relative position of position independent code within a virtual address space. Generally, any approach may be used to determine a relative position (e.g., code byte offset) of a code block of position independent code within a given virtual address space of a given application container running on a computing device, if the alternative approach can be used to determine an equivalent relative position for the same code block being accessed via a different virtual address space allocated for a different application container running on the same computing device.

In some embodiments, the code may be pre-encrypted, using a code key shared across domains and processes, while in storage so that it can be loaded more quickly without delays due to encrypting code at load-time. For example, a package manager may encrypt programs in storage, and it may record the domain ID that was used to encrypt each program, e.g., in the executable and linkable format (ELF) binary file, so that the loader can use that domain ID value to construct an encoded pointer to reference the code using the correct domain ID. Alternatively, the domain ID could be computed as a hash of the binary file itself, although that may result in collisions. If the domain ID space is not large enough to assign a unique domain ID to all of the software components managed simultaneously by the package manager, then the loader may re-encrypt software components with colliding domain IDs so that a new domain ID can be used. Another benefit of pre-encrypting software components in storage is that the existing OS support for sharing storage pages mapped multiple times, e.g., by different processes, can share the pre-encrypted software components (also referred to herein as 'pre-encrypted code'). The offset from the beginning of the slot to the beginning of the pre-encrypted software component should be the same everywhere that the pre-encrypted software component is loaded for it to be shared with identical encryption. For example, there could be a convention that each pre-encrypted software component is fitted into the smallest slot that is at least as large as the pre-encrypted software component, and each pre-encrypted software component could start at the beginning of the slot or be aligned with the end of the slot. That may result in gaps in the linear/virtual address space between loaded pre-encrypted software components, but those gaps do not need to be mapped to physical memory. Thus, they do not result in wasted physical memory. Those gaps may also be reclaimed for use as heap or stack allocations or memory-mapped file-backed or anonymous regions. Even if pre-encrypted software components each start at a power-of-two-aligned base, it is still possible to pack smaller pre-encrypted software components into free space at the ends of slots partially filled by other dynamically encrypted or pre-encrypted software components, since they are encrypted differently due to their mismatched power values and possibly different domain IDs. It should be noted that any other suitable slot-size algorithm may be implemented to select a fixed slot size in which the pre-encrypted software component can fit. Thus, the selection of a minimum slot size is one possible approach, but alternative approaches may be used.

As shown in FIG. 10A, the code of the software component can be encrypted by a cryptographic algorithm 1050, which can include a keystream generator 1054 and a logic function 1052. In at least one embodiment, keystream generator 1054 can be implemented as an AES-CTR mode block cipher, at any suitable size of granularity. In this embodiment, the contents of code tweak 1044 are used as the initialization vector (IV), with the offset 1007 (or alternative location information) in the code tweak being used as a counter value (CTR). Keystream generator 1054 encrypts code tweak 1044 based on a code key 1042 to generate a keystream 1051. In one or more implementations, the value of code tweak 1044 may be adjusted to be congruent to 0 (modulo the block size of the keystream generator 1054) prior to being used as an input to the keystream generator. The value of the code tweak 1044 may have some suitable number of least significant bits set to 0 to satisfy this requirement and a prefix of the keystream 1051 may be discarded to account for that adjustment. The number of bytes of the keystream 1051 to discard may be computed by subtracting the adjusted value of the code tweak 1044 from the unadjusted value of the code tweak 1044. This adjustment may modify the values of immutable plaintext bits in cryptographically encoded pointers to code blocks 1060 assigned to slots 1080 that are smaller than the block size. If the memory to be encrypted and stored crosses one or more block-aligned boundaries, the keystream generator 1054 may be re-invoked for the subsequent blocks with the code tweak 1044 being increased by an amount equal to the block size each time that it is re-invoked. A suffix of the generated keystream 1051 may be unneeded and thus discarded.

An XOR operation or other suitable logic function 1052, or combination of logic functions, may be performed on keystream 1051 and code block 1060 (which may be a cache line in some implementations) of the software component. The granularity of the code block 1060 matches the keystream 1051 output from of the keystream generator 1054, and the logic function 1052 produces an encrypted output code block 1062. The resulting encrypted code block 1062 may be stored in the memory allocation 1090. It should be noted that, instead of using an AES-CTR mode block cipher, other forms of encryption may be used to encrypt and decrypt code including, but not necessarily limited to various types of tweakable block ciphers.

Figure 10B:
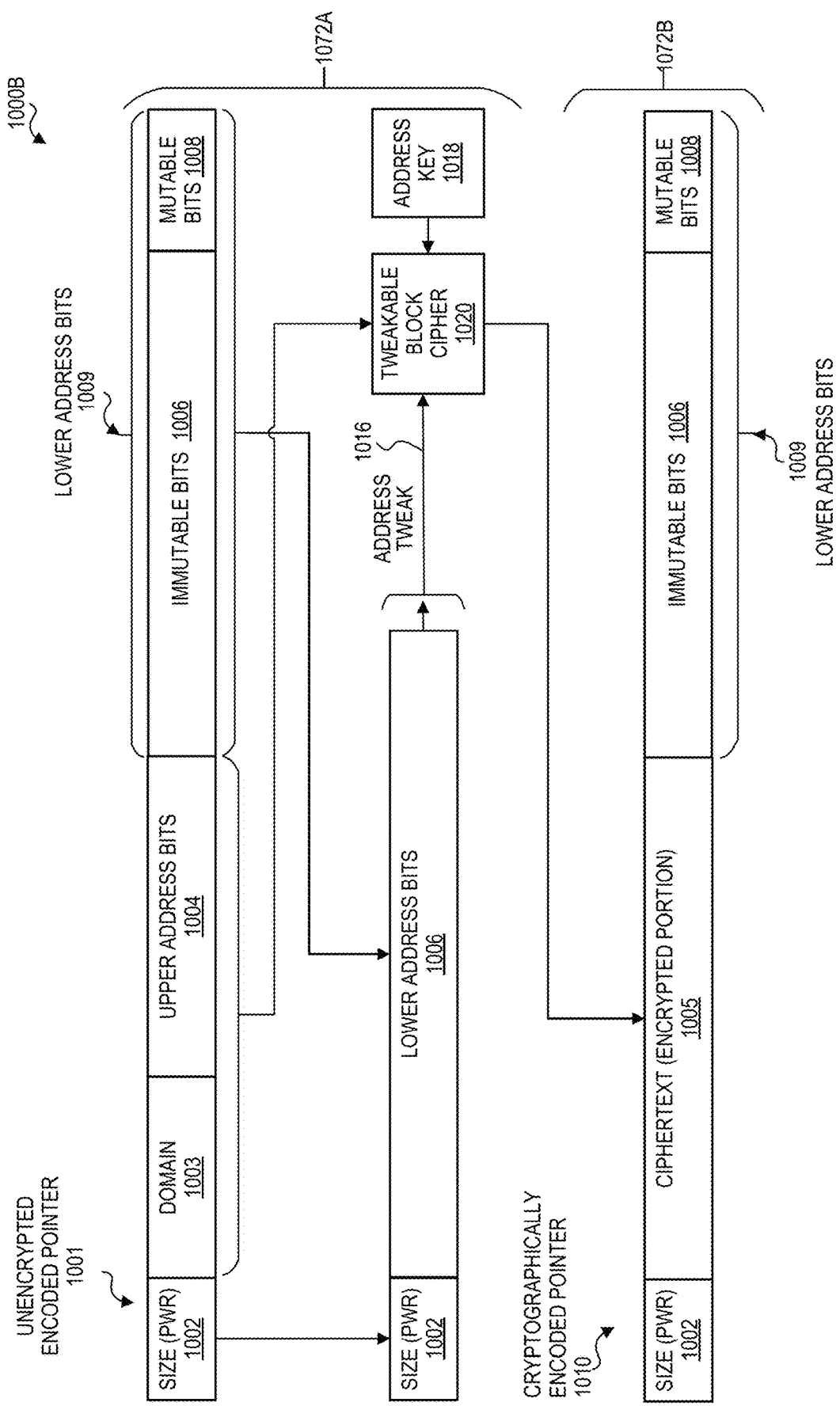
FIG. 10B is a flow diagram illustrating an example process of generating a cryptographically encoded pointer of a domain in an application container according to at least one embodiment.

FIG. 10B is a flow diagram illustrating an example process 1000B of generating a cryptographically encoded pointer 1010 to a memory allocation, where the memory allocation stores encrypted code of a software component, which may be executed as a thread in a container according to at least one embodiment. Process 1000B can be performed in response to a loaded and encrypted application being initiated (e.g., when a jump is performed to the encrypted code of the application or software component and a page fault occurs). Process 1000B can also be performed on inter-domain transfers (e.g., between domains of a process) where a forward code pointer and a return address are each cryptographically encoded using an address key 1018 and a per-pointer address tweak 1016.

In at least one embodiment, process 1000B may be performed by loader 142 in software (address encoding logic 152 and address encrypting logic 153). In other embodiments, process 1000B, or a portion thereof (e.g., cryptographic operations), may be performed in hardware and/or firmware, or in any suitable combination of hardware, firmware, and/or software.

Cryptographically encoded pointer 1010 can be generated from an unencrypted (or pre-encryption) encoded pointer 1001 containing at least a portion of a linear address and other metadata such as Po2 size metadata and domain metadata. The linear address of a memory allocation for encrypted code of a software component, size (power) metadata 1002 of a Po2 slot to which the memory allocation is assigned, and domain metadata 1003 uniquely identifying the software component (or domain) may be obtained by a loader (e.g., loader 142) during a load process in which the software component is to be encrypted and loaded in memory, or during a load process in which the pre-encrypted software component is loaded in memory. Once the software component is encrypted (or pre-encrypted) and loaded in memory, then when execution of the software component begins, or if the software component is called from another thread, the linear address and various metadata determined during the load process can be used to generate unencrypted encoded pointer 1001.

In the example shown, unencrypted encoded pointer 1001 is embodied as a 64-bit encoded linear address before any cryptographic functions are performed and includes 6-bit size metadata 1002, 6-bit domain metadata, 16-bit upper address bits 1004, and 32-bit plaintext lower address bits 1009 of the linear address. Plaintext lower address bits 1009 can include variable-bit immutable bits 1006 and variable-bit mutable bits 1008.

For simplicity, operations of process 1000B are illustrated in two phases: address encryption (Phase I 1072A) and pointer encoding (Phase II 1072B). In Phase I 1072A, a portion of the unencrypted encoded pointer 1001 (also referred to herein as "pointer slice") may be encrypted. In this example, the domain metadata 1003 and the upper address bits 1004 embedded in the unencrypted encoded pointer 1001 form the pointer slice to be encrypted. The pointer slice is encrypted by a cryptographic algorithm such as a tweakable block cipher 1020 using an address key 1018 and an address tweak 1016. The address tweak 1016 can comprise multiple address encryption factors. In one example, a first address encryption factor could include the power (e.g., Po2) size metadata 1002, and a second address encryption factor could include lower address bits 1009. It should be apparent that other context information could also be used in one or more embodiments as additional address encryption factors and may be added as part of address tweak 1016 or as a separate input for the cryptographic algorithm. The block cipher 1020 may be any suitable encryption algorithm (e.g., tweakable version of a 32 bit block size cipher such as SIMON, SPECK, K-cipher, or other variable block size cipher, or for larger addresses, PRINCE, XTS-AES block cipher, LRW, AES-CTR mode, etc. may be used) as noted herein.

It should be noted that the size metadata 1002 may not be encrypted as it is used to determine the number of bits in the plaintext mutable bits 1008 and immutable bits 1006 of the pointer and is also used as part of address tweak 1016. The domain metadata 1003, however, is not used in the address tweak and may be included as part of the pointer slice that is encrypted. The block cipher would have a corresponding block size to fit the domain metadata 1003 and the upper address bits 1004, or may be larger to fit additional metadata such as tag/version metadata. Additionally, it should be noted that, although the process 1000B is illustrated with the encoding shown in pointer 1001, process 1000B could be performed with any suitable alternative pointer encodings.

When ciphertext 1005 (i.e., encrypted pointer slice) has been generated by encrypting selected portions of unencrypted encoded pointer 1001 (e.g., domain metadata 1003 and upper address bits 1004), then a cryptographically encoded linear address (or cryptographically encoded pointer) 1010 can be formed in Phase II 1072B. Pot size metadata 1002 is encoded in the cryptographically encoded pointer 1010, for example, as the upper most bits. The lower address bits 1009, including immutable bits 1006 and mutable bits 1008, make up the lower bits of the cryptographically encoded pointer 1010. It should be appreciated that cryptographically encoded pointer 1010 optionally includes other metadata such as a tag/version portion, for example, which may be a random or deterministically different value.

In some embodiments, an instruction may be executed to generate cryptographically encoded pointer 1010. The instruction can be configured to accept the base linear address of the memory allocation, the domain ID, and possibly the allocation size as operands. The power size metadata may be derived from these operands or may be obtained by the loader from some type of memory used to store the power size metadata determined during the memory allocation process.

It should be noted that process 1000B can also be performed when memory is allocated for data of a software component. In one or more embodiments, encoding and encrypting a pointer to the data of a software component may be performed in hardware. In some embodiments, the same address key may be used to encrypt a portion of pointers to data of a software component and to encrypt a portion of other pointers to code of the same domain (same software component). In other embodiments, different address keys may be used within the same domain for encrypting a portion of pointers to data and code. In some embodiments, the same address key may be used to encrypt portions of pointers to data and code of other domains within the same container (or application). Generally, any possible implementation of using the same or different address keys for pointers to data and code of multiple domains in a container (or application) are within the broad scope of this disclosure. For software components embodied as position independent code, however, the same key is used for encrypting and decrypting the code across domains, and across processes that invoke the call.

Figure 10C:
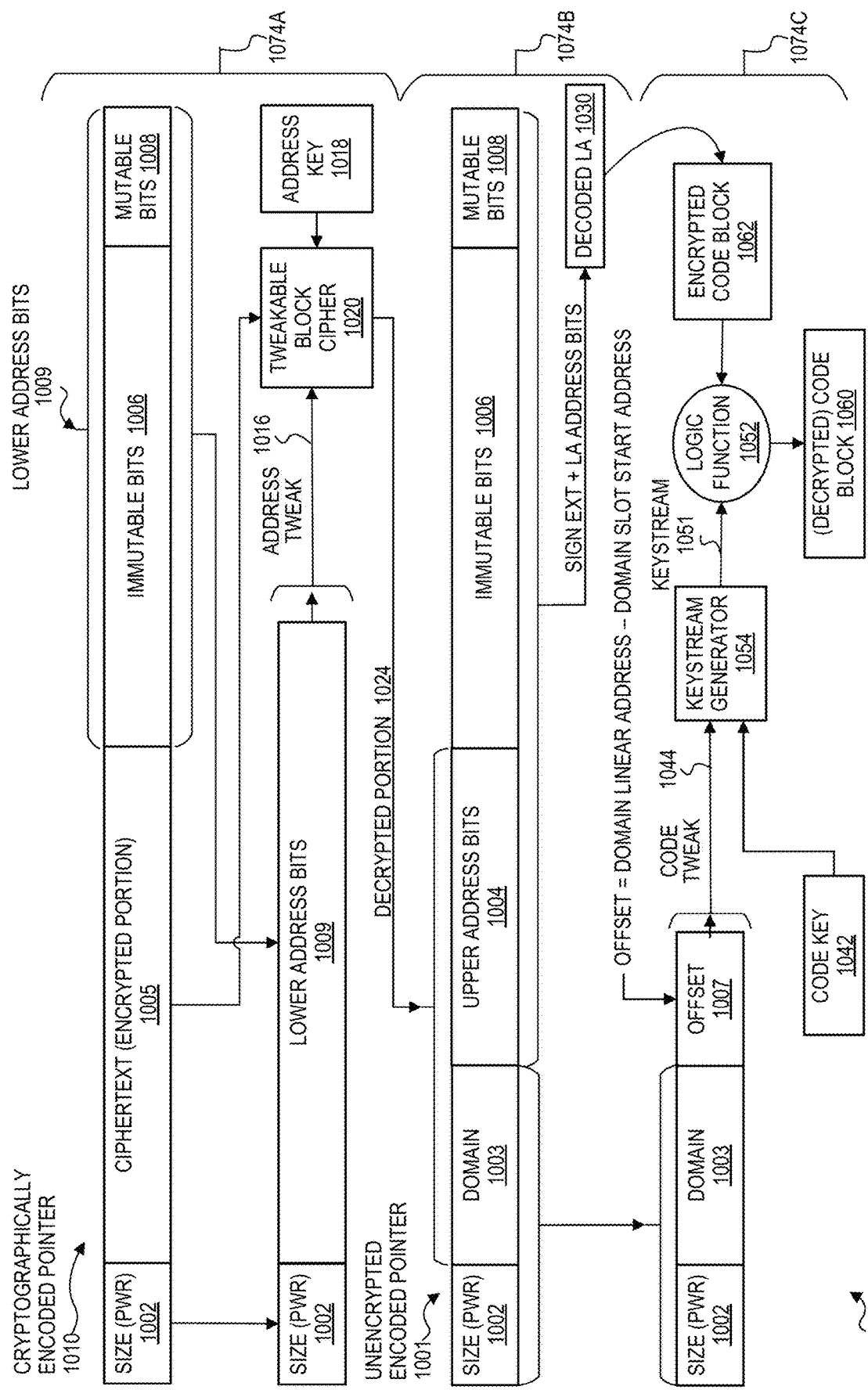
FIG. 10C is a flow diagram illustrating an example process of obtaining and decrypting encrypted code referenced by the cryptographically encoded pointer according to at least one embodiment.

FIG. 10C is a flow diagram illustrating an example process 1000C of obtaining (e.g., reading, fetching) and decrypting the encrypted code, comprising at least one encrypted code block 1062, referenced by the cryptographically encoded pointer 1010, where encryption of the code is bound to Po2 size metadata and domain metadata encoded in the cryptographically encoded pointer 1010, and to an offset of the code to be decrypted relative to the start of the Po2 slot 1080 to which the memory allocation containing the code to be decrypted is assigned. Encrypted code block 1062, Po2 slot 1080, and memory allocation 1090 are shown in FIG. 10A. In at least one embodiment, process 1000C may be performed in hardware (e.g., address decoding logic 154, address decrypting logic 155, code fetch logic 164, and code decrypting logic 165). In other embodiments, process 1000C (or a portion thereof) may be performed by firmware and/or software, or by any suitable combination of hardware, firmware, and/or software. The configuration of cryptographically encoded pointer 1010 is shown and described with reference to FIG. 10B and other encoded pointers shown and described herein (e.g., 206, 510, 610).

The operations of process 1000C are identified in three phases: address decryption (Phase I 1074A), address formation (Phase II 1074B), and code decryption (Phase III 1074C). In Phase I 1074A, the linear address embedded in pointer 1010 is decrypted. Specifically, ciphertext 1005 of the encoded linear address is decrypted by a decryption algorithm such as a tweakable block cipher 1020 using address key 1018 and address tweak 1016. The same address tweak 1016 used during to encrypt the pointer slice (as shown and described with reference to FIG. 10B) is used to decrypt the ciphertext 1005 resulting from the encryption. For example, size metadata 1002 and lower address bits 1009 can form address tweak 1016. The block cipher 1020 may be any suitable decryption algorithm (e.g., tweakable version of a 32-bit block size cipher such as SIMON, SPECK, K-cipher, or other variable block size cipher, or for larger addresses, PRINCE, XTS-AES block cipher, LRW, AES-CTR mode, etc. may be used) as previously noted herein.

Once the ciphertext 1005 of the cryptographically encoded pointer 1010 has been decrypted into a decrypted portion 1024 by tweakable block cipher 1020, a decoded linear address (LA) 1030 that references encrypted code block 1062 can be formed in Phase II 1074B. The lower address bits 1009 (e.g., bits 0-31) and upper address bits 1004 (e.g., 32-47) can be concatenated with the most significant bits (e.g., bits 48-63 in the bit places of domain metadata 1003 and size metadata portion 1002), which may be noncanonical/unused address bits in some architectures, to form the decoded linear address 1030. In one scenario, the domain metadata 1003 and size metadata 1002 can be overwritten with sign extension bits in the decoded linear address 1030. In another scenario, the most significant bits or a portion thereof, can be set to the same bit value (e.g., 0 or 1). In other scenarios, the most significant bits or a portion thereof may be obtained from a register or other memory where such bits have been stored for performing the decoding process of cryptographically encoded pointers.

In some embodiments, only upper bits of the current, encoded instruction pointer value may be stored in a new register. Specifically, the upper bits that are encrypted or specify non-address information such as power may be stored in a new register. The lower address bits to be used for decrypting code in a position-independent manner can be computed from the unencrypted instruction pointer register by masking out the equivalent positions of the immutable bits 1006 and concatenating with the upper bits stored in a new register. In some embodiments, the tweak used for code encryption may match the one used for data encryption to facilitate Just In Time (JIT) compilation that writes code using data access instructions that activate the data encryption functionality. A special instruction could be used that allows the code encryption key to be used for the data access. Access to that instruction could optionally be restricted to designated pages or ranges of code, e.g., based on bit(s) in page table entries or range registers.

In some embodiments, the processor may map each (power, domain ID) pair to a distinct key rather than simply using it as a tweak. The combined size of the power and domain ID fields imposes a limit on the number of supported domains if the same key is used across domains. However, there are multiple ways that this limit may be overcome: 1) Assign different keys to different modules with colliding (power, domain ID) as long as they are not loaded into the same process; 2) Restrict software components to a smaller portion of the address space to expand the domain ID field in the code pointer, since fewer address bits would be needed.

In some embodiments, the processor may check whether the upper address bits 1004 in decrypted portion 1024, or a portion thereof, have an expected value as an indication of whether the decrypted portion 1024 was decrypted incorrectly. For example, in some paging modes, some number of upper address bits are required to all have the same value (i.e., all 0's or all 1's). If the corresponding bits in the upper address bits 1004 of the decrypted portion 1024 have differing values, then that indicates that decrypted portion 1024 was decrypted incorrectly. Some embodiments may generate a fault in that case. Some other embodiments may rely on existing canonicality checks to generate a fault in that case when the decoded linear address is used. Even if the upper address bits do all have the same value, that may not conclusively indicate that decrypted portion 1024 was decrypted correctly. Some embodiments may perform checks for expected bit values for both the minimum and maximum addresses to be accessed in the current operation so that a fault will likely be generated if any portion of the access is out-of-bounds. Other embodiments may only require that a particular portion of the access, e.g., the first byte, be within the bounds of the pointer, and thus only perform such checks for expected bit values on the pointer for that portion of the access. Other embodiments may check both the minimum and maximum addresses for write operations but only check a single pointer value for reads, relying on code cryptography to likely prevent partially out-of-bounds accesses from returning correct plaintext. It should be understood that any number of other bounds checks and/or integrity checks may be implemented in the embodiments disclosed herein, and that the checks that are specifically described herein are merely examples of such possibilities.

The decoded linear address 1030 is used to find the memory location of the first encrypted code block 1062 to be decrypted in Phase III 1074C. The encrypted code block 1062 is decrypted by a cryptographic algorithm (e.g., 1050) such as keystream generator 1054 and logic function 1052. In at least one embodiment, keystream generator 1054 can be implemented as an AES-CTR mode block cipher, at any suitable size granularity. In this embodiment, size metadata 1002, domain metadata 1003, and offset 1007 are used as the initialization vector (IV) or code tweak 1044, with the offset 1007 being used as the counter value (CTR). The offset 1007 can be calculated based on the byte distance between the code block start 1092 in-memory and the domain slot start 1082 in-memory. Generation of keystream 1051 may commence without waiting for encrypted code block 1062 to be fetched. Keystream generator 1054 encrypts code tweak 1044 based on code key 1042 to generate keystream 1051.

The value of code tweak 1044 may be adjusted to be congruent to 0 (modulo the block size of the keystream generator 1054) prior to being used as an input to the keystream generator. The value of the code tweak 1044 may have some suitable number of least significant bits set to 0 to satisfy this requirement and a prefix of the keystream 1051 may be discarded to account for that adjustment. The number of bytes of the keystream 1051 to discard may be computed by subtracting the adjusted value of the code tweak 1044 from the unadjusted value of the code tweak 1044. If the memory to be decrypted crosses one or more block-aligned boundaries, the keystream generator 1054 may be re-invoked for the subsequent blocks with the code tweak 1044 being increased by an amount equal to the block size each time that it is re-invoked.

A logic function 1052 (e.g., XOR operation, etc.) is then performed on keystream 1051 and an encrypted code block 1062 (which may be a cache line in some implementations) selected from the memory location referenced by the decoded linear address 1030. The granularity of the encrypted code block 1062 matches the keystream 1051 output from of the keystream generator 1054, and the logic function 1052 produces the decrypted code block 1060. As previously noted, other forms of cryptographic algorithms may be used to encrypt and decrypt code including, but not necessarily limited to various types of tweakable block ciphers.

For some types of cryptography, the encrypted code block that is decrypted may include multiple instructions. For example, a 16-byte block (or other size) encrypted and decrypted in a block cipher mode, can include multiple instructions or fragments of instructions that extend into other encrypted code blocks. Nevertheless, all 16 bytes of an encrypted code block (e.g., 1062) may be decrypted at a time and the decoder can identify the location of the relevant instruction within the decrypted code block 1060. In at least one embodiment, the other decrypted instructions may not be written to the buffer and, in this scenario, these instructions are decrypted again when fetched for execution. In some architectures, for example where instructions have fixed instruction widths, each individual instruction may be decrypted without necessarily decrypting other surrounding instructions.

Figure 11A:
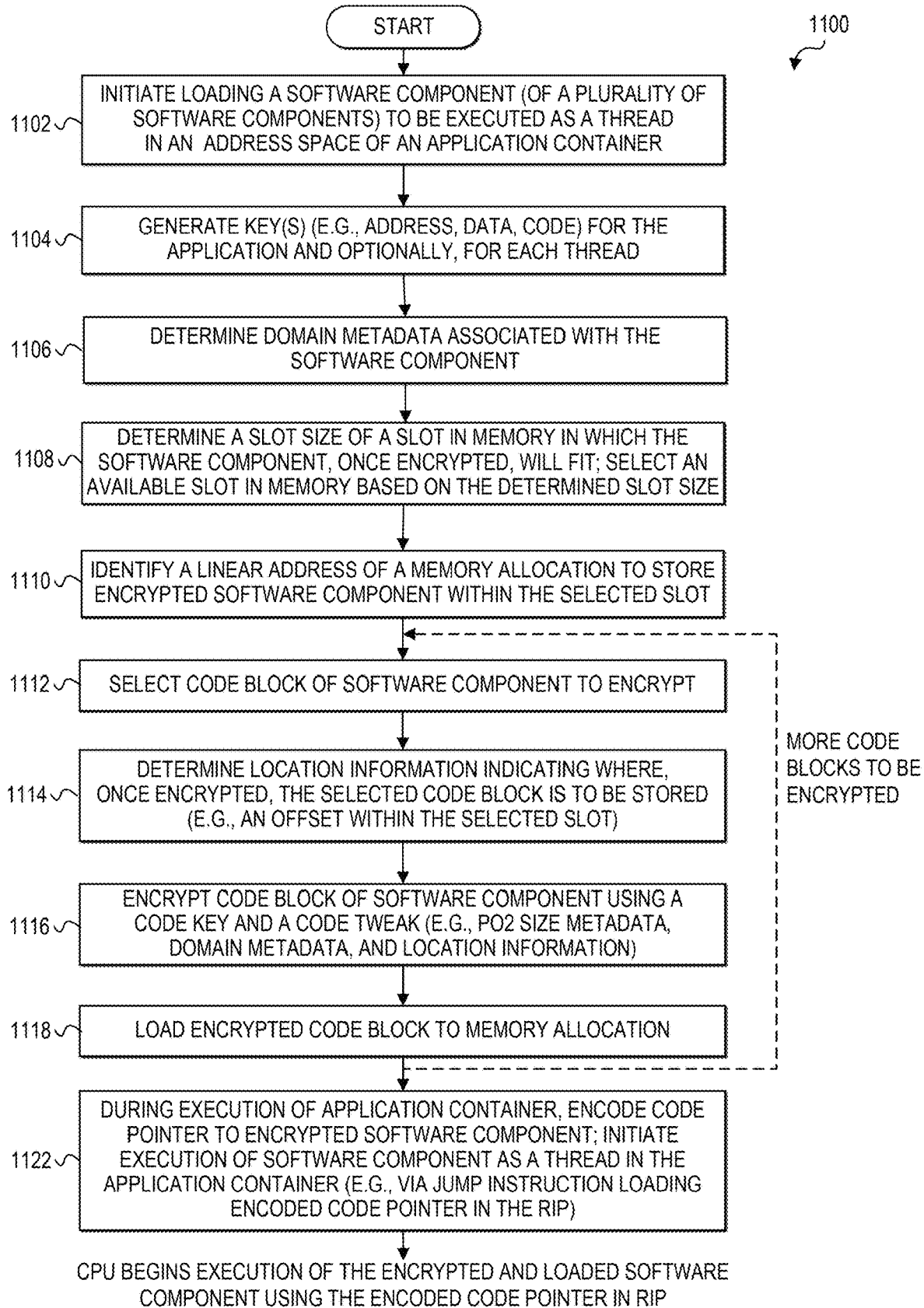
FIG. 11A is a simplified flow diagram of example operations for loading code of a software component for execution as a thread in an application container according to at least one embodiment.

FIG. 11A is a simplified flow diagram illustrating a process 1100 including example operations associated with loading code of a software component for execution according to at least one embodiment. In an example scenario, a plurality of software components may be loaded in an application container for execution as respective threads. At least one of the software components is loaded prior to runtime of the container. In addition, one or more of the software components may be dynamically loaded during runtime. Accordingly, process 1100, or a portion thereof, may be invoked before runtime and potentially during runtime depending on the particular scenario.

In at least one embodiment, a loader (e.g., 142) may run on a processor (e.g., 102) to perform one or more operations of process 1100. Although the loader may be configured to perform the operations of process 1100, it should be appreciated that alternative implementations can allow for one or more operations of process 1100 to be performed by hardware, firmware, or software of a computing device (e.g., 100), or any suitable combination thereof. In addition, although FIG. 11A references the software component loaded for execution as a separate thread in an application container, it should be apparent that process 1100 is also applicable to loading a software component as part of an application without an application container, and/or to loading a software component that is not executed as a separate thread.

At 1102, a loader initiates loading a software component into memory for execution as a thread in an address space (e.g., linear/virtual address space) allocated for an application container. The loader may initiate the loading of the software component before runtime (e.g., when the software component and potentially other software components are compiled, linked, and loaded for execution). In other scenarios, the loader may initiate the loading of the software component during runtime when the software component is called (or otherwise invoked) and needs to be dynamically loaded for execution in the application container. The software component may be one of a plurality of software components that are run as separate threads in the application container. The software components may include, for example functions, microservices, browser components, or any other program code that can be executed as a thread in an application container. One or more (or none) of the software components may be independently executable.

Encryption/decryption keys that are used for encryption and decryption of data, code, and pointers may be unique for each container or for each thread (software component/domain) within a container. In some scenarios, if a container runs multiple separate applications, then the keys may be unique to the applications within the container. Additionally, in some implementations, the same key may be used for data and code encryption/decryption or different keys may be used for data and code encryption/decryption. For position-independent code, such as shared libraries, a shared code key and a shared data key (or a single shared key for both data and code) may be generated and used across containers in a platform. At 1104, if appropriate keys for encryption/decryption of data, code, and pointers have not yet been obtained, such keys may be generated or otherwise obtained as previously described herein.

At 1106, domain metadata, such as a domain identifier, associated with the software component is determined. For example, a domain ID may be dynamically generated and shared across a platform or pre-determined and stored in memory or other storage that is accessible to the loader. In some scenarios, a domain identifier uniquely identifies the software component relative to other software components executed as threads in the same container (e.g., sharing the same address space). Thus, this domain identifier can effectively uniquely identify respective threads in the container. In some scenarios, a domain identifier uniquely identifies the software component relative to other software components running in the same container or other containers in the same platform. For example, a domain identifier associated with a shared library may uniquely identify that shared library across a platform, such that the same domain identifier can be used when the shared library is invoked in different containers within the platform. For a software component that is not a shared library, but that can be invoked by different containers, a domain identifier may uniquely identify the software component running as a thread in a container relative to the same software component running as a thread in another container. Thus, a domain identifier may uniquely identify a thread of a software component within a container relative to other threads of other software components (e.g., shared libraries, functions, microservices, browser components, etc.) and may also uniquely identify the thread across a platform having other containers with other threads of the same or different software components.

Upon determining the size of memory needed to store the code of the software component once it is encrypted, at 1108, a slot size of a slot in memory in which the encrypted software component will fit is selected. In a power of two scheme, a power of two slot size may be selected, where slot size is $2^n$ bytes. A slot size can be selected using any suitable slot-size selection algorithm for selecting a fixed slot size in memory. For example, a minimum slot size that can fit the pre-encrypted software component may be selected. By way of illustration, for a memory having 16-byte minimum allocations, a 16-byte slot size is selected for any software component that needs 1-16 bytes of memory, a 32-byte slot size is selected for any software component that needs 17-32 bytes of memory, 64-byte slot size is selected for any software component that needs 33-64 bytes of memory, and so on. Once the slot size is selected, a slot with the selected slot size is selected from available slots in the memory allocated for code (e.g., text segment).

At 1110, a linear address of a memory allocation for the encrypted code of the software component can be obtained. The code of the software component can contain one or more code blocks. The linear address represents the memory location where the first encrypted code block of the software component is to be stored. Determining the location of the memory allocation within the selected slot may be based on a rule for positioning the encrypted software component within a selected slot. One example rule that may be followed is to align the first encrypted code block with the beginning of the selected slot. An alternative rule that may be followed is to align the end of the last encrypted code block with the end of the selected slot. It should be noted that, for some software components (e.g., position dependent code), the slot selection algorithm may be different. For example, the slot selection algorithm may select a slot based on the approach described with reference to FIG. 6.

At 1112, a code block in the software component is selected for encryption. The process may sequentially select the code blocks in the software component. Thus, initially, the first code block in the software component may be selected for encryption. At 1114, location information associated with the code block selected for encryption is determined. The location information can indicate the relative position of the selected code block based on where the selected code block is to be stored once the selected code block is encrypted and loaded in memory. In one example, the relative position can be calculated as a code byte offset of the memory location where the encrypted code block is to be stored within the selected slot of the address space of the application container. For the first (initial) code block of the software component, the memory location where the code block is to be stored may correspond to the beginning of the memory allocation, such as the linear address identified at 1110. In this case, the code byte offset can be calculated as the difference in bytes between the start of the memory allocation and the start of the selected slot. This may be computed, for example, based on linear addresses or any other suitable type of memory addresses or other information that enables the calculation of the offset within the selected slot. Subsequent code byte offsets calculated for succeeding code blocks to be stored in the memory allocation may be computed using the start of the slot and the memory locations within the memory allocation where the succeeding code blocks are to be stored.

At 1116, the selected code block is encrypted based on a code key and a code tweak. In some scenarios, a code key may be omitted and encryption may be performed using only a code tweak. In one or more embodiments, the code tweak can be generated from the information obtained by the loader (e.g., prior to runtime during the initial load, or during runtime for dynamic loads). In one or more embodiments, the code tweak to encrypt the code block can include the power size metadata representing the value of the exponent in the power of two number corresponding to the size of the selected slot, the domain metadata (e.g., a domain identifier that uniquely identifies the software component and/or the thread of the software component), and the location information of the code block within the address space (e.g., a code byte offset of the memory location where the encrypted code block is to be stored within the selected slot of the address space). In at least one implementation, an AES-CTR mode block cipher may be used to encrypt the code block, and accordingly, the code tweak can be used as an initialization vector with the code byte offset serving as the counter value.

At 1116, the encrypted code block can be loaded into the memory allocation (at the appropriate location within the memory allocation) in memory. For example, the first code block to be encrypted may be loaded at the start of the memory allocation in-memory. If one or more additional code blocks of the software component are to be encrypted, then flow can return to 1112, where the location information for the next code block to be encrypted can be calculated. For example, the code byte offset can be calculated for the next code block to be encrypted and loaded. In one example, the current code byte offset may be incremented by the appropriate number of bytes representing the byte size of the current code block. At 1118, the encrypted code block can be loaded into memory.

Once the code of the software component has been encrypted and loaded in memory, and other linking and loading has finished, the application container may begin execution. At 1120, during the execution of the application container the software component may be invoked (e.g., jump instruction, call instruction). An encoded pointer to the beginning of the encrypted code blocks (e.g., beginning of the memory allocation) can be generated. The pointer may contain the linear address (e.g., in bits 0-47) of the start of the memory allocation and may be encoded as previously described herein (e.g., FIG. 5, FIG. 10B), with power size metadata (e.g., in bits 58-63) and domain metadata such as a domain ID (e.g., in bits 48-57). Some of the bits in the encoded pointer may also be encrypted as previously described herein. For example, the bits containing the domain ID (e.g., bits 48-57) and the upper linear address bits (e.g., 32-47) may be encrypted with an address key and an address tweak. The address tweak can include, for example, the power size metadata and at least a portion of the linear address (e.g., lower address bits 0-31).

Once the encoded code pointer has been generated, the software component can be initiated as a thread in the container by the loader transferring control to the software component. In one example, the loader can execute a jump instruction (e.g., JMP) using the encoded code pointer as an operand. The instruction can cause the encoded code pointer to be loaded to the instruction pointer register (e.g., RIP 113). Once the RIP contains the new encoded code pointer, the CPU can begin execution by accessing the encoded code pointer in the RIP, decoding the encoded code pointer, and fetching the first (next) instruction to be executed.

Figure 11B:
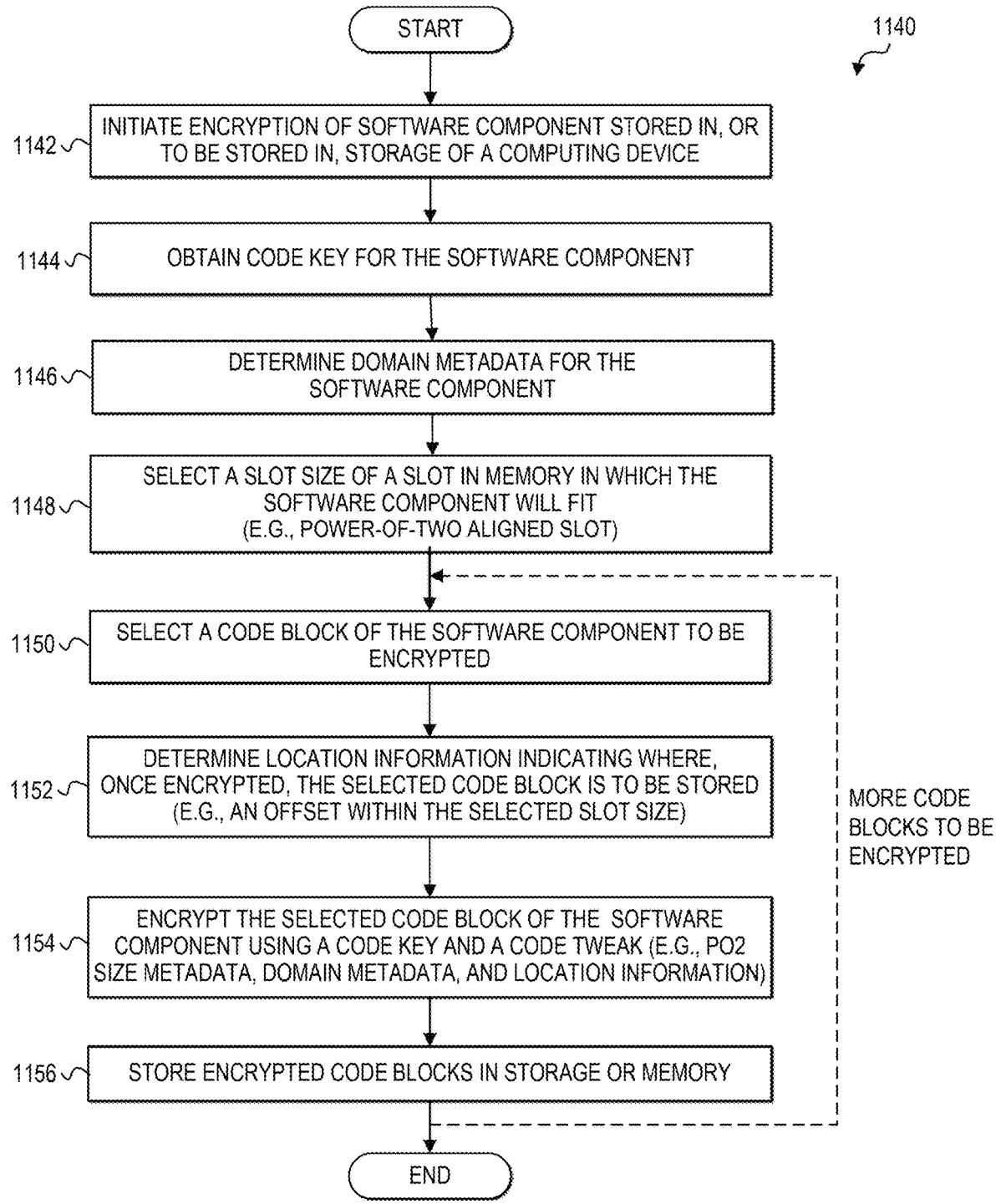
FIG. 11B is a simplified flow diagram of example operations for pre-encrypting code of a software component according to at least one embodiment.

FIG. 11B is a simplified flow diagram illustrating a process 1140 including example operations associated with pre-encrypting a software component for execution according to at least one embodiment. In an example scenario, a package manager may perform one or more of the operations of process 1140 to encrypt software components in storage (e.g., on a hard disk drive, solid-state drive, etc.). In one example, the package manager may be embodied as software (e.g., as part of a privileged system component 140). It should be appreciated that alternative implementations can allow for one or more operations of process 1140 to be performed by hardware, firmware, or software of a computing device (e.g., 100), a separate and/or remote system, or any suitable combination thereof. Moreover, the software components may be position independent code and shareable among other processes (e.g., application containers, applications).

At 1142, a package manager initiates a process to encrypt a software component stored in (or to be stored in) storage of a computing device (e.g., 100). At 1144, a code key is obtained to be used to encrypt the software component. The code key may be specific to the software component and shared across domains and processes to ensure the same decryption of the software component.

At 1146, domain metadata associated with the software component, such as a domain ID, is determined as previously described herein. For example, a domain ID may be dynamically generated by a package manager and made accessible to the loader (e.g., via an ELF file), or may be pre-determined (e.g., by a loader) and made accessible to the package manager. The domain ID may identify the software component, which may be unique relative to other software components in an application, in a container, and/or across a platform. For pre-encrypted software components, the domain ID is not determined based on a particular thread of a process.

Based on the size of memory needed to store the software component once it is pre-encrypted, at 1148, a slot size of a slot in memory in which the pre-encrypted software component will fit can be selected. A slot size can be selected using any suitable slot-size selection algorithm for selecting a fixed slot size in memory, as previously described herein (e.g., In FIGS. 10A and 11A).

At 1150, a code block of the software component can be selected for encryption. Code blocks of a software component may be encrypted sequentially when using, for example, an AES-CTR mode block cipher or a tweakable block cipher. Accordingly, a first code block of the software component is selected.

At 1152, location information associated with the code block selected for encryption is determined. The location information can indicate the relative position of the selected code block within a slot having the selected slot size. The determination of the relative position of the selected code block may be based on a rule for positioning the pre-encrypted software component within a slot having the selected slot size. One example rule that may be followed is to align the first pre-encrypted code block with the beginning of a slot having the selected slot size. An alternative rule that may be followed is to align the end of the last pre-encrypted code block with the end of a slot having the selected slot size. The relative position of the selected code block can be an offset calculated as the difference (e.g., in bytes) between the start of the selected code block and the start of the slot having the selected slot size.

At 1154, the selected code block is encrypted based on a code key and a code tweak. In some scenarios, a code key may be omitted and encryption may be performed using only a code tweak. In one or more embodiments, the code tweak can be generated from the information generated or otherwise obtained by the package manager. In one or more embodiments, the code tweak to encrypt the code block can include the power size metadata representing the value of the exponent in the power of two number corresponding to the size of the selected slot, the domain metadata (e.g., a domain identifier that uniquely identifies the software component and/or the thread of the software component), and the location information of the code block within a slot having a slot size selected based on the particular software component to be encrypted. In at least one implementation, an AES-CTR mode block cipher may be used to encrypt the selected code block, and accordingly, the code tweak can be used as an initialization vector with the code byte offset serving as the counter value.

At 1156, the pre-encrypted code block may be stored in storage (e.g., hard disk drive (HDD), solid state drive (SSD), etc.)) for shared use by containers and/or applications. In other embodiments, the encrypted code block may not be stored until a particular number of code blocks or a particular size of the pre-encrypted code has been generated.

If one or more additional code blocks of the software component are to be pre-encrypted, then flow can return to 1150, where the next code block to be encrypted can be selected. For example, the next sequential code block may be selected. This flow may continue until all of the code blocks of the software component have been encrypted.

Figure 12:
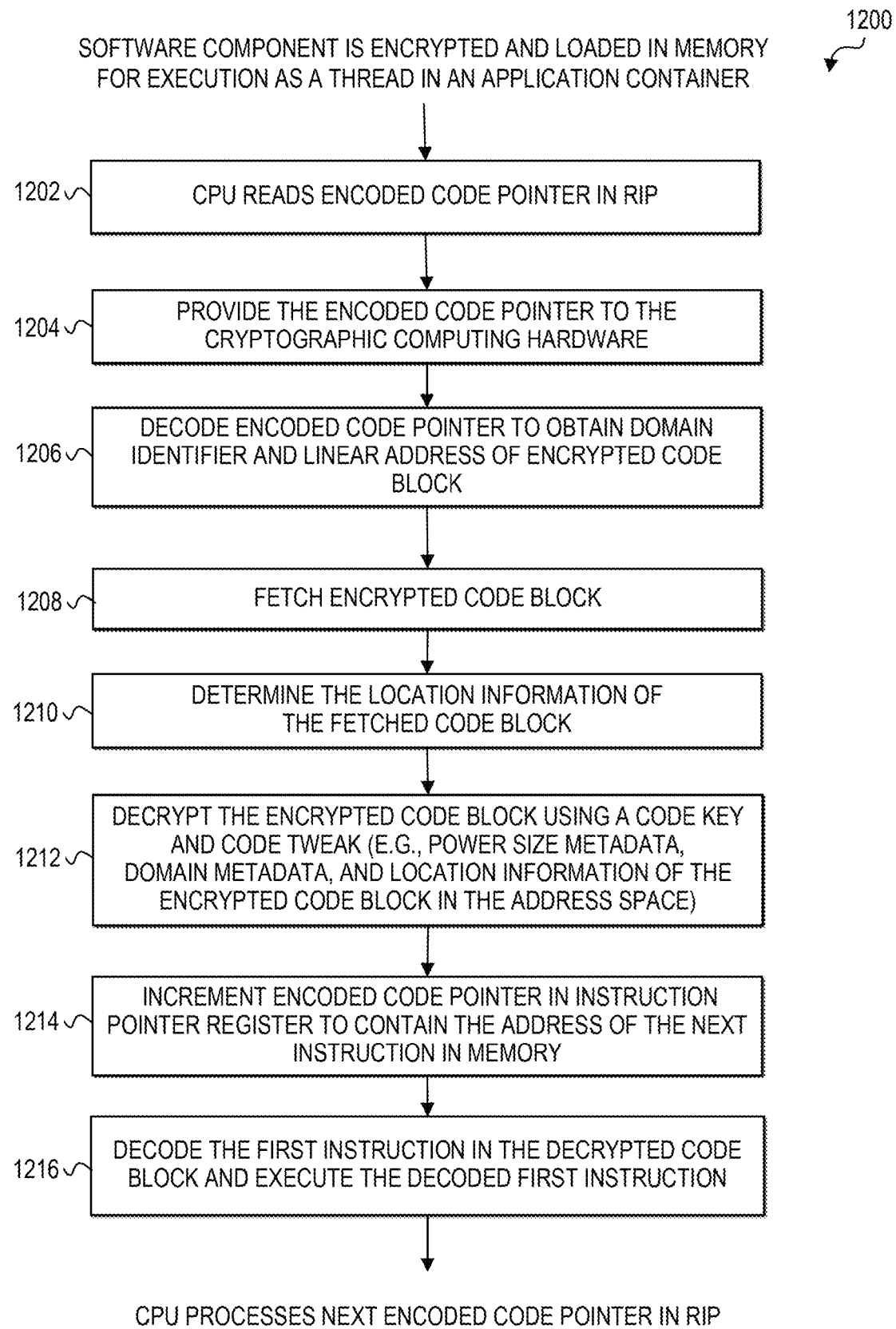
FIG. 12 is a simplified flow diagram of example operations for fetching encrypted code using encoded pointers according to at least one embodiment.

FIG. 12 is a simplified flow diagram illustrating a process 1200 including example operations for using an encrypted code pointer to fetch and decrypt encrypted code of a software component executing as a thread in an application container according to at least one embodiment. Process 1200 can be performed during runtime when the code of a software component has been encrypted and loaded into a memory allocation in memory, and an encoded code pointer to the encrypted code in memory is stored in an instruction pointer register (RIP). A processor (e.g., a processor 102, a central processing unit (CPU) of processor 102, etc.) uses the encoded pointer in the RIP to fetch the next code block, which contains the next instruction to be executed. In at least one embodiment, hardware may perform one or more operations illustrated in process 1200 of FIG. 12. For example, hardware to perform such operations could include hardware of processor 102 configured to perform address decoding logic 154, address decrypting logic 155, code fetch logic 164, code decrypting logic 165. Although hardware may be configured to perform the operations of process 1200, it should be appreciated that alternative implementations can allow for one or more operations of process 1000 to be performed by hardware, firmware, or software of a computing device (e.g., 100), or any suitable combination thereof.

When code of a software component has been encrypted and loaded in memory, an instruction pointer register (e.g., RIP 113) can hold an encoded code pointer to the next instruction to be fetched by the processor. The encoded code pointer may be configured as previously described herein (e.g., 206, 216, 510, 610, 910). At 1202, the processor reads the RIP. At 1204, the processor can provide the encoded code pointer to the cryptographic computing hardware. At 1206, the encoded code pointer can be decoded to obtain the domain identifier and the linear address of an encrypted code block in memory. An encrypted portion of the encoded code pointer may be decrypted as shown and described herein (e.g., FIGS. 2A, 10C). The encrypted portion, which can contain an encrypted domain ID and encrypted upper address bits of the linear address, can be decrypted using an address key and an address tweak. The address tweak may include power size metadata (e.g., 502, 1002) and lower address bits (e.g., 509, 1009) of the linear address encoded in the encoded code pointer. Decrypting the encrypted portion can generate a domain ID (e.g., 503, 1003) and upper address bits (e.g., 504, 1004) of the linear address encoded in the encoded code pointer.

If the encoded code pointer references position-independent code (e.g., a shared library), then the domain identifier may uniquely identify the software component relative to other software components across the platform in which the container is executing. The same domain ID may be used when the position-independent code is invoked by other applications (or containers). If the encoded code pointer references other code (e.g., position dependent code), then the domain identifier may uniquely identify the software component and container (or application if multiple applications can run in the container or if there is no container) combination. In this scenario, such a domain ID would effectively uniquely identify the thread of the software component relative to other threads in the container and across the platform.

At 1208, the linear address obtained from decoding the encoded code pointer is used to fetch an encrypted code block from a memory allocation for the software component. The encrypted code block includes the next executable instruction to be executed and may also include one or more other executable instructions. At 1210, the location information of the encrypted code block in the address space of the application container can be determined. For example, the relative position can be calculated as a code byte offset of the encrypted code block within the memory slot (e.g., power of two slot) to which the memory allocation containing the encrypted code block is assigned. The code byte offset can be calculated as the difference between the memory location where the encrypted code block is stored in-memory and the location of the slot start in-memory. This may be computed, for example, based on the linear address at the start of the encrypted code block and the linear address at the start of the memory slot, or any other suitable information that enables the calculation of the code byte offset within the memory slot in bytes.

At 1212, the fetched encrypted code block can be decrypted using a code key and a code tweak. The code tweak may include the power size metadata, domain metadata, and the location information of the encrypted code block in the address space (e.g., an offset of the encrypted code block within the memory slot to which the memory allocation that contains the encrypted code block is assigned). In one example, an AES-CTR mode block cipher can be used to encrypt the code tweak and generate a keystream. A logic function (e.g., XOR) may then be performed on the keystream and the encrypted code block to decrypt the encrypted code block and produce a decrypted code block. The decrypted code block includes the instruction to be executed.

At 1214, the encoded code pointer in the instruction pointer register can be incremented to the linear address that references the next instruction in memory that is to be fetched and then executed. At 1216, the first instruction in the decrypted code block is decoded, and the decoded instruction (e.g., micro-operations) is executed by an execution unit. The processor can process the next encoded code pointer in the RIP to obtain the next executable instruction. For example, the flow of process 1200 may continue to loop back to 1202 until all of the instructions have been executed or otherwise handled.

In an implementation for some architectures, the next instruction to be executed may be fetched by the processor in an encrypted code block and decrypted as previously described, even if that instruction was included in the previously fetched encrypted code block. In other architectures, however, if an encrypted code block contains multiple instructions, once the encrypted code block is decrypted, the instructions in the decrypted code block may be sequentially decoded and executed (or otherwise handled) until all of the instructions in the decrypted code block have been executed. Then, a new code block containing the next instruction or multiple instructions can be fetched.

Figure 13:
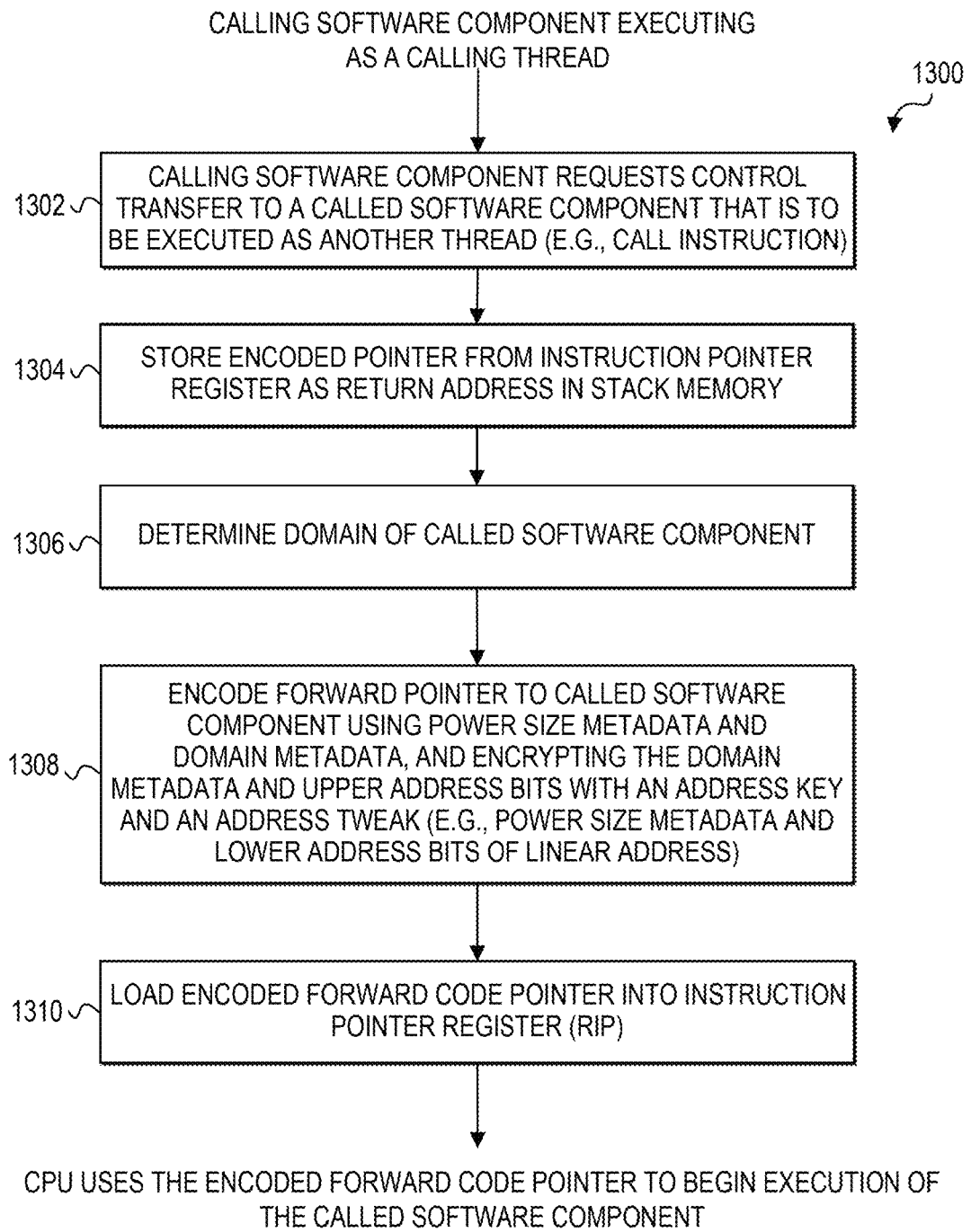
FIG. 13 is a simplified flow diagram illustrating example operations associated with transitioning from one domain in an application container to another domain in the application container according to at least one embodiment.

FIG. 13 is simplified flow diagram illustrating a process 1300 including example operations associated with transferring control from one domain in a container to another domain in the container according to at least one embodiment. The domains represent respective software components executing as respective threads in the container. Process 1300 can be performed during runtime when the code of at least one domain (i.e., a calling software component) has been encrypted and loaded into a memory allocation in memory, and an encoded code pointer to the encrypted code in memory is stored in an instruction pointer register (RIP). Process 1300 can be performed to fetch and decrypt an encrypted code block that contains the next instruction to be executed. The decrypted instruction may be any type of instruction to transfer control (e.g., JMP, CALL, etc.) from the calling thread to a called software component that is to be executed as another thread. In at least one embodiment, a loader (e.g., 142) may be invoked to perform operations to handle the transfer of control from the calling thread to a called thread. Although the loader may be configured to perform the operations of process 1300, it should be appreciated that alternative implementations can allow for one or more operations of process 1300 to be performed by hardware, firmware, or software of a computing device (e.g., 100), or any suitable combination thereof.

At 1302, the software component requests control to be transferred to another software component executing as (or to be executed as) a different thread in the container, via a CALL or JMP instruction, for example. A return address to the next instruction in the calling software component may be generated as a cryptographically encoded pointer. For example, the encoded code pointer in the RIP may be obtained and incremented in mutable address bits (e.g., 508, 1008) to reference the next instruction in the calling software component. At 1304, the encoded return address can be stored in stack memory. A stack pointer can be generated in any suitable configuration to access the stack memory and may be used to encrypt the return address stored in the stack memory. One example is illustrated in FIG. 9 with stack memory 900, return address 906, and stack pointer register (RSP) 902.

At 1306, the domain metadata (e.g., domain ID) of the called software component can be determined. For example, the domain metadata may be information that is available to the CPU based on the reference in the control transfer instruction to the called software component.

At 1308, an encoded forward code pointer to the called software component can be generated. The linear address and associated metadata may be obtained, for example, from operands in the control transfer instructions, or from memory where the information is stored. The linear address can reference a memory allocation where the encrypted code of the called software component is stored. The metadata can include a domain ID of the called software component (or thread) and power size metadata indicating the size of the memory slot to which the memory allocation is assigned. The power size metadata, domain ID, and linear address can be stored in the pointer. The domain ID and upper address bits of the linear address can be encrypted using an address key and an address tweak. The address tweak can include the power size metadata and lower address bits of the linear address.

If the called software component has not yet been encrypted and loaded (e.g., dynamic loading during runtime), then a privileged component can be invoked (e.g., loader 142) to allocate memory, select a slot of memory to which the memory allocation can be assigned, and encode the forward code pointer. The called software component can be encrypted and loaded in the memory allocation. For example, one or more operations to encrypt a software component and encode a code pointer as shown and described with reference to FIGS. 10A-10B and/or FIG. 11 may be performed.

At 1310, the encoded forward code pointer can be loaded into the instruction pointer register. The CPU can use the encoded forward code pointer to begin execution of the called software component, which may be a new and/or different thread than the calling thread.

For ease of description, various embodiments disclosed herein are described with reference to software components being loaded for execution in a container and executing as separate threads within the container. It should be appreciated, however, that the code and data isolation concepts disclosed herein are also applicable to implementations in which software components are loaded for execution in a process of an application without the constructs of a container. Furthermore, the data and code isolation concepts disclosed herein can be applied to software components sharing a memory address space of a container or an application process even when the software components are not executing as separate threads.

Figure 14:
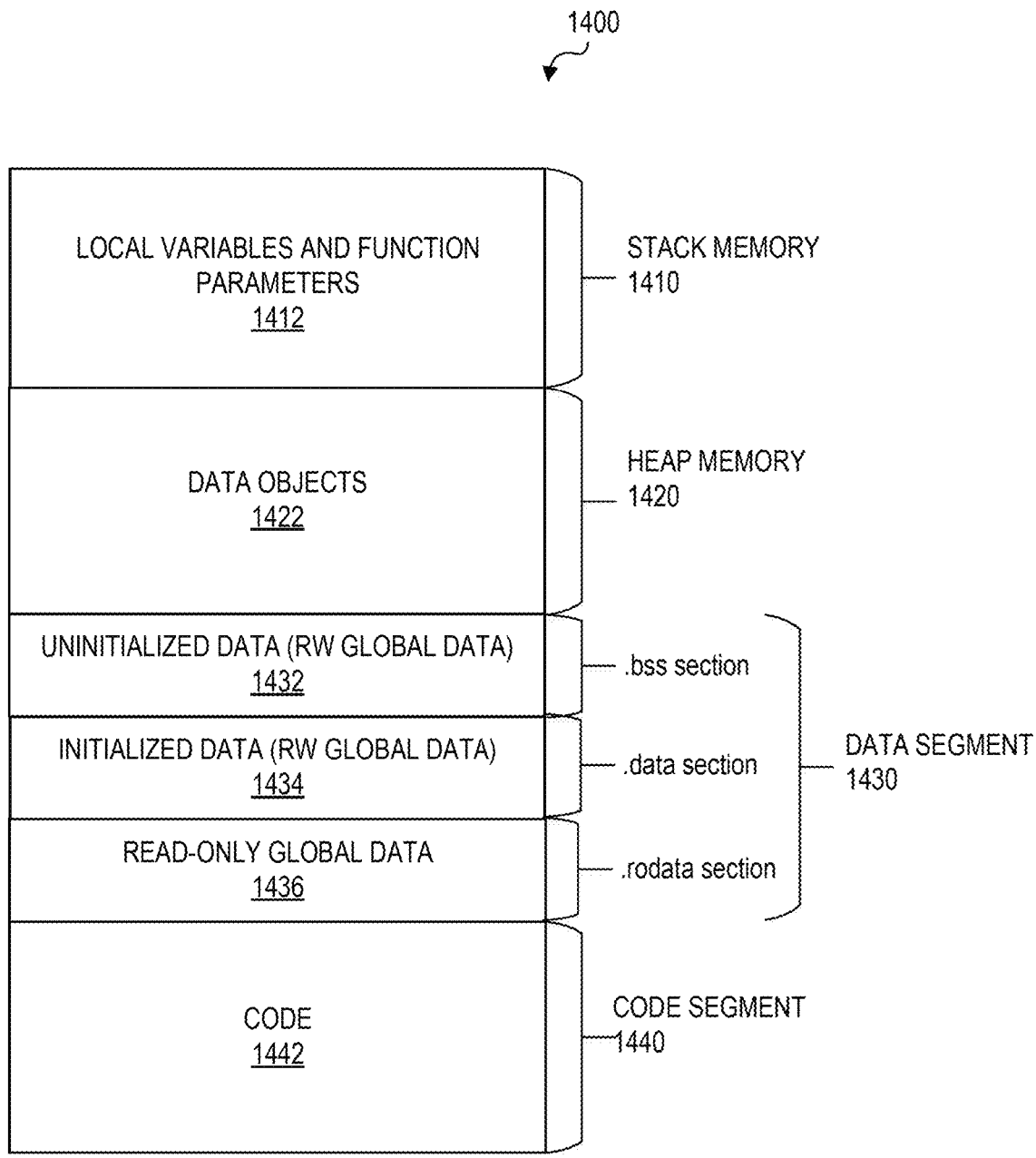
FIG. 14 is a block diagram of an example virtual/linear address space of an application.

Turning to FIG. 14, a block diagram of an example virtual/linear address space 1400 of an application is shown. The address space 1400 may include a stack 1410, a heap 1420, a data segment 1430, and a code (or text) segment 1440. Stack memory 1410 can include local variables and function parameters 1412. Function parameters and a return address may be stored each time a function (or other software component) is called. An example of stack memory is shown and described in FIG. 9 as stack memory 900. Heap memory 1420 is dynamically allocated and stores data objects 1422, which can include arrays.

Data segment 1430 includes a first section (e.g., .bss section) for storing uninitialized data 1432. Uninitialized data 1432 can include read-write global data that is initialized to zero or that is not explicitly initialized in the program code. Data segment 1430 may also include a second section (e.g., .data section) for storing initialized data 1434. Initialized data 1434 can include read-write global data that is initialized with something other than zeroes (e.g., characters string, static integers, global integers). The data segment 1430 may further include a third section (e.g., .rodata section) for storing read-only global data 1436. Read-only global data 1436 may include global data that can be read, but not written. Such data may include constants and strings, for example.

The code segment 1440 (also referred to as 'text segment') of the virtual/linear address space 1400 further includes code 1442, which is composed of executable instructions. In one or more embodiments, code 1442 is encrypted as previously described herein. For example, code of various software components may be encrypted as described with reference to FIGS. 10A, 11A, and 11B.

Embodiments disclosed herein for isolating domains also provide for cryptographic computing protection of the data associated with the isolated domains. Data stored in a virtual/linear address space 1400 of a container (or application without a container), may be encrypted/decrypted based on a data key and a data tweak. The data tweak may be derived, at least in part, from an encoded pointer to the data being encrypted/decrypted. In addition, the encoded pointer to the data may include a portion that is encrypted/decrypted based on an address tweak derived, at least in part, from the encoded pointer. The particular encoded pointer configurations, address tweaks, address keys, data tweaks, and data keys used to achieve domain isolation for the data, however, may vary depending on the type of data.

Figure 15:
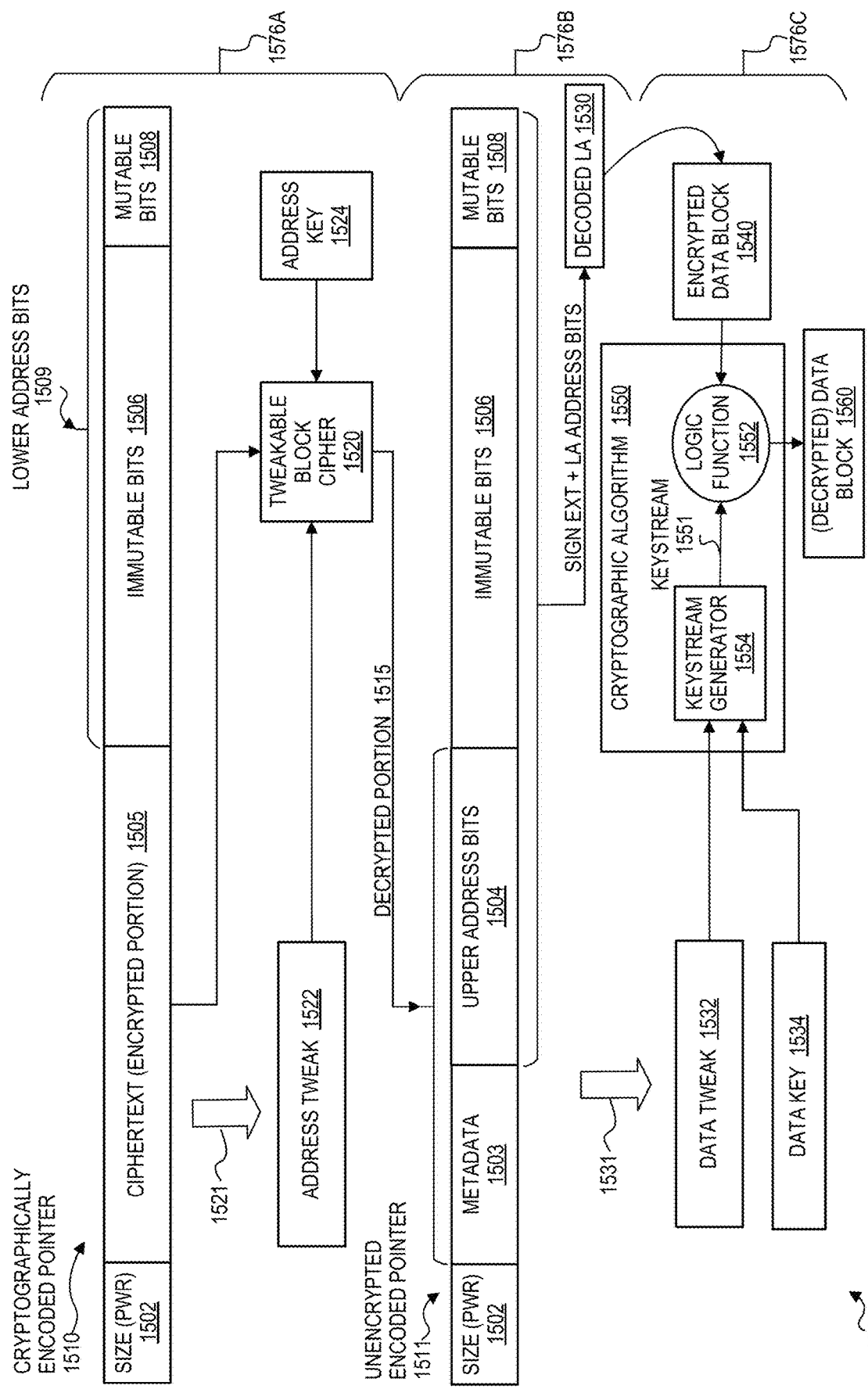
FIG. 15 is a flow diagram illustrating an example process of obtaining and decrypting encrypted data referenced by a cryptographically encoded pointer according to at least one embodiment.

FIG. 15 is a generalized flow diagram illustrating an example process 1500 of obtaining (e.g., reading, fetching) and decrypting various types of encrypted data associated with a particular domain. The encrypted data comprises at least one encrypted data block 1540, referenced by a cryptographically encoded pointer 1510, where encryption/decryption of the data is bound to the addressing layer via a data tweak 1532 that is derived at least in part from suitable information 1531 such as the cryptographically encoded pointer 1510 and/or the unencrypted encoded pointer 1511. In at least one embodiment, process 1500 may be performed in hardware (e.g., address decoding logic 154, address decrypting logic 155, data read logic 174, and data decrypting logic 175). In other embodiments, process 1500 (or a portion thereof) may be performed by firmware and/or software, or by any suitable combination of hardware, firmware, and/or software.

The configuration of cryptographically encoded pointer 1510 may vary depending on the type of data that is being accessed. Furthermore, the decryption of an encrypted portion 1505 may be based on an address key and an address tweak 1522 that may vary depending on the type of data being accessed. Generally, the cryptographically encoded pointer 1510 includes a size (power) metadata 1502 (e.g., similar to size metadata 502 in FIGS. 5 and 1002 in FIGS. 10A-10C), an encrypted portion 1505 (e.g., similar to encrypted portions 505 in FIGS. 5 and 1005 in FIGS. 10A-10C), and lower address bits 1509 of the linear address of encrypted data block 1540. The lower address bits 1509 include immutable bits 1506 (e.g., similar to immutable plaintext portion 506 in FIGS. 5 and 1006 in FIGS. 10A-

10C) and mutable bits 1508 (e.g., similar to mutable bits 508 in FIGS. 5 and 1008 in FIGS. 10A-10C).

The operations of process 1500 are identified in three phases: address decryption (Phase I 1576A), address formation (Phase II 1576B), and data decryption (Phase III 1576C). In Phase I 1576A, the linear address of encrypted data block 1540 embedded in pointer 1510 is decrypted. Specifically, ciphertext 1505 is decrypted by a decryption algorithm such as a tweakable block cipher 1520 using an address key 1524 and an address tweak 1522. The address tweak 1522 may be derived 1521 at least in part from the cryptographically encoded pointer 1510. For example, size metadata 1502 and lower address bits 1509 can form address tweak 1522 for at least some types of data. Additionally, the ciphertext 1505 may include other metadata (e.g., version, domain, etc.) encoded in the cryptographically encoded pointer 1510. If encrypted metadata is part of the ciphertext 1505 of pointer 1510, then the encrypted metadata may also be decrypted by the tweakable block cipher 1520 when the ciphertext 1505 is decrypted. The block cipher 1520 may be the same or similar block cipher used to decrypt ciphertext portions of the cryptographically encoded code pointers (e.g., tweakable block cipher 1020 in FIG. 10C). In other implementations, a different suitable cryptographic algorithm may be used.

Once the ciphertext 1505 has been decrypted into a decrypted portion 1515 by tweakable block cipher 1520, a decoded linear address 1530 of encrypted data block 1540 can be formed in Phase II 1576B. The lower address bits 1509 and upper address bits 1504 can be concatenated with the most significant bits, which may be noncanonical/unused address bits in some architectures, to form the decoded linear address 1530. Generally, the formation of decoded linear address 1530, and variations thereof, are the same or similar to the formation of a decoded linear address for an encrypted code block, as previously described herein (e.g., at least with reference to FIG. 10C). Additionally, processor checks on whether the decrypted portion 1515 has decrypted correctly and whether the decoded linear address is out-of-bounds may also be the same or similar to the processor checks for code pointers that have been decoded (e.g., at least as described with reference to FIG. 10C). For brevity, the description is not repeated here.

The decoded linear address 1530 is used to find the memory location of the first encrypted data block 1540 to be decrypted in Phase III 1576C. The encrypted code block 1540 is decrypted by a cryptographic algorithm 1550 that includes a keystream generator 1554 and a logic function 1552. The keystream generator 1554 and logic function 1552 may be used to encrypt and decrypt data blocks and may be the same or similar to keystream generator 1054 and logic function 1052, respectively, which are used to encrypt/decrypt code blocks as shown in FIGS. 10A and 10C. In other implementations, a different suitable cryptographic algorithm may be used, such as a tweakable block cipher, for example. In the embodiment shown in FIG. 15, a data tweak 1532 used to tweak the decryption may be the same or different than the code tweak 1044 of FIGS. 10A and 10C, as will be further discussed herein. Generation of keystream 1551 may commence without waiting for encrypted data block 1540 to be read. Keystream generator 1554 encrypts data tweak 1532 based on data key 1534 to generate keystream 1551. It should be noted that the value of data tweak 1532 and the keystream 1551 may be adjusted in the same or similar manner as code tweak 1044 in FIGS. 10A and 10C, and that keystream 1551 may be adjusted in the same or similar manner as keystream 1051 in FIGS. 10A and 10C.

Additionally If data that crosses block-aligned boundaries may be handled in the same or similar manner as code that crosses block-aligned boundaries as described with reference to FIGS. 10A and 10C.

Logic function 1552 (e.g., XOR operation, etc.) is then performed on keystream 1551 and an encrypted data block 1540 (which may be a cache line in some implementations) selected from the memory location referenced by the decoded linear address 1530. The granularity of the encrypted code block 1540 matches the keystream 1551 output from the keystream generator 1554, and the logic function 1552 produces the decrypted code block 1060. As previously noted, other forms of encryption may be used to encrypt and decrypt code including, but not necessarily limited to various types of tweakable block ciphers. Also, it should be noted that unencrypted data blocks may be encrypted using the same cryptographic algorithm 1550, with the same data key and data tweak.

Reference is now made to FIGS. 14-15 to discuss variations of pointer encodings used for different types of data in accordance with one or more embodiments. For heap memory, encoded pointers to data blocks (e.g., data objects 1422) may be similar to encoded pointer 1510. For data objects 1422 in heap memory 1420 of virtual/linear address space 1400, the metadata 1553 of encoded pointer 1510 may include version and/or tag data. The version and/or tag data can be encrypted/decrypted as part of encrypted portion 1505. Domain isolation of a data block in heap memory 1420 can be achieved using data tweak 1532 and data key 1534 for encrypting/decrypting the heap data block. The data tweak 1532 may include mutable bits 1508 of the lower address bits 1509 and any other suitable information 1531 derived at least in part from the encoded pointer 1510 and/or the decoded pointer 1511. In one example, the data tweak 1532 may include the entire cryptographically encoded pointer 1510 or the entire unencrypted encoded pointer 1511, each of which includes mutable bits 1508. In addition, each domain may be assigned a unique data key (e.g., 1534) to be used in the cryptographic algorithm 1550 for encryption/decryption of heap data.

In an alternative embodiment for heap data, the same data key (e.g., 1534) may be used for multiple domains (e.g., one data key per container or application), but the metadata 1553 of encoded pointer 1510 may include domain metadata (e.g., domain ID). In this embodiment, the data tweak 1532 can include size metadata 1502, the domain metadata, and fixed address bits (e.g., upper address bits 1504, immutable bits 1506, or both).

Some data may be accessed via instruction pointer register (RIP) relative accesses ("RIP-relative" addressing). RIP-relative accesses may reference a data segment (e.g., data segment 1430) to access read-only global data 1436 from the .rodata section and read-write global data from the .data section (e.g., initialized data 1434) and from the .bss section (e.g., uninitialized data 1432). Some compilers may also emit constant pools, which are analogous to read-only globals in .rodata.

Read-write global data can be handled using the same pointer formats and keys as heap data, and the loader (e.g., 142) can initialize the encoded pointer accordingly. A software component may be allowed to generate an encoded pointer to an RW global variable (e.g., 1432, 1434) to be delegated outside the domain (e.g., to one or more other software components running in the container). Thus, the pointers for that data can be converted to the heap pointer format. This may be performed automatically for RIP-relative accesses to RW global variables (e.g., 1432, 1434), and also performed when RIP-relative LEA (Load Effective Address) instructions are used to compute pointers that are then stored or passed to other software components. To generate pointers in the heap pointer format, the size metadata (e.g., 502) from the encoded version of the current instruction pointer is copied into the new pointer along with the computed address. Global data is not freed and reallocated, so the version metadata (if used) in the generated pointer is set to zero. All of the upper address bits (e.g., 1504) of the heap pointer encoding for all global variables in the module can be precomputed and simple concatenation can be used for generating pointers to particular global variables. The encryption of these variables may still be based upon the unique slot in the process containing the domain, but the pointer to the RW global data may contain a portion or none of the domain ID, depending on which domain ID bits fit in the pointer.

Some read-only global data 1436 can be shared across processes. However, that requires the data to be encrypted in a position-independent manner. To achieve position-independence, a different data encryption tweak is used instead of the standard, position-dependent heap encoding. One option is to consume a pointer bit or some range of power encodings to represent rodata pointers. Much rodata is likely only accessed directly using RIP-relative operands. Thus, alternatively, a memory access that uses RIP-relative operands can be used as an implicit indicator that the access may be to rodata. To encrypt the rodata variables in a position-independent manner, the data tweak used to encrypt/decrypt the rodata can be based on a cryptographic address (in a cryptographically encoded pointer) that includes a domain ID and has fixed and encrypted address bits (e.g., 1504 and 1506) zeroed out. Accordingly, the data encryption/decryption is bound only to (power) size metadata 1502, domain ID (e.g., metadata 1503), and mutable bits 1508.

To avoid program incompatibilities, the compiler can be extended to detect rodata variables that have their addresses computed, which indicates that those variables may be accessed through some non-RIP-relative pointers. The compiler can move those variables into the ordinary data section. Rodata variables that are accessed through non-RIP-relative pointers typically compose a small proportion of the variables For remaining rodata variables accessed only via RIP-relative direct accesses, techniques may be used to enable the processor to distinguish between those remaining rodata variables and RW global variables (e.g., 1432, 1434). The ability to distinguish between the remaining rodata variables and the RW global variables enables the use of the appropriate pointer encoding for the data encryption tweak. In one option, a prefix or some other indicator could be emitted by the compiler for that purpose. Another option could be to check page table permissions to determine whether the data is read-only. However, even RW data pages may sometimes be marked read-only (RO) to support copy-on-write (CoW). Page table entry (PTE) attributes could be extended to specify richer semantic information (e.g., "RO due to CoW" vs. "RO global data"). Alternatively, a Protection Key (PKEY) field could be repurposed to avoid consuming new bits. To avoid delaying the keystream generation until after the translation lookaside buffer (TLB) lookup completes, multiple potential keystreams could be generated in parallel and multiplexed following the TLB lookup. Another alternative may be to define a new instruction for accessing rodata.

FIGS. 16-19 illustrate one approach to mitigating one domain attempting to generate pointers to allow unauthorized access to global data in a different domain. Generally, the embodiment shown in FIGS. 16-19 can be used to limit the pointers that each domain can generate to stay within the current domain.

Figure 16:
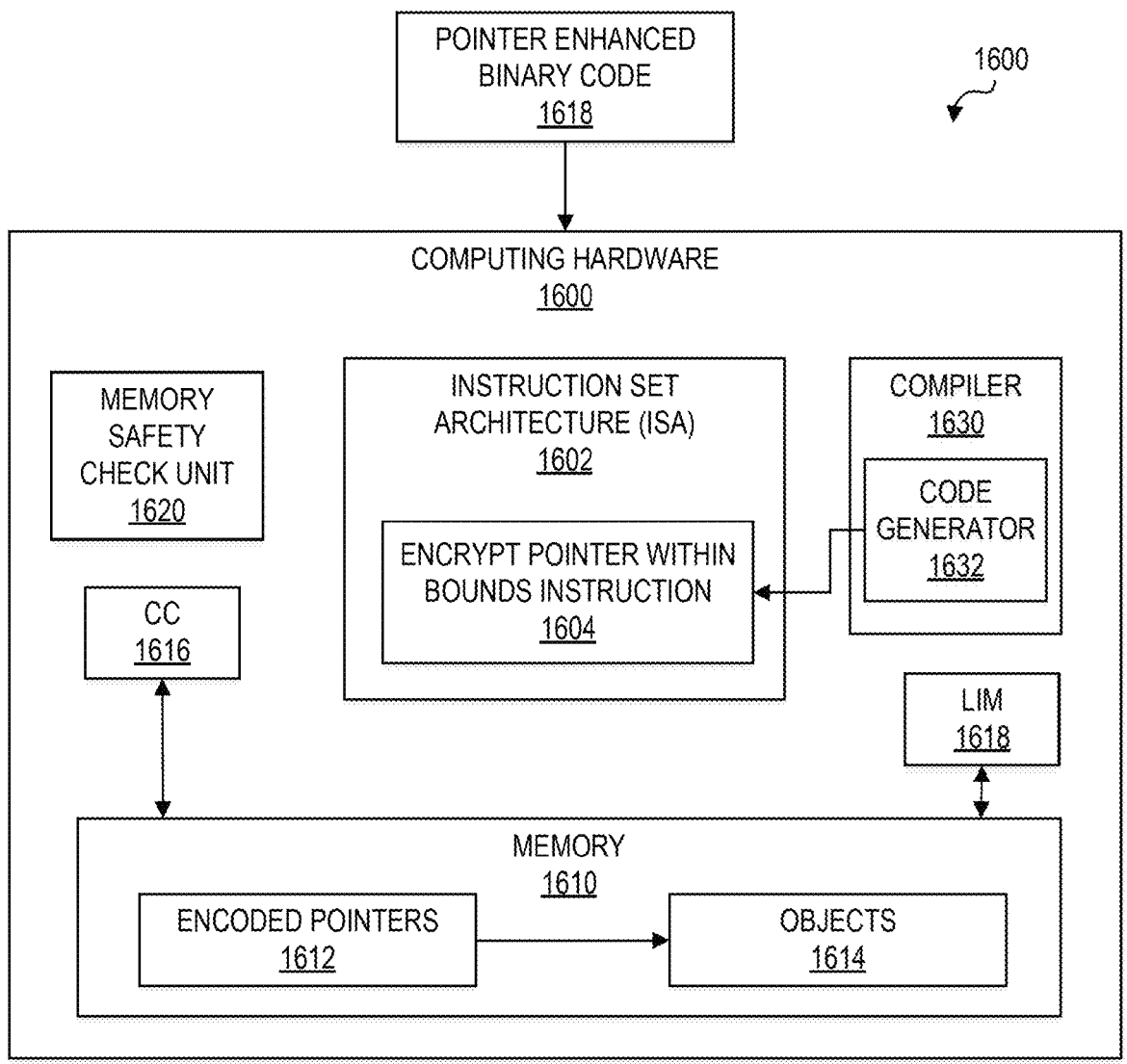
FIG. 16 is a block diagram illustrating example computing hardware according to at least one embodiment.

FIG. 16 illustrates example computing hardware 1600 according to one embodiment. Computing hardware 1600 may be implemented in one or more computing devices, such as computing device 100. The technologies described herein may be employed in any of a variety of electronic devices including integrated circuitry which is operable to perform cryptographic enforcement of domain isolation. In one implementation, computing hardware 1600 may be part of processor 102 of FIG. 1 and may include any or all of the hardware, firmware, and/or software as described with reference to FIG. 1 and as disclosed below.

Computing hardware 1600 may include an instruction set architecture (ISA) 1602. As extended herein, ISA 1602 includes encrypt pointer within bounds instruction 1604. A compiler 1630 generates the encrypt pointer within bounds instruction 1604 by code generator 1632 as needed. CC 1616 represents secure memory access logic 150 and/or CC hardware 830 as described herein. In one embodiment, memory safety check unit 1620 comprises circuitry to perform bounds checking of encoded pointers.

Memory 1610 includes a plurality of objects 1614 allocated as a result of executing pointer enhanced binary code 1618. Pointer enhanced binary code 1618 is code that includes memory allocation instructions that cause memory to be allocated for data objects and cause encoded pointers to be generated (e.g., address encoding logic 152 of FIG. 1) for the memory allocations. Objects 1614 are referenced by a plurality of encoded pointers 1612. Encoded pointers 1612 represent any of the encoded pointers for data previously described herein (e.g., 1510).

To be able to enforce bounds checking in computing hardware 1600, the design moves beyond representing a pointer as a reference into an undifferentiated, flat memory space. The architecture of computing hardware 1600 uniquely identifies each object as well as the object's current owner (e.g., domain ID), which is the sole variable through which the object can be referenced at that time in the program if the object is mutable. If the object is immutable, the object still has an owner, but one or more additional references may exist that can be used to read from the object.

Figure 17:
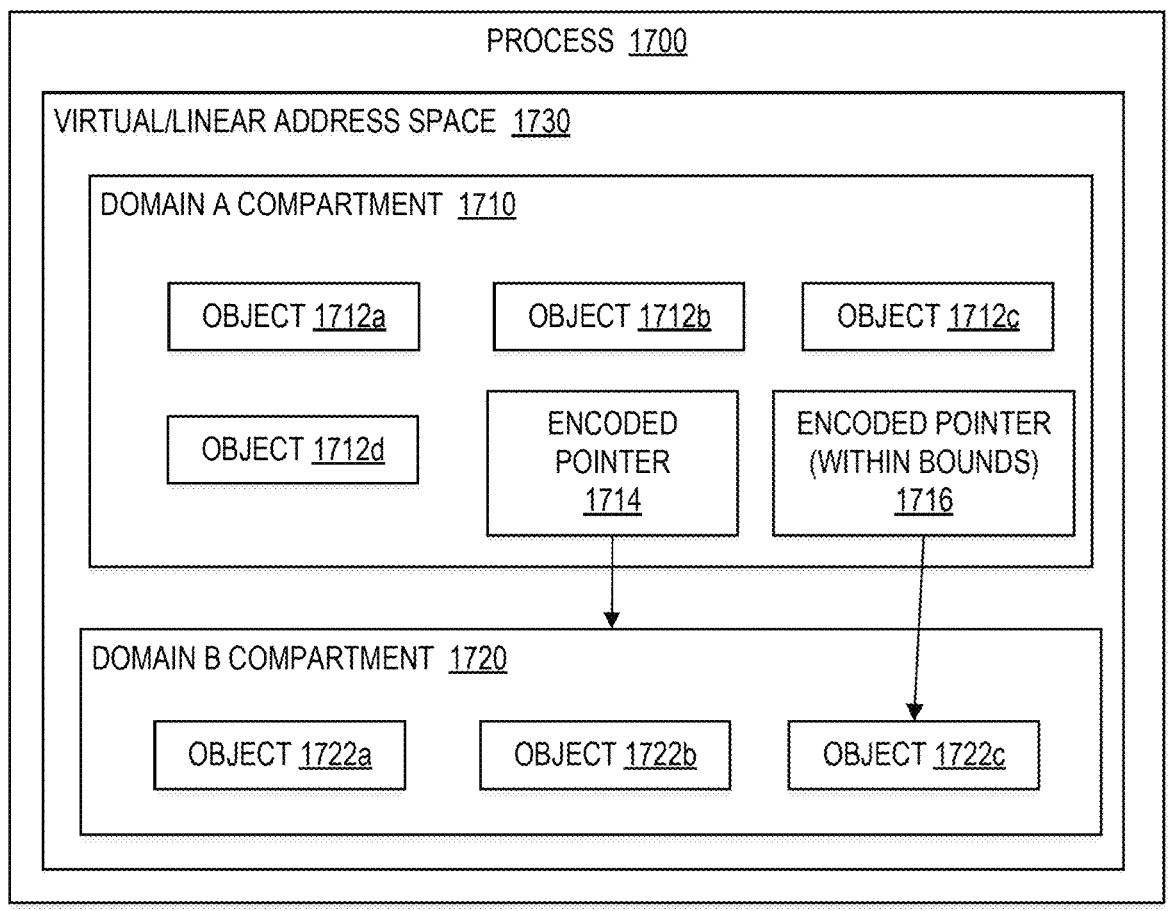
FIG. 17 is a block diagram illustrating an example of virtual/linear address space of a process with two domains and access to an object by a pointer according to at least one embodiment.

FIG. 17 illustrates an example of a process 1700 with a virtual/linear address space 1730 and two domain isolated compartments in the virtual/linear address space 1730. The domain isolated compartments are memory areas that include domain A compartment 1710 and domain B compartment 1720. FIG. 17 further illustrates access to an object by a pointer according to one implementation. Each of the domain isolated compartments belongs to a respective software component. The software component of a domain isolated compartment can generate encoded pointers to each of its own objects and not to any other compartment's objects. The purpose for generating these more specific encoded pointers rather than just relying on the encoded pointers for the overall compartment memory regions is two-fold. Each instruction within a domain isolated compartment should be restricted to only access the object that is supplied to the instruction as an operand. This is to enforce memory safety (e.g., addressing violations such as buffer overflows and use-after-free errors). Compartments need to be permitted to selectively share object references with other compartments while still preventing the receiving compartment from accessing other memory besides just those objects that the sending compartment authorizes it to access.

As shown in the example of FIG. 17, process 1700 of a program (such as application container 700 represented as pointer enhanced binary code 1618 after compilation) being executed by computing hardware 1600 includes two compartments. Domain A compartment 1710 includes a plurality of objects 1712a-1712d and domain B compartment 1720 includes a plurality of objects 1722a-1722c. In existing systems, an encoded pointer in domain A compartment 1710, such as encoded pointer 1714, has access to all objects 1722a-1722c in domain B compartment 1720. By executing the encrypt pointer within bounds instruction 1604, a generated encoded pointer within bounds 1716 has access restricted to only object 1722c, for example, in domain B compartment 1720 and cannot access the other objects 1722a-1722b in domain B compartment 1720.

The encrypt pointer within bounds instruction takes an encoded pointer as an input source operand and generates a narrowed and cryptographically encoded pointer for a specific object in a target compartment as an output destination operand. The cryptographically encoded pointer may then be used to access only that object within the target compartment, or the cryptographically encoded pointer may be shared across compartment boundaries to selectively grant inter-compartment access to the object.

Figure 18:
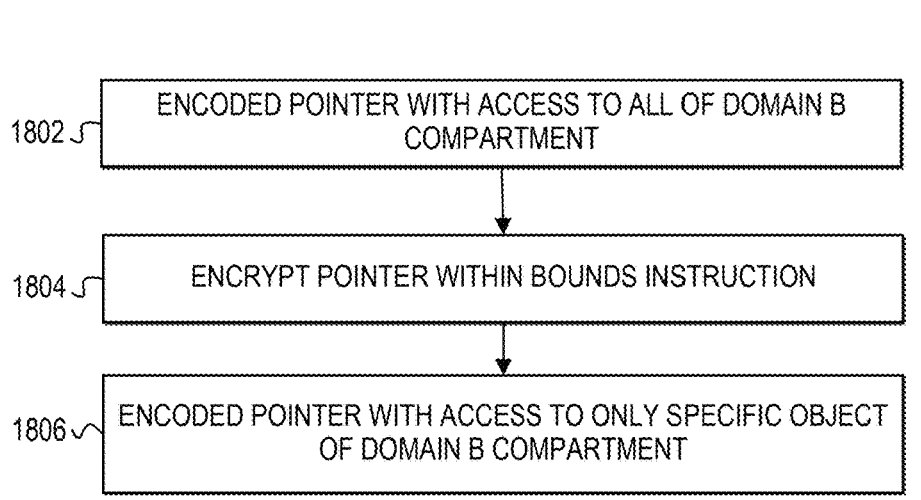
FIG. 18 is a flow diagram illustrating an effect of executing an encrypt pointer within bounds instruction according to at least one embodiment.

FIG. 18 is a flow diagram that illustrates an effect of executing an encrypt pointer within bounds instruction 1604 according to one implementation. At 1802, an encoded pointer with access to all of domain B compartment 1720 is generated. At 1804, the encoded pointer is input to encrypt pointer within bounds instruction 1604. Once executed, at 1806, the instruction generates a cryptographically encoded pointer with access to only the specific object (e.g., object 1722c) of domain B compartment 1720.

A variety of input and/or output pointer formats may be used as previously described herein. Examples of such formats include, but are not necessarily limited to, pointer 1510 described with reference to FIG. 15 and the various pointer formats for different types of data. In another example, larger pointers (e.g., 128-bit pointer, 256-bit pointer, etc.) may include fine-grained lower and upper bounds encoded in the pointer. The encoded bounds may be used as the input source operand and the encrypt pointer within bounds instruction 1604 checks that the desired object bounds are entirely contained by the bounds in the input pointer or generates an exception otherwise. For pointers that encode power of two size metadata (e.g., 1510), the encrypt pointer within bounds instruction 1604 checks that the desired object bounds are entirely contained within the power-of-two slot denoted by the input pointer.

In another implementation, an implicit operand may be used to supply bounds to check the encoded pointer generation request rather than an explicitly specified input operand. For example, an implicit input operand may specify the byte-granular pointers, power of two bounds, or other granularity of bounds for the current compartment in specialized registers. Similarly, an extension as described in the RISC-V J extension specification (available from github-.com) may also include an implicit input operand with a power-of-two bounds.

The encrypt pointer within bounds instruction 1604 checks that the specified object bounds are entirely contained within the bounds denoted by any of these implicit sources. In other implementations, there may be multiple variants of the encrypt pointer within bounds instruction that can be used within the same program depending on whether implicit or explicit input pointers are needed for a particular instance of the encrypt pointer within bounds instruction.

In various implementations, the output pointer may be encrypted in a format as previously described herein, such as encoded pointer 1510 of FIG. 15, and any of the alternative formats described with reference to different types of data (e.g., .rodata, .data, .bss, heap). In another implementation, a pair of 64-bit registers may specify the encrypted bounds. In other implementations, any other suitable encrypted pointer format may be used.

In one implementation, the encrypt pointer within bounds instruction 1604 may be defined as: EncryptPtrWithinBounds enc_cap:r64, obj_base:r64, obj_sz:r64, [src_cap:r64/r128]

Execution of this instruction by computing hardware 1600 (e.g., a processor or processing core) checks that the object bounds requested using the object base address (obj_base) and object size (ob_sz) operands are entirely contained within the bounds of the implicit or explicit source pointer (src_ptr), which may be combined with the object base address operand in certain embodiments. If not, an exception is generated. If so, an encrypted pointer is generated in the destination operand (encrypted capability (enc_ptr)) with the requested object bounds.

Figure 19:
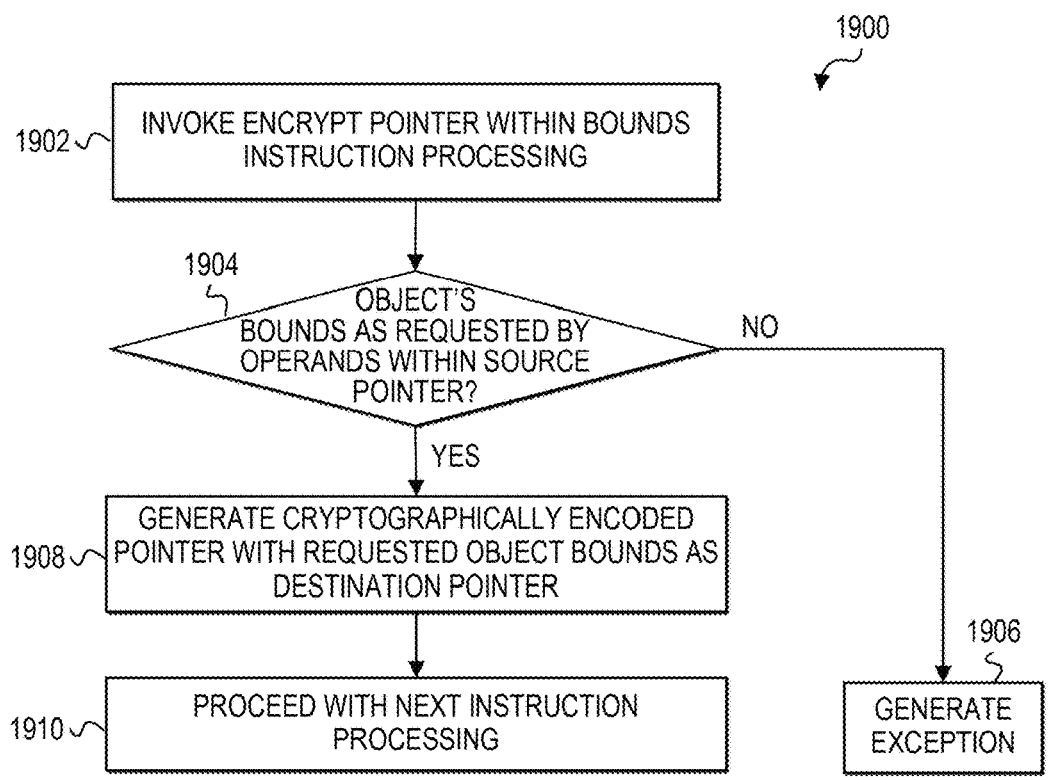
FIG. 19 is a flow diagram of encrypt pointer within bounds instruction processing according to at least one embodiment.

FIG. 19 is a flow diagram of encrypt pointer within bounds instruction processing 1900 according to one implementation. At block 1902, when a current instruction to be executed by computing hardware 1600 is an encrypt pointer within bounds instruction 1604, encrypt pointer within bounds instruction processing is invoked at 1902. At 1904, if the object's bounds as requested by the input operands for the object base address (obj_base) and object size (obj_sz) are not entirely contained within the bounds of the implicit or explicit source pointer (src_ptr), then an exception is generated at 1906. If the object's bounds are within the bounds of the implicit or explicit source capability, then at 1908, computing hardware 1600 generates an cryptographically encoded pointer with the requested object bounds in the destination operand (enc_ptr). Computing hardware 1600 proceeds with processing of a next instruction at 1910.

Other encrypted security contexts may be inserted into the generated pointer after being checked against non-cryptographic metadata in an input pointer or other input security metadata. For example, the input may specify one or more allowable tag(s) or version value(s), permission bits, a domain identifier (ID), privilege level, identifier for code authorized to access the data such as a hash value, key, KeyID, tweak value or initial value (IV)/counter value used by the processor circuitry to encrypt/decrypt data (and/or other metadata) within the respective memory allocation.

Detailed below are descriptions of example computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 20:
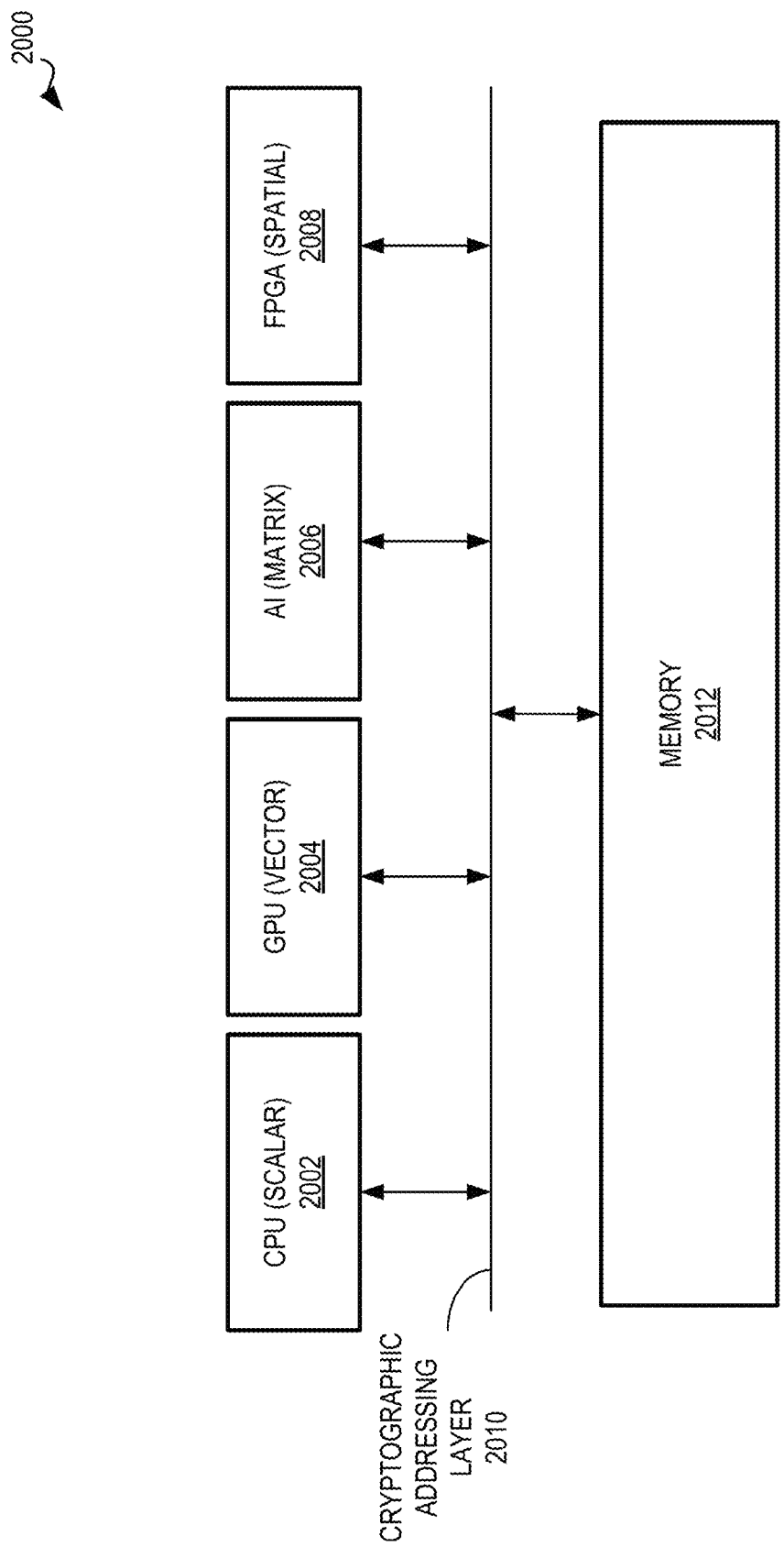
FIG. 20 is a block diagram illustrating an example cryptographic computing environment according to an embodiment.

FIG. 20 is a block diagram illustrating an example cryptographic computing environment 2000 according to at least one embodiment. In the example shown, a cryptographic addressing layer 2010 extends across the example compute vectors central processing unit (CPU) 2002, graphical processing unit (GPU) 2004, artificial intelligence (AI) 2006, and field programmable gate array (FPGA) 2008. For example, the CPU 2002 and GPU 2004 may share the same virtual address translation for data stored in memory 2012, and the cryptographic addresses may build on this shared virtual memory. They may share the same process key for a given execution flow, and compute the same tweaks to decrypt the cryptographically encoded addresses and decrypt the data referenced by such encoded addresses, following the same cryptographic algorithms.

Combined, the capabilities described herein may enable cryptographic computing. Memory 2012 may be encrypted at every level of the memory hierarchy, from the first level of cache through last level of cache and into the system memory. Binding the cryptographic address encoding to the data encryption may allow extremely fine-grain object boundaries and access control, enabling fine grain secure containers down to even individual functions and their objects for function-as-a-service. Cryptographically encoding return addresses on a call stack (depending on their location) may also enable control flow integrity without the need for shadow stack metadata. Thus, any of data access control policy and control flow can be performed cryptographically, simply dependent on cryptographic addressing and the respective cryptographic data bindings. Generally, suitable computer architectures for embodiments disclosed herein can include, but are not limited to, configurations illustrated in FIGS. 14-17.

Figure 21:
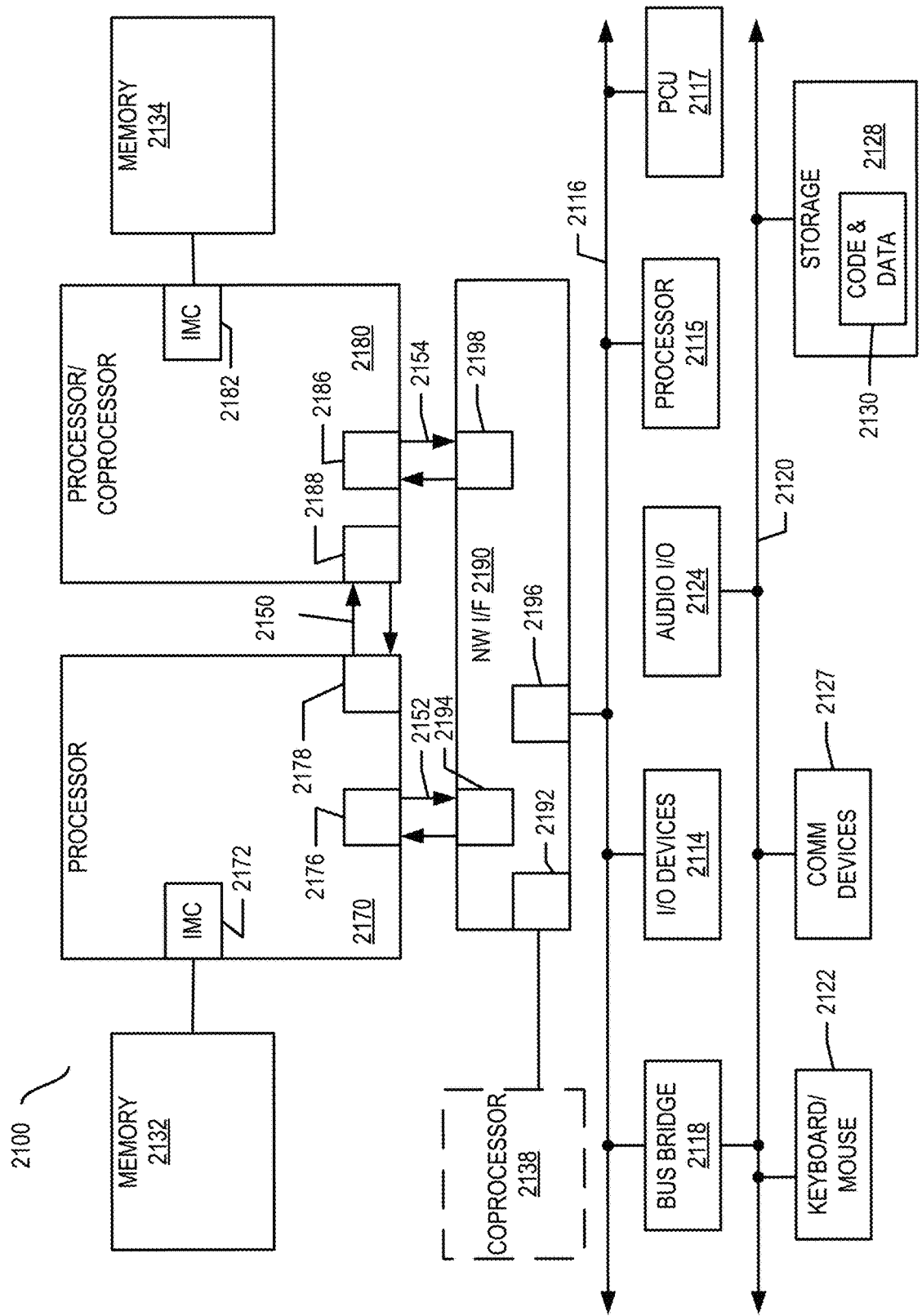
FIG. 21 illustrates an example computing system.

FIG. 21 illustrates an example computing system. Multiprocessor system 2100 is an interfaced system and includes a plurality of processors or cores including a first processor 2170 and a second processor 2180 coupled via an interface 2150 such as a point-to-point (P-P) interconnect, a fabric, and/or bus. In some examples, the first processor 2170 and the second processor 2180 are homogeneous. In some examples, first processor 2170 and the second processor 2180 are heterogenous. Though the example system 2100 is shown to have two processors, the system may have three or more processors, or may be a single processor system. In some examples, the computing system is a system on a chip (SoC).

Processors 2170 and 2180 are shown including integrated memory controller (IMC) circuitry 2172 and 2182, respectively. Processor 2170 also includes interface circuits 2176 and 2178; similarly, second processor 2180 includes interface circuits 2186 and 2188. Processors 2170, 2180 may exchange information via the interface 2150 using interface circuits 2178, 2188. IMCs 2172 and 2182 couple the processors 2170, 2180 to respective memories, namely a memory 2132 and a memory 2134, which may be portions of main memory locally attached to the respective processors.

Processors 2170, 2180 may each exchange information with a network interface (NW I/F) 2190 via individual interfaces 2152, 2154 using interface circuits 2176, 2194, 2186, 2198. The network interface 2190 (e.g., one or more of an interconnect, bus, and/or fabric, and in some examples is a chipset) may optionally exchange information with a coprocessor 2138 via an interface circuit 2192. In some examples, the coprocessor 2138 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 2170, 2180 or outside of both processors, yet connected with the processors via an interface such as P-P interconnect, such that either or both processors' local cache information may be stored in the shared cache if a processor is placed into a low power mode.

Network interface 2190 may be coupled to a first interface 2116 via interface circuit 2196. In some examples, first interface 2116 may be an interface such as a Peripheral Component Interconnect (PCI) interconnect, a PCI Express interconnect or another I/O interconnect. In some examples, first interface 2116 is coupled to a power control unit (PCU) 2117, which may include circuitry, software, and/or firmware to perform power management operations with regard to the processors 2170, 2180 and/or co-processor 2138. PCU 2117 provides control information to a voltage regulator (not shown) to cause the voltage regulator to generate the appropriate regulated voltage. PCU 2117 also provides control information to control the operating voltage generated. In various examples, PCU 2117 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 2117 is illustrated as being present as logic separate from the processor 2170 and/or processor 2180. In other cases, PCU 2117 may execute on a given one or more of cores (not shown) of processor 2170 or 2180. In some cases, PCU 2117 may be implemented as a microcontroller (dedicated or general-purpose) or other control logic configured to execute its own dedicated power management code, sometimes referred to as P-code. In yet other examples, power management operations to be performed by PCU 2117 may be implemented externally to a processor, such as by way of a separate power management integrated circuit (PMIC) or another component external to the processor. In yet other examples, power management operations to be performed by PCU 2117 may be implemented within BIOS or other system software.

Various I/O devices 2114 may be coupled to first interface 2116, along with a bus bridge 2118 which couples first interface 2116 to a second interface 2120. In some examples, one or more additional processor(s) 2115, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interface 2116. In some examples, second interface 2120 may be a low pin count (LPC) interface. Various devices may be coupled to second interface 2120 including, for example, a keyboard and/or mouse 2122, communication devices 2127 and storage circuitry 2128. Storage circuitry 2128 may be one or more non-transitory machine-readable storage media as described below, such as a disk drive or other mass storage device which may include instructions/code and data 2130 and may implement the storage 1 ISAB03 in some examples. Further, an audio I/O 2124 may be coupled to second interface 2120. Note that other architectures than the point-to-point architecture described above are possible. For example, instead of the point-to-point architecture, a system such as multiprocessor system 2100 may implement a multi-drop interface or other such architecture.

Exemplary Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may be included on the same die as the described CPU (sometimes referred to as the application core(s) or application processor(s)), the above described coprocessor, and additional functionality. Example core architectures are described next, followed by descriptions of example processors and computer architectures.

Figure 22:
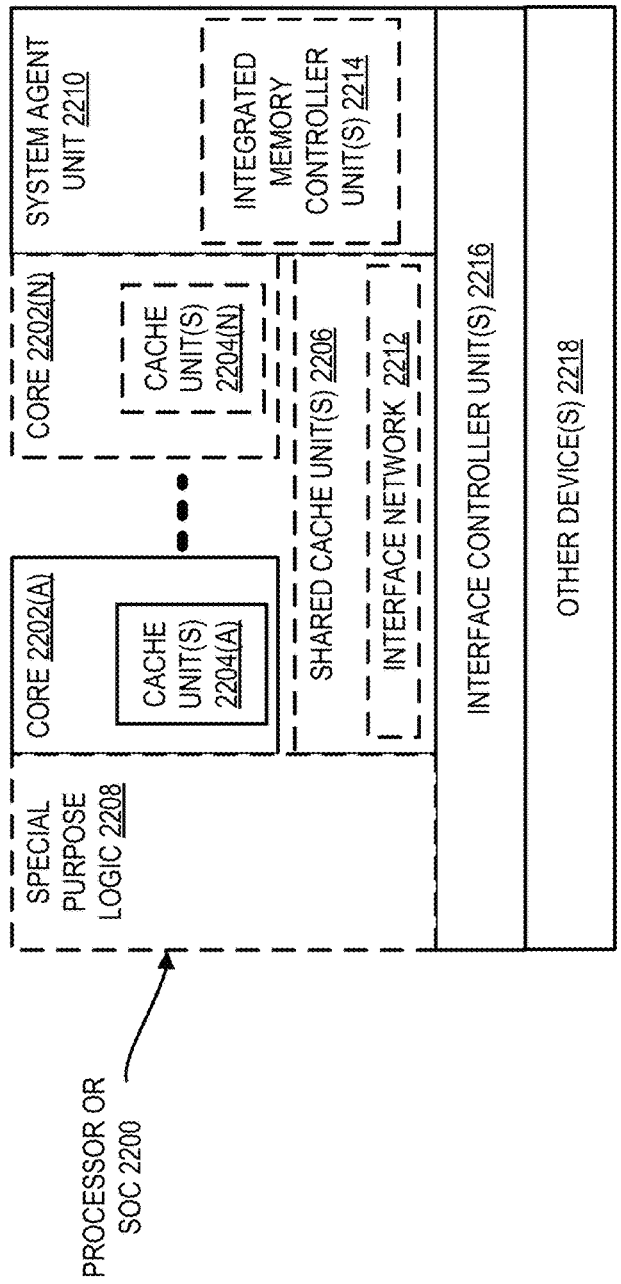
FIG. 22 illustrates a block diagram of an example processor and/or System on a Chip (SoC) that may have one or more cores and an integrated memory controller.

FIG. 22 illustrates a block diagram of an example processor and/or SoC 2200 that may have one or more cores and an integrated memory controller. The solid lined boxes illustrate a processor 2200 with a single core 2202(A), system agent unit circuitry 2210, and a set of one or more interface controller unit(s) circuitry 2216, while the optional addition of the dashed lined boxes illustrates an alternative processor 2200 with multiple cores 2202(A)-(N), a set of one or more integrated memory controller unit(s) circuitry 2214 in the system agent unit circuitry 2210, and special purpose logic 2208, as well as a set of one or more interface controller units circuitry 2216. Note that the processor 2200 may be one of the processors 2170 or 2180, or co-processor 2138 or 2115 of FIG. 21.

Thus, different implementations of the processor 2200 may include: 1) a CPU with the special purpose logic 2208 being integrated graphics and/or scientific (throughput) logic (which may include one or more cores, not shown), and the cores 2202(A)-(N) being one or more general purpose cores (e.g., general purpose in-order cores, general purpose out-of-order cores, or a combination of the two); 2) a coprocessor with the cores 2202(A)-(N) being a large number of special purpose cores intended primarily for graphics and/or scientific (throughput); and 3) a coprocessor with the cores 2202(A)-(N) being a large number of general purpose in-order cores. Thus, the processor 2200 may be a general-purpose processor, coprocessor or special-purpose processor, such as, for example, a network or communication processor, compression engine, graphics processor, GPGPU (general purpose graphics processing unit), a high throughput many integrated core (MIC) coprocessor (including 30 or more cores), embedded processor, or the like. The processor may be implemented on one or more chips. The processor 2200 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 2204(A)-(N) within the cores 2202(A)-(N), a set of one or more shared cache unit(s) circuitry 2206, and external memory (not shown) coupled to the set of integrated memory controller unit(s) circuitry 2214. The set of one or more shared cache unit(s) circuitry 2206 may include one or more mid-level caches, such as level 2 (L2), level 3 (L3), level 4 (L4), or other levels of cache, such as a last level cache (LLC), and/or combinations thereof. While in some examples interface network circuitry 2212 (e.g., a ring interconnect) interfaces the special purpose logic 2208 (e.g., integrated graphics logic), the set of shared cache unit(s) circuitry 2206, and the system agent unit circuitry 2210, alternative examples use any number of well-known techniques for interfacing such units. In some examples, coherency is maintained between one or more of the shared cache unit(s) circuitry 2206 and cores 2202(A)-(N). In some examples, interface controller units circuitry 2216 couple the cores 2202 to one or more other devices 2218 such as one or more I/O devices, storage, one or more communication devices (e.g., wireless networking, wired networking, etc.), etc.

In some examples, one or more of the cores 2202(A)-(N) are capable of multi-threading. The system agent unit circuitry 2210 includes those components coordinating and operating cores 2202(A)-(N). The system agent unit circuitry 2210 may include, for example, power control unit (PCU) circuitry and/or display unit circuitry (not shown). The PCU may be or may include logic and components needed for regulating the power state of the cores 2202(A)-(N) and/or the special purpose logic 2208 (e.g., integrated graphics logic). The display unit circuitry is for driving one or more externally connected displays.

The cores 2202(A)-(N) may be homogenous in terms of instruction set architecture (ISA). Alternatively, the cores 2202(A)-(N) may be heterogeneous in terms of ISA; that is, a subset of the cores 2202(A)-(N) may be capable of executing an ISA, while other cores may be capable of executing only a subset of that ISA or another ISA.

Exemplary Core Architectures—In-order and out-of-order core block diagram.

Figure 23A:
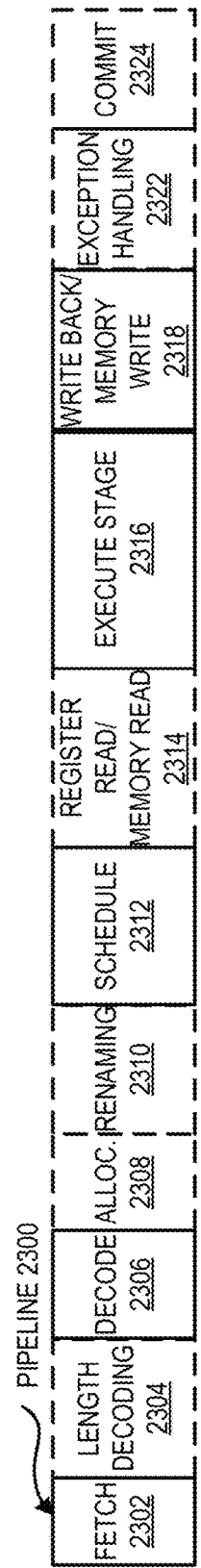
FIG. 23A is a block diagram illustrating both an example in-order pipeline and an example register renaming, out-of-order issue/execution pipeline according to examples.
Figure 23B:
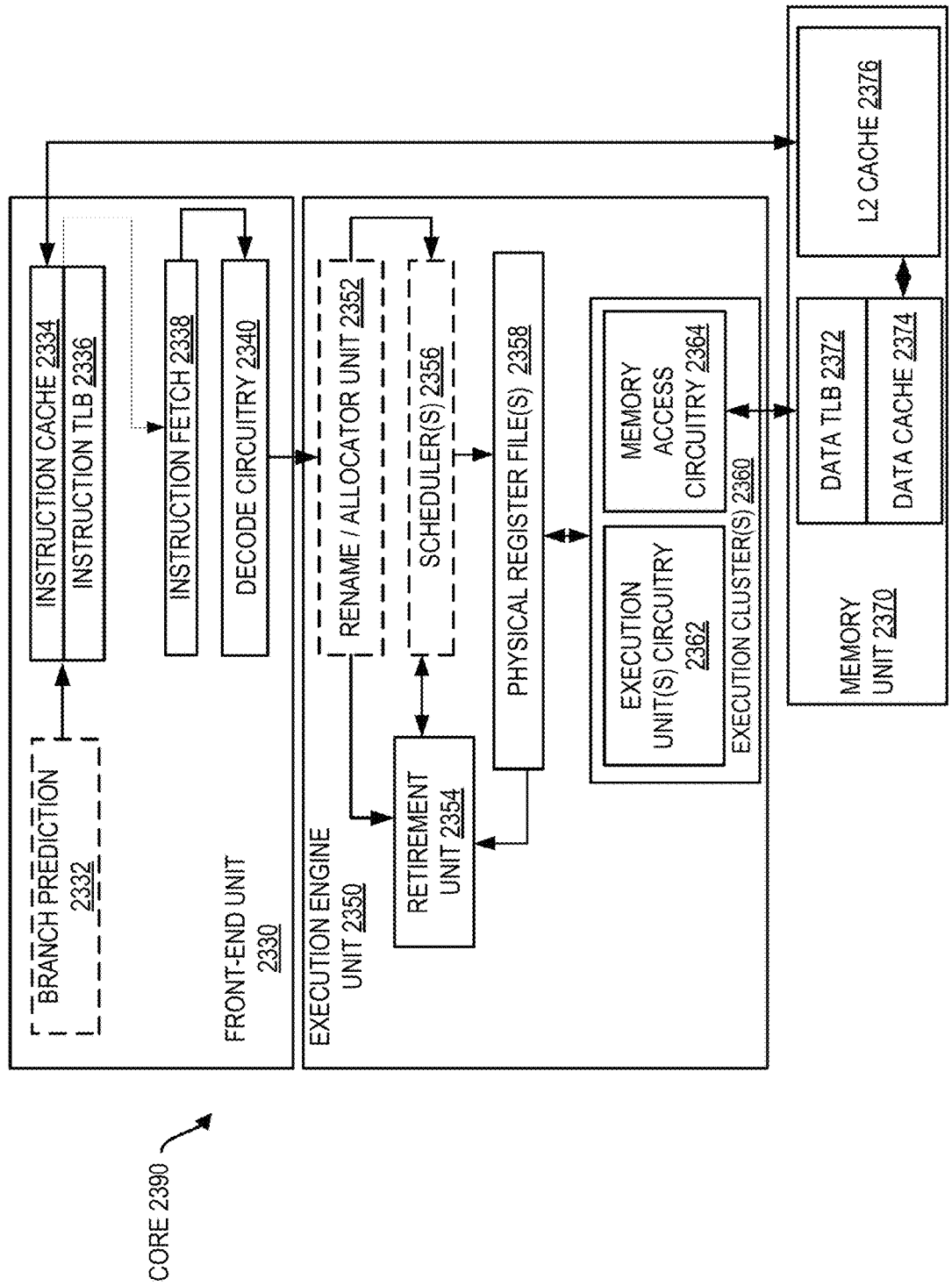
FIG. 23B is a block diagram illustrating both an example in-order architecture core and an example register renaming, out-of-order issue/execution architecture core to be included in a processor according to examples.

FIG. 23(A) is a block diagram illustrating both an example in-order pipeline and an example register renaming, out-of-order issue/execution pipeline according to examples. FIG. 23(B) is a block diagram illustrating both an example in-order architecture core and an example register renaming, out-of-order issue/execution architecture core to be included in a processor according to examples. The solid lined boxes in FIGS. 23(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 23(A), a processor pipeline 2300 includes a fetch stage 2302, an optional length decoding stage 2304, a decode stage 2306, an optional allocation (Alloc) stage 2308, an optional renaming stage 2310, a schedule (also known as a dispatch or issue) stage 2312, an optional register read/memory read stage 2314, an execute stage 2316, a write back/memory write stage 2318, an optional exception handling stage 2322, and an optional commit stage 2324. One or more operations can be performed in each of these processor pipeline stages. For example, during the fetch stage 2302, one or more instructions are fetched from instruction memory, and during the decode stage 2306, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 2306 and the register read/memory read stage 2314 may be combined into one pipeline stage. In one example, during the execute stage 2316, the decoded instructions may be executed, LSU address/data pipelining to an Advanced Microcontroller Bus (AMB) interface may be performed, multiply and add operations may be performed, arithmetic operations with branch results may be performed, etc.

By way of example, the example register renaming, out-of-order issue/execution architecture core of FIG. 23(B) may implement the pipeline 2300 as follows: 1) the instruction fetch circuitry 2338 performs the fetch and length decoding stages 2302 and 2304; 2) the decode circuitry 2340 performs the decode stage 2306; 3) the rename/allocator unit circuitry 2352 performs the allocation stage 2308 and renaming stage 2310; 4) the scheduler(s) circuitry 2356 performs the schedule stage 2312; 5) the physical register file(s) circuitry 2358 and the memory unit circuitry 2370 perform the register read/memory read stage 2314; the execution cluster(s) 2360 perform the execute stage 2316; 6) the memory unit circuitry 2370 and the physical register file(s) circuitry 2358 perform the write back/memory write stage 2318; 7) various circuitry may be involved in the exception handling stage 2322; and 8) the retirement unit circuitry 2354 and the physical register file(s) circuitry 2358 perform the commit stage 2324.

FIG. 23(B) shows a processor core 2390 including front-end unit circuitry 2330 coupled to execution engine unit circuitry 2350, and both are coupled to memory unit circuitry 2370. The core 2390 may be a reduced instruction set architecture computing (RISC) core, a complex instruction set architecture computing (CISC) core, a very long instruction word (VLIW) core, or a hybrid or alternative core type. As yet another option, the core 2390 may be a special-purpose core, such as, for example, a network or communication core, compression engine, coprocessor core, general purpose computing graphics processing unit (GPGPU) core, graphics core, or the like.

The front-end unit circuitry 2330 may include branch prediction circuitry 2332 coupled to instruction cache circuitry 2334, which is coupled to an instruction translation lookaside buffer (TLB) 2336, which is coupled to instruction fetch circuitry 2338, which is coupled to decode circuitry 2340. In one example, the instruction cache circuitry 2334 is included in the memory unit circuitry 2370 rather than the front-end circuitry 2330. The decode circuitry 2340 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 2340 may further include address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 2340 may be implemented using various different mechanisms. Examples of suitable mechanisms include, but are not limited to, look-up tables, hardware implementations, programmable logic arrays (PLAs), microcode read only memories (ROMs), etc. In one example, the core 2390 includes a microcode ROM (not shown) or other medium that stores microcode for certain macroinstructions (e.g., in decode circuitry 2340 or otherwise within the front-end circuitry 2330). In one example, the decode circuitry 2340 includes a micro-operation (micro-op) or operation cache (not shown) to hold/cache decoded operations, micro-tags, or micro-operations generated during the decode or other stages of the processor pipeline 2300. The decode circuitry 2340 may be coupled to rename/allocator unit circuitry 2352 in the execution engine circuitry 2350.

The execution engine circuitry 2350 includes the rename/allocator unit circuitry 2352 coupled to retirement unit circuitry 2354 and a set of one or more scheduler(s) circuitry 2356. The scheduler(s) circuitry 2356 represents any number of different schedulers, including reservations stations, central instruction window, etc. In some examples, the scheduler(s) circuitry 2356 can include arithmetic logic unit (ALU) scheduler/scheduling circuitry, ALU queues, address generation unit (AGU) scheduler/scheduling circuitry, AGU queues, etc. The scheduler(s) circuitry 2356 is coupled to the physical register file(s) circuitry 2358. Each of the physical register file(s) circuitry 2358 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 2358 includes vector registers unit circuitry, writemask registers unit circuitry, and scalar register unit circuitry. These register units may provide architectural vector registers, vector mask registers, general-purpose registers, etc. The physical register file(s) circuitry 2358 is coupled to the retirement unit circuitry 2354 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 2354 and the physical register file(s) circuitry 2358 are coupled to the execution cluster(s) 2360. The execution cluster(s) 2360 includes a set of one or more execution unit(s) circuitry 2362 and a set of one or more memory access circuitry 2364. The execution unit(s) circuitry 2362 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 2356, physical register file(s) circuitry 2358, and execution cluster(s) 2360 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 2364). It should also be understood that where separate pipelines are used, one or more of these pipelines may be out-of-order issue/execution and the rest in-order.

In some examples, the execution engine unit circuitry 2350 may perform load store unit (LSU) address/data pipe-lining to an Advanced Microcontroller Bus (AMB) interface (not shown), and address phase and writeback, data phase load, store, and branches.

The set of memory access circuitry 2364 is coupled to the memory unit circuitry 2370, which includes data TLB circuitry 2372 coupled to data cache circuitry 2374 coupled to level 2 (L2) cache circuitry 2376. In one example, the memory access circuitry 2364 may include load unit cir-cuitry, store address unit circuitry, and store data unit cir-cuitry, each of which is coupled to the data TLB circuitry 2372 in the memory unit circuitry 2370. The instruction cache circuitry 2334 is further coupled to the level 2 (L2) cache circuitry 2376 in the memory unit circuitry 2370. In one example, the instruction cache 2334 and the data cache 2374 are combined into a single instruction and data cache (not shown) in L2 cache circuitry 2376, level 3 (L3) cache circuitry (not shown), and/or main memory. The L2 cache circuitry 2376 is coupled to one or more other levels of cache and eventually to a main memory.

The core 2390 may support one or more instructions sets (e.g., the x86 instruction set architecture (optionally with some extensions that have been added with newer versions); the MIPS instruction set architecture; the ARM instruction set architecture (optionally with optional additional exten-sions such as NEON)), including the instruction(s) described herein. In one example, the core 2390 includes logic to support a packed data instruction set architecture extension (e.g., AVX1, AVX2), thereby allowing the operations used by many multimedia applications to be performed using packed data.

Exemplary Execution Unit(s) Circuitry.

Figure 24:
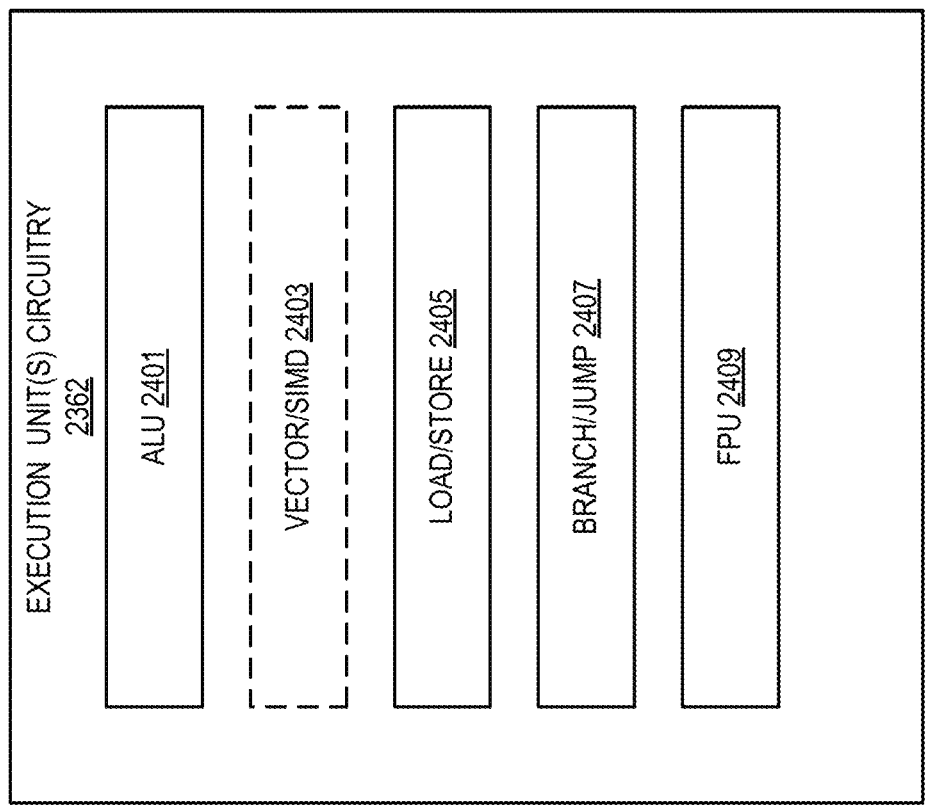
FIG. 24 illustrates examples of execution unit(s) circuitry.

FIG. 24 illustrates examples of execution unit(s) circuitry, such as execution unit(s) circuitry 2362 of FIG. 23(B). As illustrated, execution unit(s) circuitry 2362 may include one or more ALU circuits 2401, optional vector/single instruc-tion multiple data (SIMD) circuits 2403, load/store circuits 2405, branch/jump circuits 2407, and/or Floating-point unit (FPU) circuits 2409. ALU circuits 2401 perform integer arithmetic and/or Boolean operations. Vector/SIMD circuits 2403 perform vector/SIMD operations on packed data (such as SIMD/vector registers). Load/store circuits 2405 execute load and store instructions to load data from memory into registers or store from registers to memory. Load/store circuits 2405 may also generate addresses. Branch/jump circuits 2407 cause a branch or jump to a memory address depending on the instruction. FPU circuits 2409 perform floating-point arithmetic. The width of the execution unit(s) circuitry 2362 varies depending upon the example and can range from 16-bit to 1,024-bit, for example. In some examples, two or more smaller execution units are logically combined to form a larger execution unit (e.g., two 128-bit execution units are logically combined to Form a 256-Bit Execution Unit).

Emulation (including binary translation, code morphing, etc.).

In some cases, an instruction converter may be used to convert an instruction from a source instruction set archi-tecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combi-nation thereof. The instruction converter may be on proces-sor, off processor, or part on and part off processor.

Figure 25:
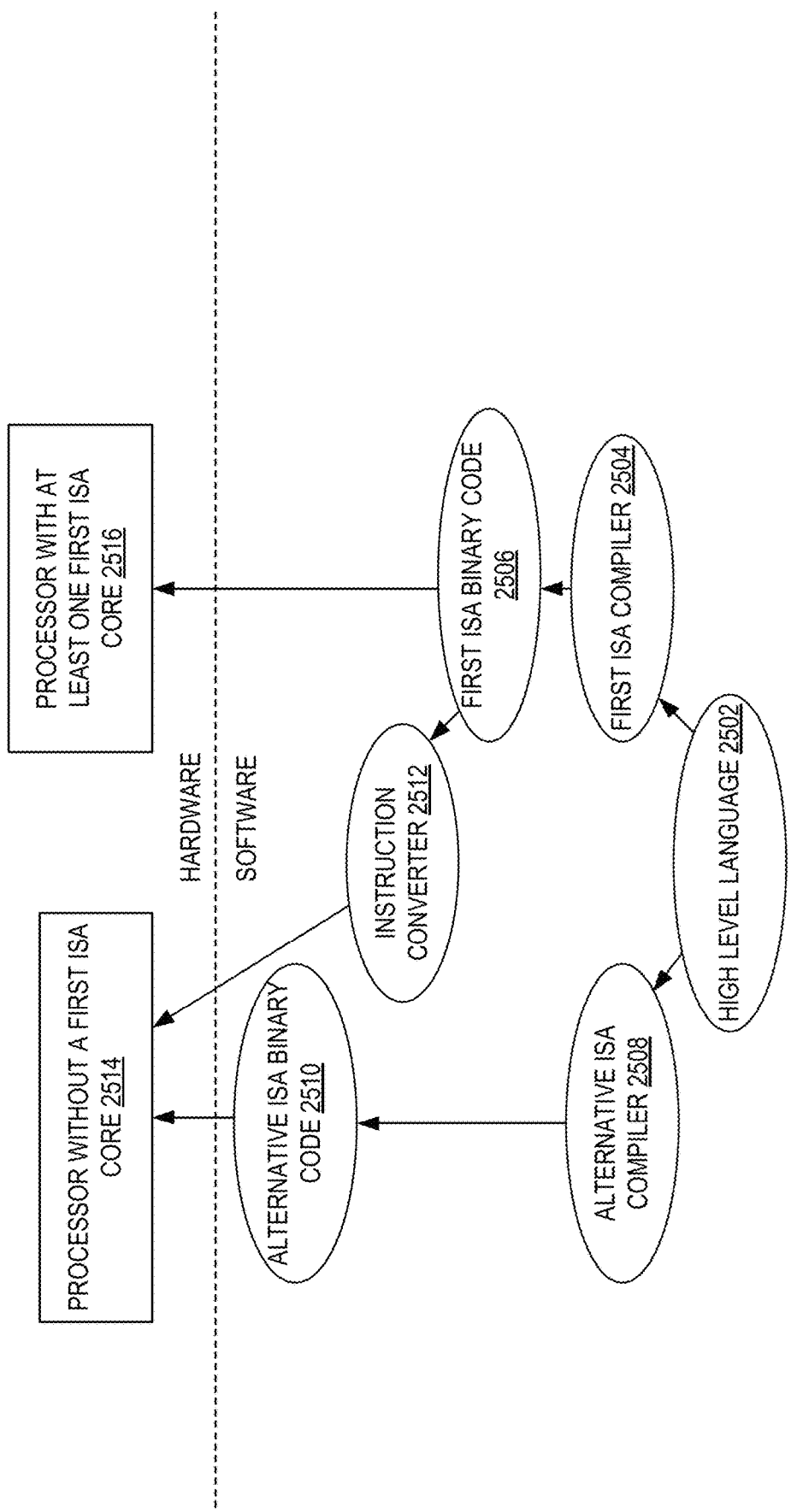
FIG. 25 is a block diagram illustrating the use of a software instruction converter to convert binary instructions in a source instruction set architecture to binary instructions in a target instruction set architecture according to examples.

FIG. 25 is a block diagram illustrating the use of a software instruction converter to convert binary instructions in a source ISA to binary instructions in a target ISA according to examples. In the illustrated example, the instruction converter is a software instruction converter, although alternatively the instruction converter may be implemented in software, firmware, hardware, or various combinations thereof. FIG. 25 shows a program in a high-level language 2502 may be compiled using a first ISA compiler 2504 to generate first ISA binary code 2506 that may be natively executed by a processor with at least one first ISA core 2516. The processor with at least one first ISA core 2516 represents any processor that can perform sub-stantially the same functions as an Intel® processor with at least one first ISA core by compatibly executing or other-wise processing (1) a substantial portion of the first ISA or (2) object code versions of applications or other software targeted to run on an Intel processor with at least one first ISA core, in order to achieve substantially the same result as a processor with at least one first ISA core. The first ISA compiler 2504 represents a compiler that is operable to generate first ISA binary code 2506 (e.g., object code) that can, with or without additional linkage processing, be executed on the processor with at least one first ISA core 2516. Similarly, FIG. 25 shows the program in the high-level language 2502 may be compiled using an alternative ISA compiler 2508 to generate alternative ISA binary code 2510 that may be natively executed by a processor without a first ISA core 2514. The instruction converter 2512 is used to convert the first ISA binary code 2506 into code that may be natively executed by the processor without a first ISA core 2514. This converted code is not necessarily to be the same as the alternative ISA binary code 2510; however, the converted code will accomplish the general operation and be made up of instructions from the alternative ISA. Thus, the instruction converter 2512 represents software, firmware, hardware, or a combination thereof that, through emulation, simulation or any other process, allows a processor or other electronic device that does not have a first ISA processor or core to execute the first ISA binary code 2506.

References to "one example," "an example," etc., indicate that the example described may include a particular feature, structure, or characteristic, but every example may not necessarily include the particular feature, structure, or char-acteristic. Moreover, such phrases are not necessarily refer-ring to the same example. Further, when a particular feature, structure, or characteristic is described in connection with an example, it is submitted that it is within the knowledge of one skilled in the art to affect such feature, structure, or characteristic in connection with other examples whether or not explicitly described.

With regard to this specification generally, unless expressly stated to the contrary, disjunctive language such as the phrase 'at least one of X, Y, or Z' and 'one or more of X, Y, or Z' is intended to be understood to mean either X, Y, or Z, or any combination thereof. For example, unless specifically noted otherwise, the phrases 'at least one of X, Y, and Z' and 'one or more of X, Y, and Z' are intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6)

at least one Y and at least one Z, but not X; or 7) at least one X, at least one Y, and at least one Z.

Additionally, unless expressly stated to the contrary, the terms 'first', 'second', 'third', etc., are intended to distinguish the particular items (e.g., element, condition, module, activity, operation, claim element, messages, protocols, interfaces, devices etc.) they modify, but are not intended to indicate any type of order, rank, importance, temporal sequence, or hierarchy. For example, 'first X' and 'second X' are intended to designate two separate X elements that are not necessarily limited by any order, rank, importance, temporal sequence, or hierarchy of the two elements, unless specifically stated to the contrary.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of "embodiment" and other exemplarily language does not necessarily refer to the same embodiment or the same example, but may refer to different and distinct embodiments, as well as potentially the same embodiment.

Embodiments of the mechanisms disclosed herein may be implemented in hardware, software, firmware, or a combination of such implementation approaches. Embodiments of this disclosure may be implemented, at least partially, as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products.

The architectures presented herein are provided by way of example only and are intended to be non-exclusive and non-limiting. Furthermore, the various parts disclosed are intended to be logical divisions only and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

It is also important to note that the operations in the preceding flowcharts and diagrams illustrating interactions, illustrate only some of the possible activities that may be executed by, or within, computing device 100 using the approaches disclosed herein for providing domain-based isolation using cryptographic computing. Some of these operations may be deleted or removed where appropriate, or these operations may be modified or changed considerably without departing from the scope of the present disclosure. In addition, the timing of these operations may be altered considerably. For example, the timing and/or sequence of certain operations may be changed relative to other operations to be performed before, after, or in parallel to the other operations, or based on any suitable combination thereof. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other Notes and Examples

The following examples pertain to embodiments in accordance with this specification. The system, apparatus, method, and machine readable storage medium embodiments can include one or a combination of the following examples.

The following examples pertain to embodiments in accordance with this specification. Example P1 provides a processor including an instruction pointer register to store a first encoded pointer to a first encrypted code block of a first software component in memory, and the first software component is to share a first address space of the memory with a plurality of software components. The processor further includes circuitry to decode the first encoded pointer to obtain a first linear address of the first encrypted code block, use the first linear address to access the first encrypted code block, and decrypt the first encrypted code block to generate a first decrypted code block using a first code key and a first code tweak derived at least in part from the first encoded pointer, the first code tweak including first metadata that uniquely identifies the first software component and first location information that represents a relative position of the first encrypted code block in the first address space.

Example P2 comprises the subject matter of Example P1, and the first code tweak further second metadata obtained from the first encoded pointer, and the second metadata is based on a byte size of a first memory slot to which a first memory allocation for the first software component is assigned.

Example P3 comprises the subject matter of Example P2, and the first size metadata represents a value of an exponent in a power of two number that corresponds to the byte size of the first memory slot.

Example P4 comprises the subject matter of any one of Examples P2-P3, and to decode the first encoded pointer is to include decrypting an encrypted portion of the first encoded pointer to generate a decrypted portion, and the decrypted portion to include the first metadata and a first portion of address bits of the first linear address.

Example P5 comprises the subject matter of Example P4, and the address tweak is to include the second metadata and a second portion of the address bits of the first linear address.

Example P6 comprises the subject matter of any one of Examples P4-P5, and the circuitry is further to execute one or more instructions of a linker-loader module to generate the first encoded pointer, including encoding the first linear address with the first metadata and the second metadata, and encrypting the first metadata and the first portion of the address bits of the first linear address using the address key and the address tweak.

Example P7 comprises the subject matter of any one of Examples P1-P6, and two or more software components of the plurality of software components are to execute as a plurality of threads, respectively, in a first process.

Example P8 comprises the subject matter of Example P7, and the plurality of software components includes at least one of a function of a functions-as-a-service (FaaS) platform, a microservice, and a browser component of a browser application.

Example P9 comprises the subject matter of any one of Examples P7-P8, and the circuitry is further to execute a first instruction of the first decrypted code block to transition from executing the first software component as a first thread in the first process to executing a second software component as a second thread in the first process.

Example P10 comprises the subject matter of Example P9, and to execute the first instruction in the first decrypted code block is to include storing in stack memory a return address pointer to a second instruction following the first instruction in the first encrypted code block of the first software component, and storing, in the instruction pointer register, a second encoded pointer to a second encrypted code block of the second software component.

Example P11 comprises the subject matter of Example P10, and the circuitry is to further decode the second encoded pointer to obtain a second linear address of the second encrypted code block, use the second linear address to access the second encrypted code block, and decrypt the second encrypted code block to generate a second decrypted code block using a second code tweak, the second code tweak to include third metadata that uniquely identifies the second software component and second location information that represents a second relative position of the second encrypted code block in the first address space.

Example P12 comprises the subject matter of any one of Examples P1-P11, and the first location information is a first offset of the first encrypted code block within a first memory slot to which a first memory allocation for the first software component is assigned.

Example P13 comprises the subject matter of Example P12, and the circuitry is further to obtain the first offset by calculating a difference between the first linear address and another linear address corresponding to a start of the first memory slot.

Example P14 comprises the subject matter of any one of Examples P1-P13, and the first software component is a shared library to be executed in a first process of a first container associated with the first address space of the memory and to be executed in a second process of a second container associated with a second address space of the memory.

Example P15 comprises the subject matter of Example P14, and further including a second instruction pointer register to store a third encoded pointer to the first encrypted code block of the first software component in the second address space of the memory, and the circuitry is further to decode the third encoded pointer to obtain a third linear address of the first encrypted code block, use the third linear address to access the first encrypted code block, and decrypt the first encrypted code block to generate the first decrypted code block using the first code key and a third code tweak derived at least in part from the third encoded pointer, the third code tweak including the first metadata that uniquely identifies the first software component and second location information that represents a second relative position of the first encrypted code block within the second address space, and the first location information is equivalent to the second location information.

Example S1 provides a system including memory for storing a plurality of domains and a processor coupled to the memory, and the processor includes an instruction pointer register to store a first encoded pointer to a first encrypted code block of a first domain in the memory, and the first domain is to share a first address space of the memory with the plurality of domains. The processor is to further include circuitry to decode the first encoded pointer to obtain a first linear address of the first encrypted code block, use the first linear address to access the first encrypted code block, and decrypt the first encrypted code block to generate a first decrypted code block using a first code key and a first code tweak derived at least in part from the first encoded pointer, the first code tweak including first domain metadata that uniquely identifies the first domain and first location information that represents a relative position of the first encrypted code block in the first address space.

Example S2 comprises the subject matter of Example S1, and the first code tweak further includes first size metadata obtained from the first encoded pointer, and the first size metadata is based on a byte size of a first memory slot to which a first memory allocation for the first domain is assigned.

Example S3 comprises the subject matter of Example S2, and the first size metadata represents a value of an exponent in a power of two number that corresponds to the byte size of the first memory slot.

Example S4 comprises the subject matter of any one of Examples S2-S3, and to decode the first encoded pointer is to include decrypting an encrypted portion of the first encoded pointer based on an address key and an address tweak to generate a decrypted portion, the decrypted portion to include the first domain metadata and a first portion of address bits of the first linear address.

Example S5 comprises the subject matter of Example S4, and the address tweak is to include the first size metadata and a second portion of the address bits of the first linear address.

Example S6 comprises the subject matter of any one of Examples S4-S5, and the circuitry is further to execute a linker-loader module to generate the first encoded pointer, including encoding the first linear address with the first domain metadata and the first size metadata, and encrypting the first domain metadata and the first portion of the address bits of the first linear address using the address key and the address tweak.

Example S7 comprises the subject matter of any one of Examples S1-S6, and two or more domains of the plurality of domains are to execute as a plurality of threads, respectively, in a first process.

Example S8 comprises the subject matter of Example S7, and the plurality of domains includes at least one of a function of a functions-as-a-service (FaaS) platform, a microservice, and a browser component of a browser application.

Example S9 comprises the subject matter of any one of Examples S7-S8, and the circuitry is further to execute a first instruction of the first decrypted code block to transition from executing the first domain as a first thread in the first process to executing a second domain as a second thread in the first process.

Example S10 comprises the subject matter of Example S9, and to execute the first instruction in the first decrypted code block is to include storing in stack memory a return address pointer to a second instruction following the first instruction in the first encrypted code block of the first domain, and storing, in the instruction pointer register, a second encoded pointer to a second encrypted code block of the second domain.

Example S11 comprises the subject matter of Example S10, and the circuitry is to further decode the second encoded pointer to obtain a second linear address of the second encrypted code block, use the second linear address to access the second encrypted code block, and decrypt the second encrypted code block to generate a second decrypted code block using a second code tweak, the second code tweak to include second domain metadata that uniquely identifies the second domain and second location information that represents a second relative position of the second encrypted code block in the first address space.

Example S12 comprises the subject matter of any one of Examples S1-S11, and the first location information is a first offset of the first encrypted code block within a first memory slot to which a first memory allocation for the first domain is assigned.

Example S13 comprises the subject matter of Example S12, and obtain the first offset by calculating a difference between the first linear address and another linear address corresponding to a start of the first memory slot.

Example S14 comprises the subject matter of any one of Examples S1-S13, and the first domain is a shared library to be executed in a first process of a first container associated with the first address space of the memory and to be executed in a second process of a second container associated with a second address space of the memory.

Example S15 comprises the subject matter of Example S14, and further includes a second instruction pointer register to store a third encoded pointer to the first encrypted code block of the first domain in the second address space of the memory, and the circuitry is further to decode the third encoded pointer to obtain a third linear address of the first encrypted code block, use the third linear address to access the first encrypted code block, and decrypt the first encrypted code block to generate the first decrypted code block using the first code key and a third code tweak derived at least in part from the third encoded pointer, the third code tweak including the first domain metadata that uniquely identifies the first domain and second location information that represents a second relative position of the first encrypted code block within a second memory slot in the second address space, and the first location information is equivalent to the second location information.

The following examples pertain to embodiments in accordance with this specification. Example M1 provides a method including decoding a first encoded pointer stored in an instruction pointer register of a processor to obtain a first linear address of a first encrypted code block of a first software component in memory, and the first software component shares a first linear address space of the memory with a plurality of software components, using the first linear address to access the first encrypted code block, determining a first offset of the first encrypted code block within a first memory slot of the first linear address space, and decrypting the first encrypted code block to generate a first decrypted code block using a first code key and a first code tweak that includes the first offset and first metadata that uniquely identifies the first software component.

Example M2 comprises the subject matter of Example M1, and the first code tweak further includes first size metadata obtained from the first encoded pointer, and the first size metadata is based on a byte size of the first memory slot.

Example M3 comprises the subject matter of Example M2, and the first size metadata represents a value of an exponent in a power of two number that corresponds to the byte size of the first memory slot.

Example M4 comprises the subject matter of any one of Examples M2-M3, and the decoding the first encoded pointer further includes decrypting an encrypted portion of the first encoded pointer based on an address key and an address tweak to generate a decrypted portion, the decrypted portion including the first metadata and upper address bits of the first linear address.

Example M5 comprises the subject matter of Example M4, and the address tweak includes the first size metadata and lower address bits of the first linear address.

Example M6 comprises the subject matter of any one of Examples M4-M5, and further comprising executing a linker-loader module, the executing including generating the first encoded pointer. The generating includes obtaining the first metadata, encoding the first linear address with the first metadata and the first size metadata, and encrypting the first metadata and the upper address bits of the first linear address using the address key and the address tweak.

Example M7 comprises the subject matter of any one of Examples M1-M6, and the software components of the plurality of software components execute as a plurality of threads, respectively, in a first process.

Example M8 comprises the subject matter of Example M7, and the plurality of domains includes at least one of a function of a functions-as-a-service (FaaS) platform, a microservice, and a browser component of a browser application.

Example M9 comprises the subject matter of any one of Examples M7-M8, and further comprises executing a first instruction of the first decrypted code block to transition from executing the first software component as a first thread in the first process to executing a second software component as a second thread in the first process.

Example M10 comprises the subject matter of Example M9, and the executing the first instruction in the first decrypted code block includes storing in stack memory a return address pointer to a second instruction following the first instruction in the first encrypted code block of the first software component, and storing, in the instruction pointer register, a second encoded pointer to a second encrypted code block of the second software component.

Example M11 comprises the subject matter of Example M10, and further comprising decoding the second encoded pointer to obtain a second linear address of the second encrypted code block, using the second linear address to access the second encrypted code block, and decrypting the second encrypted code block to generate a second decrypted code block using a second code tweak, the second code tweak including second domain metadata that uniquely identifies the second software component and a second offset of the second encrypted code block within a second memory slot of the first linear address space.

Example M12 comprises the subject matter of any one of Examples M1-M11, and further comprising obtaining the first offset by calculating a difference between the first linear address and another linear address corresponding to a start of the first memory slot.

Example M13 comprises the subject matter of any one of Examples M1-M13, and the first software component is a shared library executing in a first process of a first container associated with the first linear address space of the memory and executing in a second process of a second container associated with a second linear address space of the memory.

Example M14 comprises the subject matter of Example M14, and further comprising decoding a third encoded pointer to obtain a third linear address of the first encrypted code block of the first software component in the second linear address space of the memory, using the third linear address to access the first encrypted code block, and decrypting the first encrypted code block to generate the first decrypted code block using the first code key and a third code tweak derived at least in part from the third encoded pointer, the third code tweak including the first metadata that uniquely identifies the first software component and a third offset of the first encrypted code block within a second memory slot in the second linear address space, and the first offset equals the third offset.

Example M15 comprises the subject matter of any one of Examples M1-M14, and further comprises executing a second instruction of a second decrypted code block to access data, decoding a fourth encoded pointer to obtain a fourth linear address of an encrypted data block associated with the first software component, using the fourth linear address to access the encrypted data block, and decrypting the encrypted data block to generate a decrypted data block using a data tweak, and the data tweak is determined based on a type of data that defines the encrypted data block.

Example C1 provides a machine readable medium comprising instructions that when executed by a processor, cause the processor to perform operations comprising: decoding a first encoded pointer stored in an instruction pointer register of the processor to obtain a first linear address of a first encrypted code block of a first software component in memory, and the first software component is to share a first address space of the memory with a plurality of software components, using the first linear address to access the first encrypted code block, and decrypting the first encrypted code block to generate a first decrypted code block using a first code key and a first code tweak that includes first metadata that uniquely identifies the first software component and first location information that represents a relative position of the first encrypted code block in the first address space.

Example C2 comprises the subject matter of Example C1, and the first code tweak further includes second metadata obtained from the first encoded pointer, and the second metadata is based on a byte size of a first memory slot to which a first memory allocation for the first software component is assigned.

Example C3 comprises the subject matter of Example C2, and the second metadata represents a value of an exponent in a power of two number that corresponds to the byte size of the first memory slot.

Example C4 comprises the subject matter of any one of Examples C2-C3, and the decoding the first encoded pointer further comprises decrypting an encrypted portion of the first encoded pointer based on an address key and an address tweak to generate a decrypted portion, the decrypted portion to include the first metadata and a first portion of address bits of the first linear address.

Example C5 comprises the subject matter of Example C4, and the address tweak is to include the second metadata and a second portion of the address bits of the first linear address.

Example C6 comprises the subject matter of any one of Examples C4-05, and the instructions, when executed by the processor, cause the processor to perform further operations comprising generating the first encoded pointer, the generating including encoding the first linear address with the first metadata and the second metadata, and encrypting the first metadata and the first portion of the address bits of the first linear address using the address key and the address tweak.

Example C7 comprises the subject matter of any one of Examples C1-C6, and two or more software components of the plurality of software components are to execute as a plurality of threads, respectively, in a first process.

Example C8 comprises the subject matter of Example C7, and the plurality of software components includes at least one of a function of a functions-as-a-service (FaaS) platform, a microservice, and a browser component of a browser application.

Example C9 comprises the subject matter of any one of Examples C7-C8, and the instructions, when executed by the processor, cause the processor to perform further operations comprising executing a first instruction of the first decrypted code block to transition from executing the first software component as a first thread in the first process to executing a second software component as a second thread in the first process.

Example C10 comprises the subject matter of Example C9, and the executing the first instruction in the first decrypted code block includes storing in stack memory a return address pointer to a second instruction following the first instruction in the first encrypted code block of the first software component, and storing, in the instruction pointer register, a second encoded pointer to a second encrypted code block of the second software component.

Example C11 comprises the subject matter of Example C10, and the instructions, when executed by the processor, cause the processor to perform further operations comprising decoding the second encoded pointer to obtain a second linear address of the second encrypted code block, using the second linear address to access the second encrypted code block, and decrypting the second encrypted code block to generate a second decrypted code block using a second code tweak, the second code tweak including third metadata that uniquely identifies the second software component and second location information that represents a second relative position of the second encrypted code block in the first address space.

Example C12 comprises the subject matter of any one of Examples C1-C11, and the first location information is a first offset of the first encrypted code block within a first memory slot to which a first memory allocation for the first software component is assigned.

Example C13 comprises the subject matter of Example C12, and the instructions, when executed by the processor, cause the processor to perform further operations comprising obtaining the first offset by calculating a difference between the first linear address and another linear address corresponding to a start of the first memory slot.

Example C14 comprises the subject matter of any one of Examples C1-C13, and the first software component is a shared library to be executed in a first process of a first container associated with the first address space of the memory and to be executed in a second process of a second container associated with a second address space of the memory.

Example C15 comprises the subject matter of Example C14, and the instructions, when executed by the processor, cause the processor to perform further operations comprising decoding a third encoded pointer to obtain a third linear address of the first encrypted code block of the first software component in the second address space of the memory, using the third linear address to access the first encrypted code block, and decrypting the first encrypted code block to generate the first decrypted code block using the first code key and a third code tweak derived at least in part from the third encoded pointer, the third code tweak including the first metadata that uniquely identifies the first software component and second location information that represents a second relative position of the first encrypted code block within a second memory slot in the second address space, and the first location information is equivalent to the second location information.

Example X1 provides an apparatus for cryptographically isolating software components, the apparatus comprising means for performing the method of any one of Examples M1-M15.

Example X2 comprises the subject matter of Example X1, and the means for performing the method comprises at least one processor and at least one memory element.

Example X3 comprises the subject matter of Example X2 can optionally include that the at least one memory element comprises machine readable instructions that when executed, cause the apparatus to perform the method of any one of the preceding Examples.

Example X4 comprises the subject matter of any one of Examples X1-X3 can optionally include that the apparatus is one of a computing system, a processing element, or a system-on-a-chip.

Example X5 provides at least one machine readable storage medium comprising instructions that are executable by a processor, and the instructions when executed realize a processor, realize a system, or implement a method as in any one of Examples P1-P15, S1-S15, or M1-M15.

The invention claimed is:

1. A processor, comprising:
an instruction pointer register to store a first encoded pointer to a first encrypted code block of a first software component in memory, wherein the first software component is to share a first address space of the memory with a plurality of software components; and
circuitry to:
decode the first encoded pointer to obtain a first linear address of the first encrypted code block;
use the first linear address to access the first encrypted code block; and
decrypt the first encrypted code block to generate a first decrypted code block using a first code key and a first code tweak derived at least in part from the first encoded pointer, the first code tweak including first metadata that uniquely identifies the first software component and first location information that represents a relative position of the first encrypted code block in the first address space.

2. The processor of claim 1, wherein the first code tweak further includes second metadata obtained from the first encoded pointer, wherein the second metadata is based on a byte size of a first memory slot to which a first memory allocation for the first software component is assigned.

3. The processor of claim 2, wherein the second metadata represents a value of an exponent in a power of two number that corresponds to the byte size of the first memory slot.

4. The processor of claim 2, wherein to decode the first encoded pointer is to include:
decrypting an encrypted portion of the first encoded pointer based on an address key and an address tweak to generate a decrypted portion, the decrypted portion to include the first metadata and a first portion of address bits of the first linear address.

5. The processor of claim 4, wherein the address tweak is to include the second metadata and a second portion of the address bits of the first linear address.

6. The processor of claim 4, wherein the circuitry is further to execute one or more instructions of a linker-loader module to:
generate the first encoded pointer, including:
encoding the first linear address with the first metadata and the second metadata; and
encrypting the first metadata and the first portion of the address bits of the first linear address using the address key and the address tweak.

7. The processor of claim 1, wherein two or more software components of the plurality of software components are to execute as a plurality of threads, respectively, in a first process.

8. The processor of claim 7, wherein the plurality of software components includes at least one of a function of a functions-as-a-service (FaaS) platform, a microservice, and a browser component of a browser application.

9. The processor of claim 7, wherein the circuitry is further to:
execute a first instruction of the first decrypted code block to transition from executing the first software component as a first thread in the first process to executing a second software component as a second thread in the first process.

10. The processor of claim 9, wherein to execute the first instruction in the first decrypted code block is to include:
storing in stack memory an encoded return address to a second instruction following the first instruction in the first encrypted code block of the first software component; and
storing, in the instruction pointer register, a second encoded pointer to a second encrypted code block of the second software component.

11. The processor of claim 10, wherein the circuitry is to further:
decode the second encoded pointer to obtain a second linear address of the second encrypted code block;
use the second linear address to access the second encrypted code block; and
decrypt the second encrypted code block to generate a second decrypted code block using a second code tweak, the second code tweak to include third metadata that uniquely identifies the second software component and second location information that represents a second relative position of the second encrypted code block in the first address space.

12. The processor of claim 1, wherein the first location information is a first offset of the first encrypted code block within a first memory slot to which a first memory allocation for the first software component is assigned.

13. The processor of claim 12, wherein the circuitry is further to:
obtain the first offset by calculating a difference between the first linear address and another linear address corresponding to a start of the first memory slot.

14. The processor of claim 1, wherein the first software component is a shared library to be executed in a first process of a first container associated with the first address space of the memory and to be executed in a second process of a second container associated with a second address space of the memory.

15. The processor of claim 14, further comprising:
a second instruction pointer register to store a third encoded pointer to the first encrypted code block of the first software component in the second address space of the memory, wherein the circuitry is further to:
decode the third encoded pointer to obtain a third linear address of the first encrypted code block;
use the third linear address to access the first encrypted code block; and
decrypt the first encrypted code block to generate the first decrypted code block using the first code key and a third code tweak derived at least in part from the third encoded pointer, the third code tweak including the first metadata that uniquely identifies the first software component and second location information that represents a second relative position of the first encrypted code block within the second address space, wherein the first location information is equivalent to the second location information.

16. A system, comprising:
memory for storing a plurality of domains; and
a processor coupled to the memory, the processor comprising:
an instruction pointer register to store a first encoded pointer to a first encrypted code block of a first domain in the memory, wherein the first domain is to share a first address space of the memory with the plurality of domains; and
circuitry to:
decode the first encoded pointer to obtain a first linear address of the first encrypted code block;
use the first linear address to access the first encrypted code block; and
decrypt the first encrypted code block to generate a first decrypted code block using a first code key and a first code tweak derived at least in part from the first encoded pointer, the first code tweak including first domain metadata that uniquely identifies the first domain and first location information that represents a relative position of the first encrypted code block in the first address space.

17. The system of claim 16, wherein two or more domains of the plurality of domains are to execute as a plurality of threads, respectively, in a first process, wherein the circuitry is further to:

execute a first instruction of the first decrypted code block to transition from executing the first domain as a first thread in the first process to executing a second domain as a second thread in the first process.

18. The system of claim 17, wherein to execute the first instruction in the first decrypted code block is to include:
storing in stack memory a return address pointer to a second instruction following the first instruction in the first encrypted code block of the first domain; and
storing, in the instruction pointer register, a second encoded pointer to a second encrypted code block of the second domain.

19. The system of claim 18, wherein the circuitry is to:
decode the second encoded pointer to obtain a second linear address of the second encrypted code block;
use the second linear address to access the second encrypted code block; and
decrypt the second encrypted code block to generate a second decrypted code block using a second code tweak, the second code tweak to include second domain metadata that uniquely identifies the second domain and second location information that represents a second relative position of the second encrypted code block in the first address space.

20. The system of claim 16, wherein the first location information is a first offset of the first encrypted code block within a first memory slot to which a first memory allocation for the first domain is assigned.

21. A method comprising:
decoding a first encoded pointer stored in an instruction pointer register of a processor to obtain a first linear address of a first encrypted code block of a first software component in memory, wherein the first software component shares a first linear address space of the memory with a plurality of software components;
using the first linear address to access the first encrypted code block;
determining a first offset of the first encrypted code block within a first memory slot of the first linear address space; and
decrypting the first encrypted code block to generate a first decrypted code block using a first code key and a first code tweak that includes the first offset and first metadata that uniquely identifies the first software component.

22. The method of claim 21, further comprising:
executing a first instruction of the first decrypted code block to access data;
decoding a second encoded pointer to obtain a second linear address of an encrypted data block associated with the first software component; and
using the second linear address to access the encrypted data block; and
decrypting the encrypted data block to generate a decrypted data block using a data tweak, wherein the data tweak is determined based on a type of data associated with the encrypted data block.

23. A non-transitory machine readable medium comprising instructions that when executed by a processor, cause the processor to perform operations comprising:
decoding a first encoded pointer stored in an instruction pointer register of the processor to obtain a first linear address of a first encrypted code block of a first software component in memory, wherein the first software component is to share a first address space of the memory with a plurality of software components;

using the first linear address to access the first encrypted code block; and decrypting the first encrypted code block to generate a first decrypted code block using a first code key and a first code tweak that includes first metadata that uniquely identifies the first software component and first location information that represents a relative position of the first encrypted code block in the first address space.

24. The non-transitory machine readable medium of claim 23, wherein two or more software components of the plurality of software components are to execute as a plurality of threads, respectively, in a first process.

25. The non-transitory machine readable medium of claim 23, wherein the first location information is a first offset of the first encrypted code block within a first memory slot to which a first memory allocation for the first software component is assigned.

* * * * *